United States Patent [19]

Fujiwara et al.

[11] Patent Number: 5,003,499
[45] Date of Patent: Mar. 26, 1991

[54] DOCUMENT PREPARATION APPARATUS HAVING REARRANGEMENT APPARATUS FOR REARRANGING TEXT ACCORDING TO REGION ATTRIBATE INFORMATION

[75] Inventors: Masaki Fujiwara; Shigeki Taniguchi, both of Hitachi; Masaki Kawase, Katsuta; Kiyoshi Masuda, Hitachi, all of Japan

[73] Assignee: Hitachi, Ltd., Tokyo, Japan

[21] Appl. No.: 193,788

[22] Filed: May 13, 1988

[30] Foreign Application Priority Data

May 18, 1987 [JP] Japan .................................. 62-120587

[51] Int. Cl.$^5$ ................................................ G06F 3/12
[52] U.S. Cl. ..................................................... 364/523
[58] Field of Search ............... 364/518, 519, 520, 521, 364/900 MS File, 523; 340/721; 400/63, 76, 279

[56] References Cited

U.S. PATENT DOCUMENTS 4,608,662  8/1986  Watanabe et al. .................. 364/900
4,754,428  6/1988  Schultz et al. .................... 364/519 X
4,800,510  1/1989  Vinberg et al. ................... 364/520 X Primary Examiner—Gary V. Harkcom
Assistant Examiner—Mark K. Zimmerman
Attorney, Agent, or Firm—Antonelli, Terry, Stout & Kraus

[57] ABSTRACT

The document edition unit includes region set apparatus for setting a size of the region to a size corresponding to the print output, region attribute set apparatus for setting attribute information, region information hold apparatus, and text re-determination apparatus. The text data edition unit includes text input control apparatus. The region information hold apparatus manages the size and position of the region set by the region set apparatus in the size and at the position corresponding to those of at the time of print output, and manages the attributes set by the region attribute set apparatus so as to correspond to them. The text input control apparatus controls the arrangement to the character string at the time of text input by referring to the region information whose position on the page is fixed. When the user makes the operation which changes the input region of the text, the text re-determination apparatus re-determines the arrangement of the texts inside the page in accordance with the region.

3 Claims, 43 Drawing Sheets

ICON MANAGEMENT TABLE

| ICON NUMBER | PROGRAM NUMBER | |
|---|---|---|
| 0 | FILE EDITION NUMBER | —571 |
| 1 | DOCUMENT EDITION NUMBER | |
| ⋮ | ⋮ | |

DATA NAME DEFINITION TABLE (DNDT)

| DATA NUMBER | DATA NAME |
|---|---|
| 0 | TEXT |
| 1 | FIGURE |
| 2 | GRAPH |
| | |
| | |

573

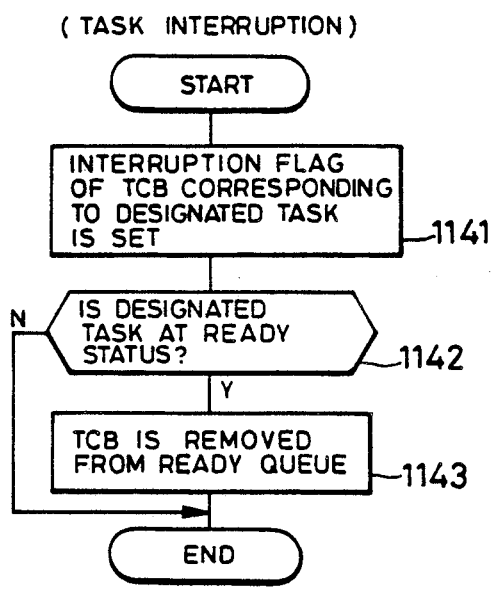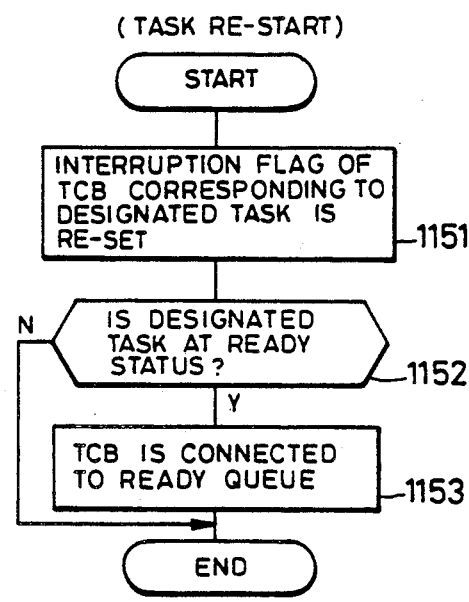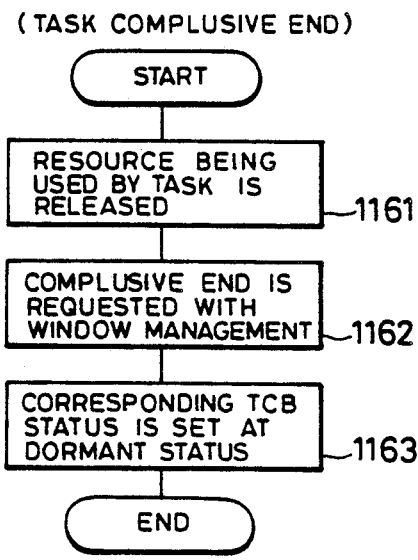

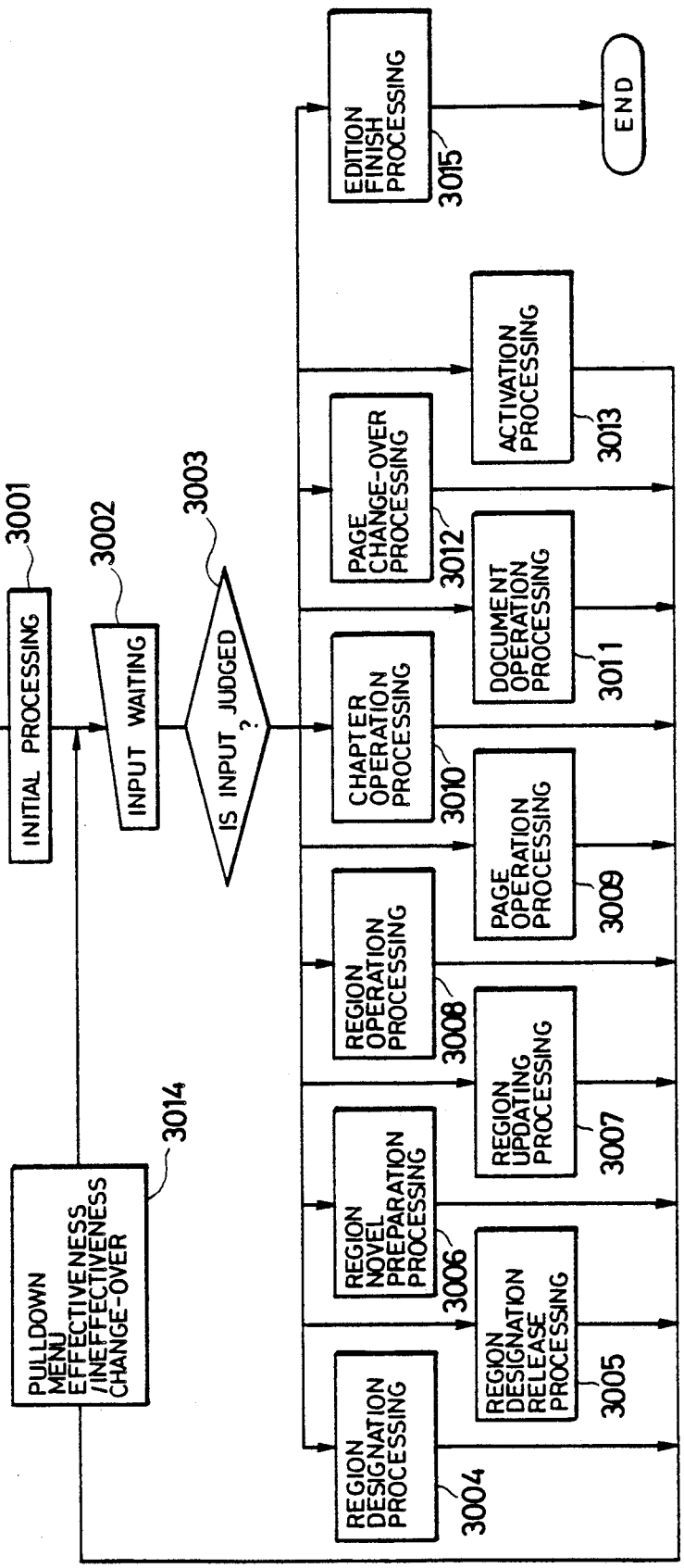

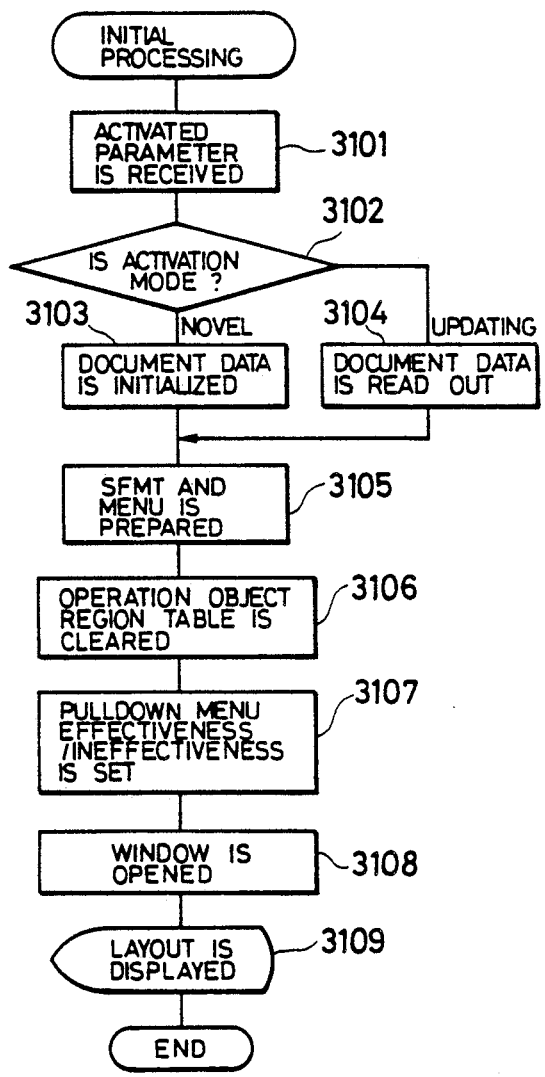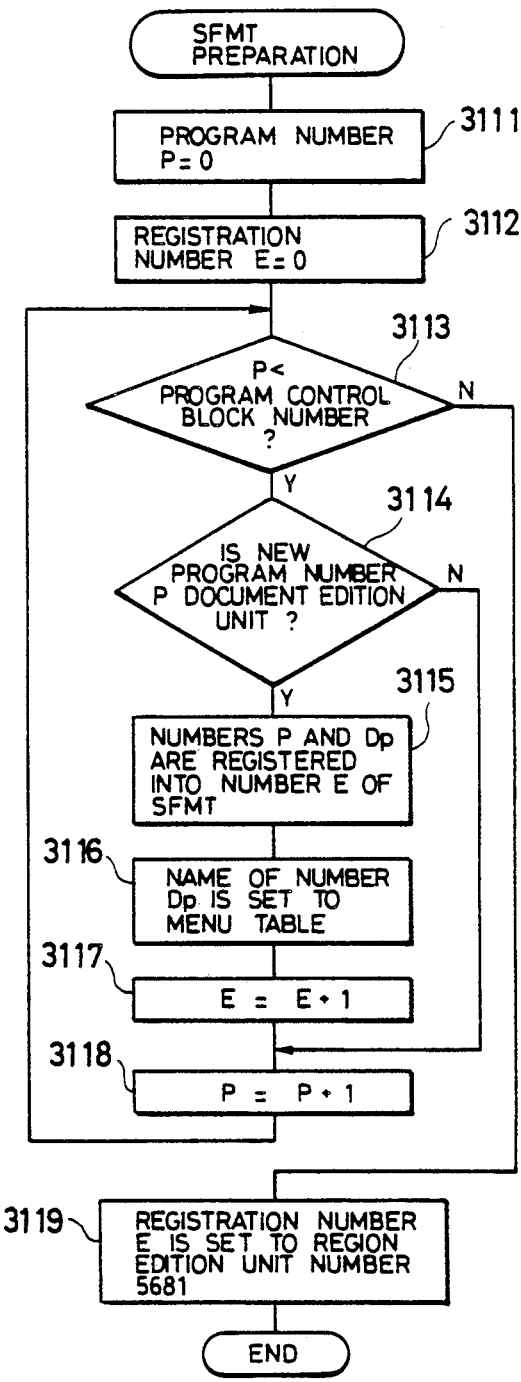

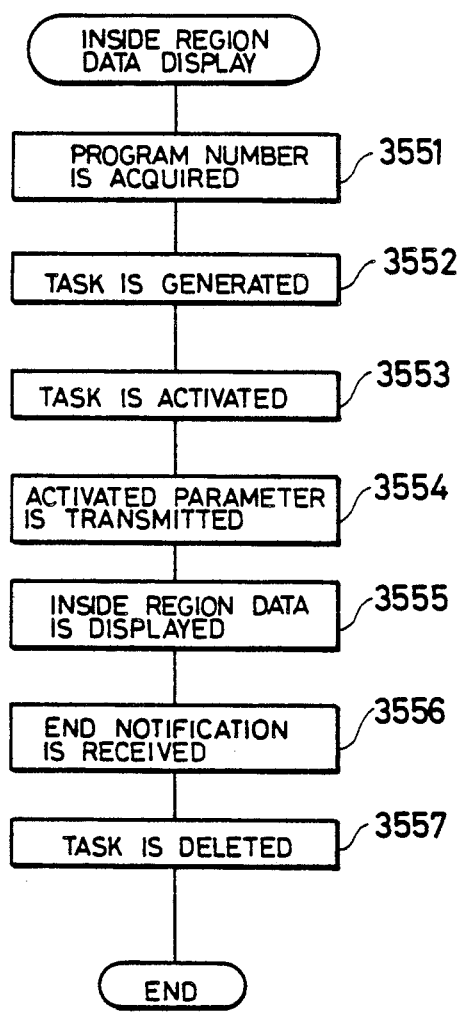

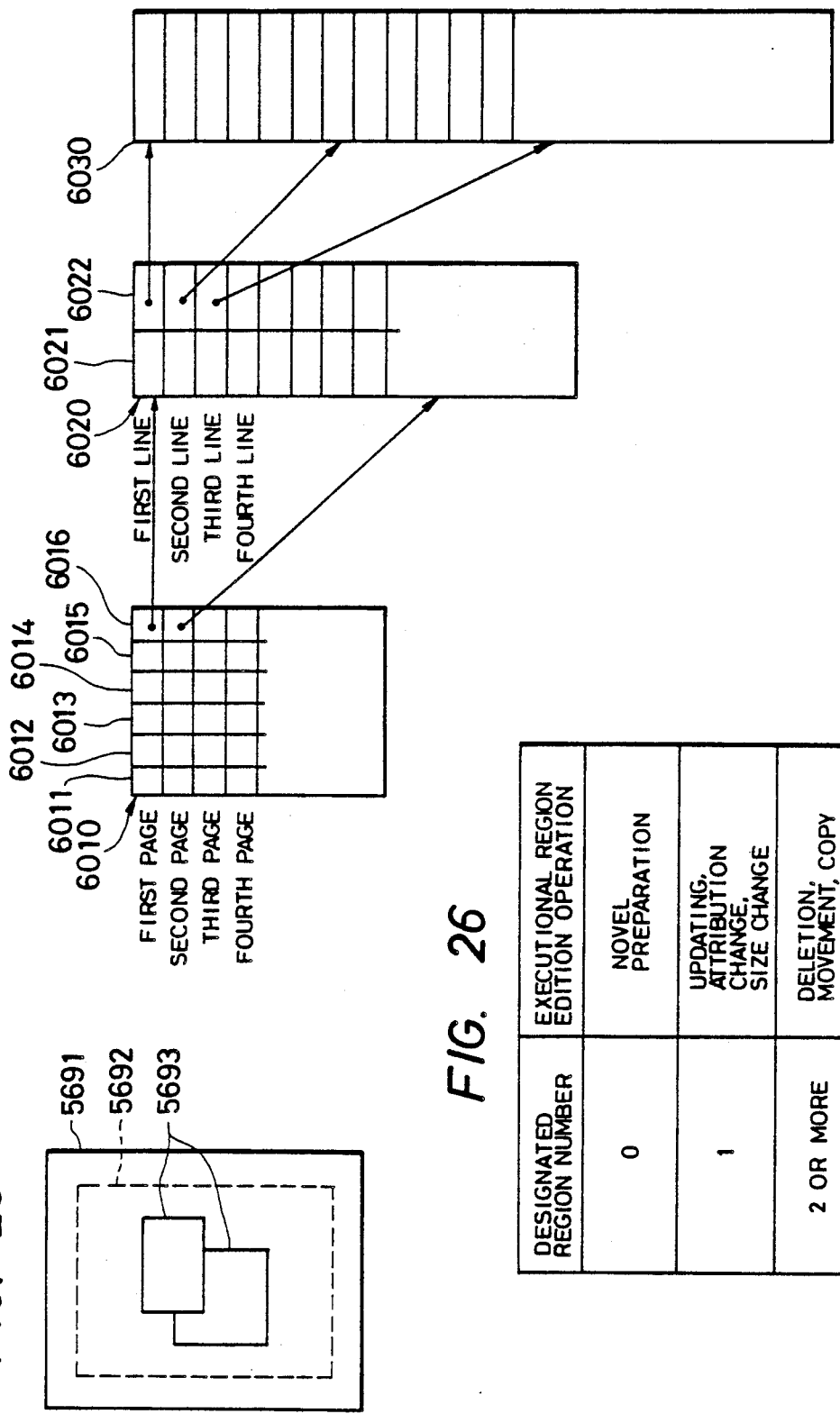

FIG. 27  SUPPORT REGION EDITION UNIT MANAGEMENT TABLE (SFMT)

| REGION EDITION UNIT NUMBER i | — 5681 |

| PROGRAM NUMBER | DATA KIND NUMBER |
|---|---|
| $P_0$ | $D_0$ |
| ⋮ | ⋮ |
| $P_{i-1}$ | $D_{i-1}$ |
| ⋮ | ⋮ |

5682, 5683

FIG. 28  OPERATION OBJECT REGION TABLE

| DESIGNATED REGION NUMBER j | — 5684 |
| DESIGNATED REGION KIND | — 5685 |

| REGION NUMBER | — 5686 |
|---|---|
| $F_0$ | |
| ⋮ | |
| $F_{i-1}$ | |
| ⋮ | |

FIG. 29  ACTIVATION EDITION TASK MANAGEMENT TABLE

| ACTIVATION TASK NUMBER k | — 5687 |

| TASK NUMBER | REGION NUMBER |
|---|---|
| $T_0$ | $F_0$ |
| ⋮ | ⋮ |
| $T_{A-1}$ | $F_{B-1}$ |
| ⋮ | ⋮ |

5688, 5689

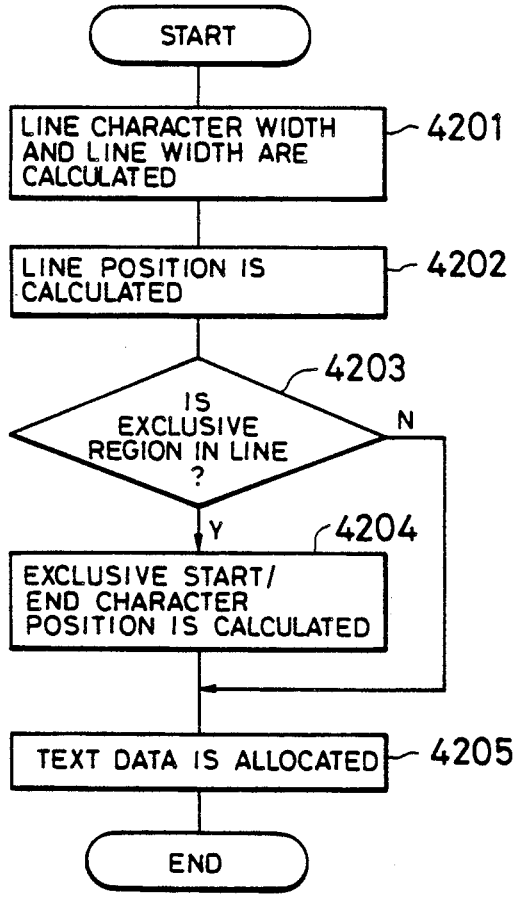

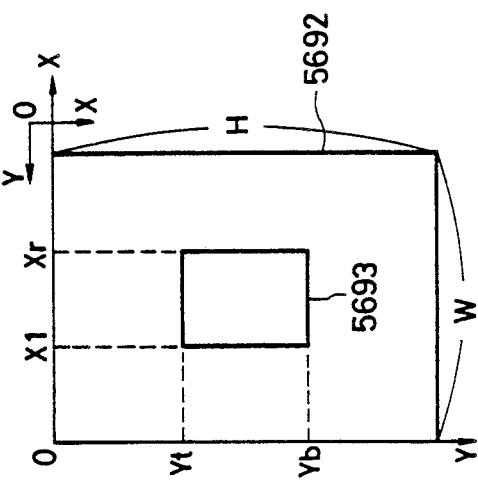

FIG. 33a

| CHARACTER DIRECTION | EXCLUSIVE MODE | EXCLUSIVE REGION | | | |
|---|---|---|---|---|---|
| | | LEFT UPPER | | RIGHT LOWER | |
| | | X COORDINATE | Y COORDINATE | X COORDINATE | Y COODINATE |
| TRANSVERSE WRITING | (a) FULL PAGE | 0 | 0 | W | H |
| | (b) FULL LINE | 0 | Yt | W | Yb |
| | (c) LINE HEADING SIDE | 0 | Yt | Xr | Yb |
| | (d) LINE ENDING SIDE | Xl | Yt | W | Yb |
| | (e) REGION ONLY | Xl | Yt | Xr | Yb |
| LONGITUDINAL WRITING | (f) FULL PAGE | 0 | 0 | H | W |
| | (g) FULL LINE | 0 | W−Xr | H | W−Xl |
| | (h) LINE HEADING SIDE | 0 | W−Xr | Yb | W−Xl |
| | (i) LINE ENDING SIDE | Yt | W−Xr | H | W−Xl |
| | (j) REGION ONLY | Yt | W−Xr | Yb | W−Xl |

| | FULL PAGE | FULL LINE | LINE HEADING SIDE | LINE ENDING SIDE | REGION ONLY |
|---|---|---|---|---|---|
| TRANSVERSE WRITING | (a) | (b) | (c) | (d) | (e) |
| LONGITUDINAL WRITING | (f) | (g) | (h) | (i) | (j) |

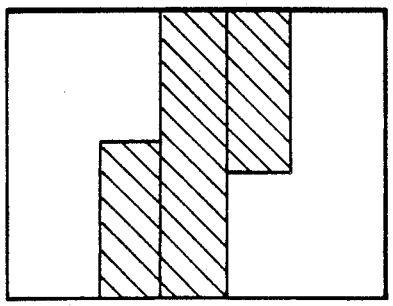
FIG. 34a
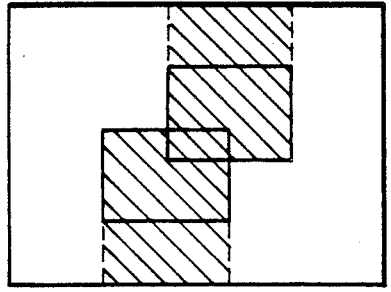
FIG. 34b
FIG. 35

DOCUMENT PREPARATION APPARATUS HAVING REARRANGEMENT APPARATUS FOR REARRANGING TEXT ACCORDING TO REGION ATTRIBATE INFORMATION

DESCRIPTION OF THE INVENTION

1. Field of the Invention

The present invention relates to a document preparation apparatus and more particularly to a document preparation apparatus such as a word processor for preparing and editing documents wherein different kinds of data such as texts, graphs, figures, and the like, exist in mixture.

2. Prior Art

In recent document preparation apparatuses such as word processors, the kind of data to be handled therein is not limited to a conventional text (character) data but has become diversified such as figures, graphs, tables and images.

Various methods utilizing the document preparation apparatuses of preparing and editing documents containing a plurality of kinds of data in mixture are known. As described in Japanese Patent Laid-Open No. 81670/1982, for example, there is known a method which secures a frame or frames in the unit of text-line digit on a screen on which a text is prepared and edited, and puts the information such as figures, images, or the like, into the frame or frames.

In this case, the size of the frame, that is, the horizontal length and the longitudinal length of the region into which the information such as the figure or the image is put determine the physical size in terms of millimeter or dot at the time of print-out in accordance with the text space and the character space designated to the text at that time, and with the numbers of texts and characters designated at the time of designation for the frame.

If the text has already been put into the set position of the frame, an automatic edition is made in the layout of the document so that the text data is not disposed inside the frame. On the other hand, if the frame is set in advance, a control is made so that the text that is inputted later is also not disposed inside the frame.

In addition to the method described above, there is known another method from, for example, Japanese Patent Laid-Open No. 226966/1984 which sets a frame (the frame to be set on the layout screen will be hereinafter referred to as a "region") in the physical unit at the time of print such as millimeter on the layout screen for displaying different data in mixture in the form corresponding to the form of print-out, and puts the information such as figures, images, or the like, into the frame.

In performing the document layout, an automatic edition of the text is not effected. However, the region and the text are put in superposition to each other in the display and the resulting printed page.

As to the edition system of document layout, Japanese Patent Laid-Open No. 136879/1985, for example, describes an edition system which stores the superposition information for each region and controls the arrangement of the texts inside the region in accordance with this superposition information.

Generally, the following three procedures are necessary for the preparation of documents utilizing the document preparation apparatus in which a plurality of data exist in mixture as described above.

(i) A text as the body text in the document is prepared.

(ii) Data to be put into a rectangular area such as the frame or the region, such as figures, graphs and images, are prepared.

(iii) Layout of the document as a whole is determined. For example, there are a procedure of determining the position and the size of the set region on a page, a procedure of changing the position and the size of the region that has already been set, in connection with other information, a procedure of changing the format of the document (such as the character space, the text-line space, etc.) and a procedure of changing the format of the document (such as the paper size, the paper direction, etc.).

However, the modes of preparation of the documents by operators are diversified and the sequences of these operations cannot be determined uniformly. Particularly when business documents are prepared in offices in general, one operator practises all the jobs of preparation, revision and print-out while considering the content of the document and its layout etc.. In other words, the above stated procedures (i) to (iii) are repeatedly executed in various different sequences (on the trial and error basis) to prepare one document.

However, since the conventional methods do not take the above-mentioned points into consideration, they are not free from the following problems.

In the first prior art technique described above, the size of the frame at the time of print-out is determined on the basis of the format information of the text such as the character space, the text-line space and so forth. Accordingly, once the frame is set, the format information of the text cannot be changed and even if it can, the information put into the frame (e.g. figures, images, etc.) projects out from the frame because the size of the frame changes.

In the second prior art technique described above, the size of the region is set in the physical unit such as millimeter at the time of print. Accordingly, though the problem that the size of the region changes due to the edition of the text does not occur, the above-mentioned procedure of securing the frame is necessary during the preparation of the text in order to prevent superposition of the region and the text on the page layout because there is not correlation between the region and the text.

For this reason, even if the page layout has once been determined, the position relation between the frame and the region deviates if re-edition of the text becomes necessary so that the trouble of moving once again the position of the region or resetting the frame is necessary. Furthermore, since the position relation between the text and the region can be confirmed only on the layout screen, there is a problem that it is not possible to prepare the text while taking the overall layout into consideration.

In accordance with the third prior art technique described above, it is possible to re-arrange the texts inside the region in accordance with superposition of regions by holding the superposition information between the regions for each region. However this method does not pay any consideration with the re-edition of the information inside the region once the layout has been determined.

SUMMARY OF THE INVENTION

An object of the present invention is to provide a document preparation apparatus wherein the layout of a document can be edited efficiently, to say nothing of the preparation and edition of different kinds of data such as texts, figures and images.

Another object of the present invention is to provide a document preparation apparatus wherein the size and position of a set region of a window in an edition unit can be managed in the size and position corresponding to those at the time of print output.

A further object of the present invention is to provide a document preparation apparatus wherein the set attributes can be managed so as to correspond to the size and position at the time of print output.

A still further object of the present invention is to provide a document preparation apparatus wherein an operation can be executed efficiently an input edition of the text while considering a layout of the entire page, since a text data edition unit can control led an arrangement of a character string at the time of text input by referring to a region information.

Yet another object of the present invention is to provide a document preparation apparatus wherein when the operation for changing an input area of the text is conducted by the operator, a document edition unit can be re-arranged an arrangement of the texts in the page in accordance with, a region information.

Still yet another object of the present invention is to provide a document preparation apparatus wherein the latest layout of a window in an edition unit can be confirmed instantaneously and a text data can be re-edited in accordance the latest arrangement.

A still further yet another object of the present invention is to provide a document preparation apparatus the trouble of users at the time of edition of layout of the document and at the time of preparation and edition of the text can be saved drastically and operability of the document wherein a plurality of data exist in mixture can be improved widely.

In accordance with the present invention, a document preparation apparatus includes an input unit for handling a document in which a plurality of kinds of description elements exist in mixture and for inputting the description elements to be described in the document for each region. A memory unit is provided for storing the inputted description elements in the input unit is provided and a display unit for displaying various kinds of description elements stored in the memory unit. The present invention also includes a document edition unit for displaying a page layout of a prepared document by the display unit and making edition of the regions in accordance with the display a text data edition unit activated by the document edition unit, for preparing text as the body text of a main document and a region edition unit activated also by the document edition unit, for preparing and editing description element data in the region.

The document edition unit further includes region set means for setting a size of the region to a size corresponding to the print output region attribute set means for setting attribute information, which represents whether or not the text to be described on a page when the region is set is to be excluded and region information hold means for holding the attribute set by the region attribute set means in such a manner as to correspond to the region set by the region set means. Also included is text redetermination means for re-determining the arrangement of the text inputted into the page when the area for inputting the texts is changed by the operations such as setting of a region having exclusiveness, movement, size change and page format change.

The text data edition unit includes text input control means for controlling the arrangement of the text in order to prevent an input text from overlapping from the region when the region having exclusiveness has already been set when the text is inputted and edited.

The attribute information for excluding the text is any one of full page exclusive information for excluding all the texts inside a page in which the region is set, full text-line exclusive information for excluding the texts in all the text-lines extending to a region set position, text-line leading side exclusive information for excluding the text on a leading side of the text-line containing the region set position and extending to the region set position, text-line ending side informaiton for excluding the text on the ending side of the text-line containing the region set posistion and extending to the region set position, and set the region exclusive information of only the region for excluding the text extending to the region set position.

The region attribute information change means for changing the attribute information is held by the region informaiton hold means.

The exclusive region display means displays the region for excluding the text in the form different from the region into which the text can be inputted.

The region information hold means manages the size and position of the region set by the region set means in the size and at the position corresponding to those of at the time of print output, and also manages the attributes set by the region attribute set means so as to correspond to them.

Since the text input control means controls the arrangement of the character string at the time of text input by referring to region information whose position on the page is fixed, the operator can make input/edition of the texts while considering the entire layout, and there is no possibility that the change of format information such as the text-line spacing and character spacing affects the size of the region or insertion, addition or deletion of the text changes the position of the region.

When the user makes the operation which changes the input area of the text, the text re-determination means re-determines the arrangement of the texts inside the page in accordance with the region information held by the region information hold means, it is not at all necessary for the operator to revise the arrangement of the text by himself.

In the document preparation apparatus in accordance with the present invention, the size and position of the set region are managed in the size and position corresponding to those at the time of print output and the set attributes are also managed so as to correspond to the former.

Since the text data edition unit controls the arrangement of the character string at the time of text input by referring to the region information described above, the operator can execute efficiently the input edition of the text while considering the layout of the entire page.

When the operation for changing the input region of the text is conducted by the operator, the document edition unit re-arranges the arrangement of the texts in the page in accordance with the region information. Accordingly, the latest layout can be confirmed instantaneously and the useless operation that the operator revises by himself the arrangement of texts can be eliminated.

If revision of the text becomes necessary once again after the operation described above, the text can be rearranged by the operation described above. Therefore, the text data can be re-edited in accordance the latest arrangement.

For the reasons described above, the trouble of users at the time of edition of layout of the document and at the time of preparation and edition of the text can be saved drastically and operability of the document wherein a plurality of data exist in mixture can be improved.

BRIEF DESCRIPTION OF THE DRAWINGS

FIG. 12e is the processing chart of a task interruption;

FIG. 12f is the processing chart of a task re-start;

FIG. 12g is the processing chart of a task compulsive end;

FIG. 21 is the processing chart of a document edition unit;

FIG. 22a is initial processing chart of the document edition unit;

FIG. 22b is the processing chart for preparing a support region management table in the initial processing of the document edition unit;

FIG. 22i-1 is the layout display processing chart of the document edition unit;

FIG. 22i-2 is the inside-region data display processing chart in the layout display processing of the document edition unit;

FIG. 22k-1 is the region edition unit end processing chart in the activate processing of the document edition unit;

FIG. 22k-2 is the page number updating processing chart in the activate processing of the document edition unit;

FIG. 22l is the edition end processing chart of the document edition unit;

FIG. 24b is the construction view of text data;

FIG. 25 is the construction view of page;

FIG. 26 is the relation view between the region number designated as the object of operation and the region edition operation that can be executed;

FIG. 27 is the construction view of the support region edition unit management table;

FIG. 28 is the construction view of the operation object region table;

FIG. 29 is the construction view of the activation edition task management table;

FIG. 30c is the text arrangement processing chart in the text data edition unit;

FIG. 33a is the coordinates system view of an exclusive region;

FIG. 33b is the exclusive region coordinates view in each exclusive mode;

FIG. 33c is the arrangement view of the texts in each exclusive mode;

FIG. 34a and FIG. 34b is respectively the management method view of the exclusive region when they overlap with one another;

FIG. 35 is the attribute set screen view of the document edition unit;

DESCRIPTION OF THE INVENTION

The present invention will be explained hereinafter about the case where the invention is applied to a Japanese word processor, by way of an example.

Figure 1:
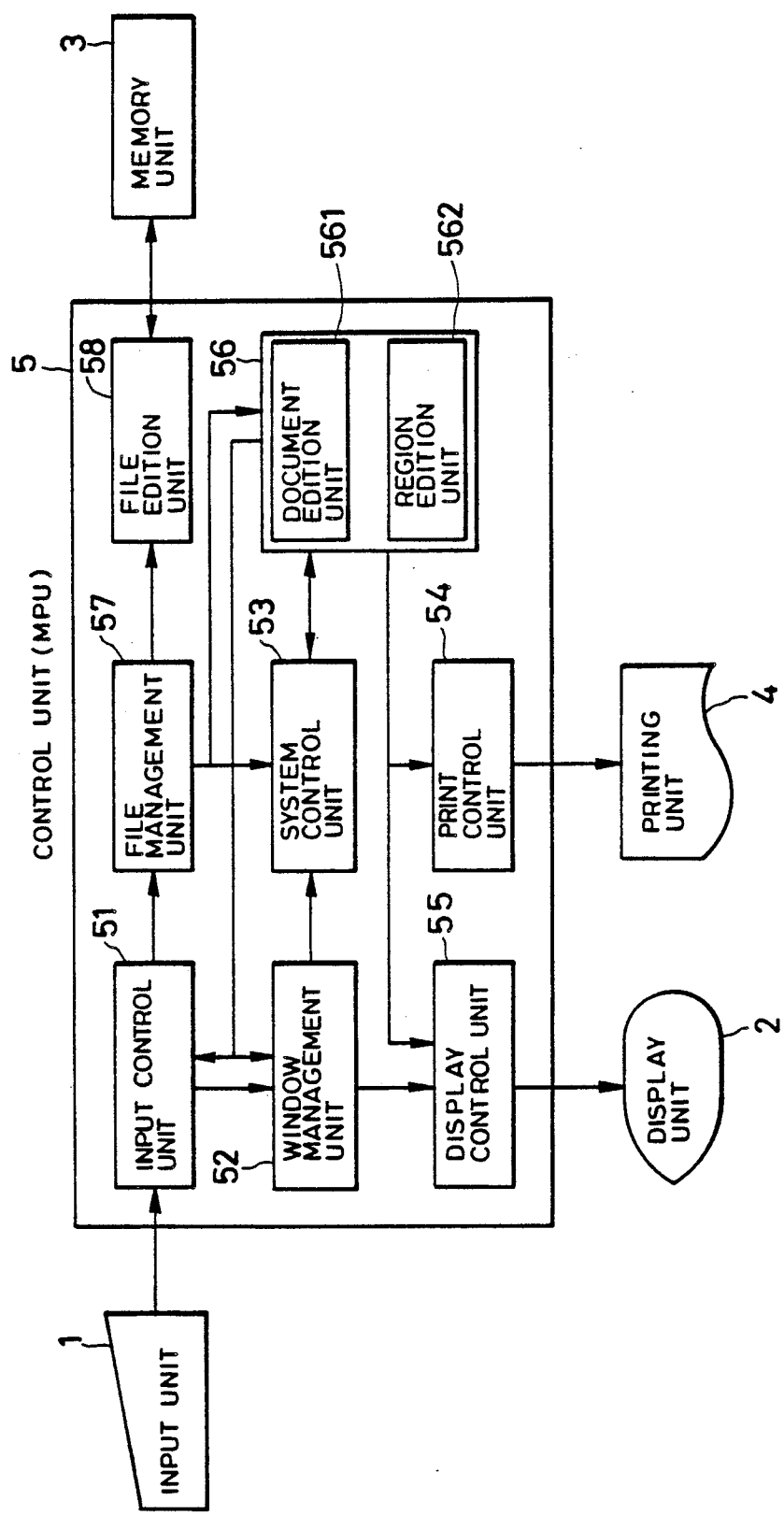
FIG. 1 is a block diagram showing the construction of a document preparation apparatus to which the present invention can be applied.

FIG. 1 is a block diagram showing the construction view of the Japanese word processor to which the present invention is applied. An input unit 1 consists of a keyboard for inputting characters and the like or a pointing device such as a mouse 31 for designating an operation object and a functional name.

A display unit 2 consists of a cathode ray tube (CRT) display for displaying characters, figures, and the like and a memory unit 3 consists of a semiconductor memory or a magnetic memory device. The memory unit 3 stores therein the content of a prepared document and management information of a later-appearing window.

A printing unit 4 consists of a wire dot printer or the like, and a control unit 5 consists of a microprocessor or the like. The control unit 5 consists of an input control unit 51, a window management unit 52, a system control unit 53, a print control unit 54, a display control unit 55, an edition unit 56, a file management unit 57 and a file edition unit 58.

In this embodiment of the present invention, preparation and edition of the document are carried out by the edition unit 56 and the edition unit 56 consists of a document edition unit 561 and a region edition unit 562.

Figure 2:
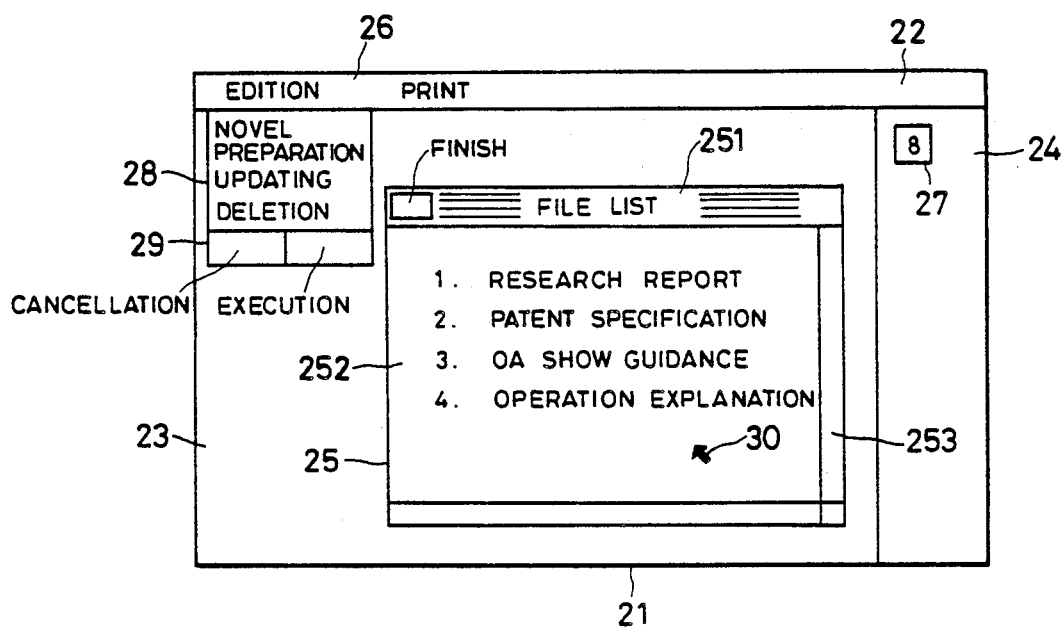
FIG. 2 is an example view of the display screen in the display unit of the document preparation apparatus of FIG. 1.

FIG. 2 shows a screen 21 displayed on the display unit 2. The screen 21 consists of a menu area 22, an edition area 23 and an icon area 24. Both document edition unit 561 and the region edition unit 562 set (open) independently of each other a rectangular frame 25 (hereinafter referred to as a "window") in the edition area 23, display the data in the window 25 and edit the document data inside the window 25 independently of each other.

Function classification names 26 (hereinafter referred to as a "pull-down menu names") of the document edition unit 561 and the region edition unit 562 are displayed in the menu a 22. When operator designates the pull-down menu name 26 by the mouse 31, the window 25 is opened and a detailed function item table 28 (hereinafter referred to as a "pull-down menu") is displayed therein.

As shown in FIG. 2, for example, the pull-down menu name 26 such as edition and print is displayed in the menu area 22 and when the operator designates the edition by the mouse 31, the pull-down menu 28 is opened and the function items such as novel preparation, updating, and the like, are displayed. If the operator designates the function item by the mouse 31 under this state, the designated function is executed.

The window 25 consists, for example, of a caption area 251 for displaying the window name, a data area 252 for displaying the data and a control area 253 for instructing the operations of the operator such as close and movement of the window 25, size change, and the like. A pictorial symbol 27 (hereinafter referred to as the "icon") representing each program such as the edition unit 56 is displayed in the icon area 24 and when the icon 27 is selected by the designation of the operator, the corresponding program is invoked or activated.

Figure 3:
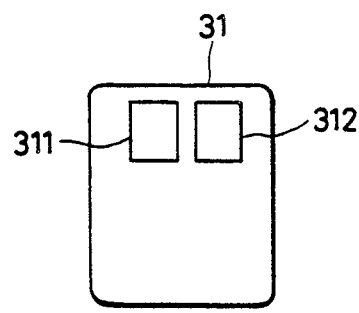
FIG. 3 is the construction view of a mouse button.

As shown in FIG. 3, the mouse 31 is equipped with an execution button 311 for selecting an operation object, function, and the like, for example, and a cancellation button 312 for cancelling the selected operation object. A mouse cursor 30 moves in such a manner as to follow up the operation of the operator for moving the mouse 31 inside the screen 21 and is used for designating the operation object inside the screen 21, or the like.

Hereinafter, each of the units constituting the control unit 5 will be explained.

The system control unit 53 invokes or activates the program such as the file edition unit 58 or the document edition unit 561 corresponding to the icon notified from the input control unit 51. The file management unit 57 includes an icon management table 571, a program control table 572 and a data name definition table 573 (hereinafter referred to as "DNDT").

Figures 4, 5:
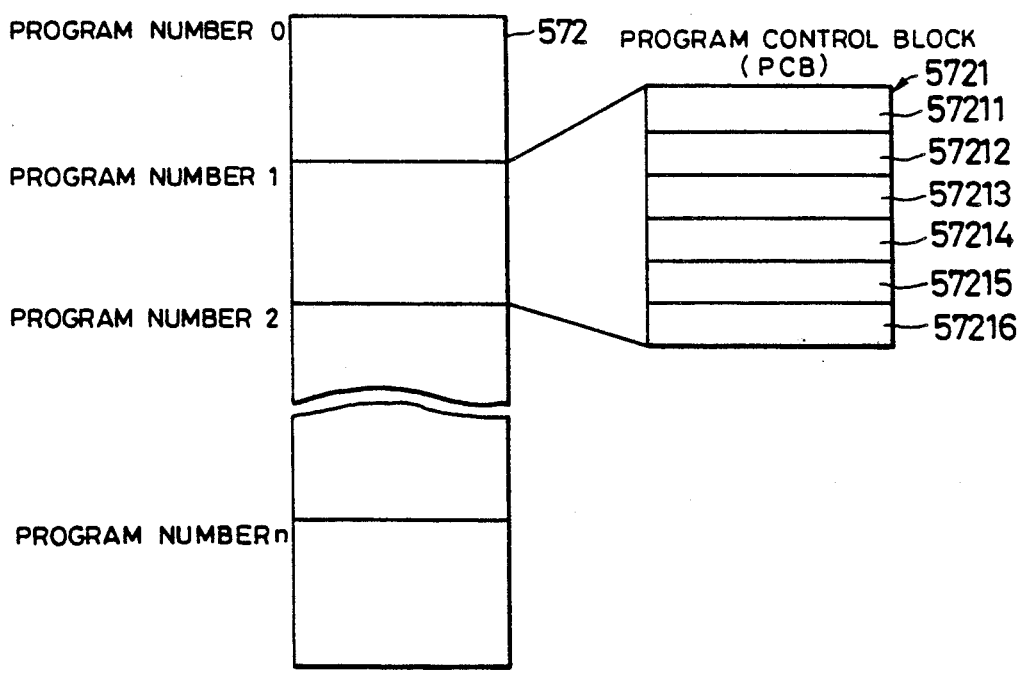
FIG. 4 is the construction view of an icon management table.
FIG. 5 is the construction view of a program control table.

The correspondence between the icon and the program is managed by the icon management table 571, and the icon management table 571 stores therein the icon number and the program number corresponding to the former as shown in FIG. 4. The program number is an identification number allotted to each program, and each program is controlled by the program control table 572 shown in FIG. 5.

The program control table 572 is prepared by arranging program control blocks 5721 (hereinafter referred to as "PCB") in the sequence of program number. The program control block (PCB) 5721 stores therein a start address information 57211 of a program, a stack address information 57212, a priority information 57213, a mother program number 57214, a data kind 57215 and other program attributes 57216.

Figures 6, 7:
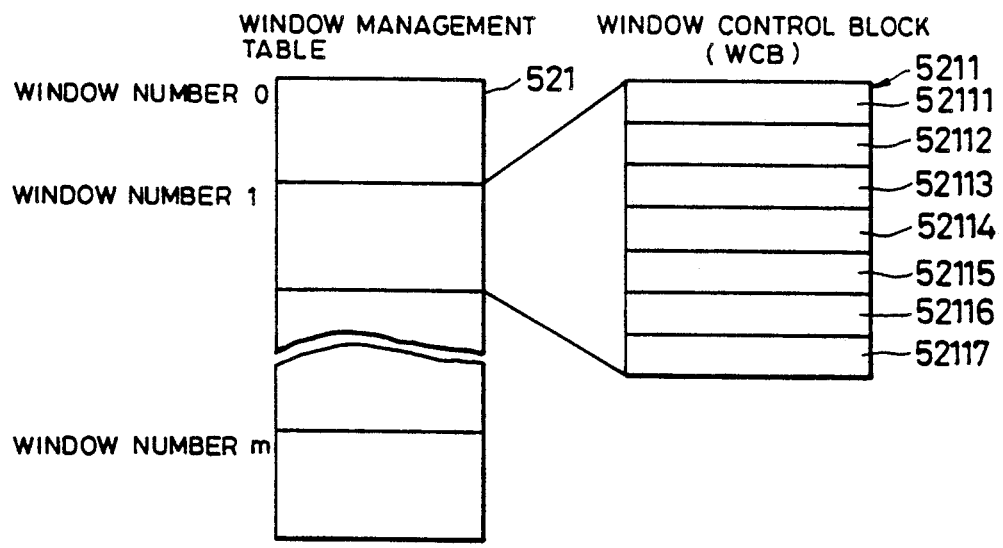
FIG. 6 is the construction view of a data name definition table.
FIG. 7 is the construction view of a window management table.

The mother program number 57214 represents by which program the corresponding program is invoked or activated. The data kind 57215 represents which data (e.g. text, figure, etc.) the corresponding program handles, and the data number is stored. The data name corresponding to each data number is stored in the data name definition table (hereinafter referred to as "DNDT") 573 as shown in FIG. 6.

The file edition unit 58 displays the summary of the documents stored in the memory unit 3 in the window 25 and edits the designated document. Here, the term "edition of document" is a generic term representing updating instruction of the document, its deletion and its printing.

The document edition unit 561 displays the layout of the document for which preparation and updating are instructed by the file edition unit 58 in the window 25 and makes edition of the region on the page. Here, the term "edition of region" is a generic term including novel preparation of data inside the region, such as text and figure, updating instruction, and deletion, movement and reproduction of the region as a whole.

The region edition unit 562 displays the content of the region for which novel preparation and updating are instructed in the document edition unit 561 in the window 25 and makes preparation and edition of the data inside that region. Various edition units exist in the region edition unit 562 in accordance with the kind of data. Namely, they include a text data edition unit, a graphic data edition unit, a figure data edition unit, and the like.

Among the edition units 561 and 562 described above, the edition unit 561 or 562 or the edition units 561 and 562 that can be executed after the start of document preparation are always those edition units 561 and 562 which are in the window of the highest order on the screen surface. In order to have the window 25 at the highest order or in other words, to change over the edition units 561 and 562, the mouse cursor 30 is moved on the window 25 which is displayed and the execution button 311 is pushed down. The change of the superposition sequence of this instructed window 25 is made by the window management unit 52.

The window management unit 52 is equipped with a window management table 521 and opens and closes the window 25 on the screen 21 in accordance with the request from each edition unit 561 or 562, besides the change of the superposition sequence of the window 25. The window 25 which is opened on the screen 21 is managed by the window management table 521 shown in FIG. 7. The window management table 521 consists of window control blocks 5211 (hereinafter referred to as "WCB") that are arranged in accordance with the sequence of window number. The following information are stored in the window control blocks (WCB) 5211.

Window set position and size information 52111

It stores window upper left x coordinates, window upper left y coordinates, lower right x coordinates and lower right y coordinates with the upper left on the screen 21 being the origin.

Window superposition sequence information 52112

It stores information representing in which sequence a plurality of windows 25 are superposed when they are opened on the screen 21.

Window name information 52113

It stores a window name to be displayed in the caption area 251 of the window 25.

Task number 52114

It stores the number of task to which the window 25 is set. Each edition unit 561 or 562 is generated as a task and when the task number is given by the following system control unit 53 when the edition unit 561 or 562 is generated as the task.

Window display image store position information 52115

One window display buffer is prepared for each window 25 and a window display image data is stored therein. The position of the corresponding window display buffer is stored in the store position 52115 of the window display image. This information is used for recovering the display image of the hidden portion below the window 25 when the superposition sequence of the window 25 is changed.

Menu data store position information 52116

It stores the store address of the menu data to be displayed in the menu area 22 the and pull-down menu area 28.

In-use flag information 52117

It stores information representing whether or not the window control block (WCB) 5211 is in used.

The window management unit 52 changes the superposition sequence of the window 25 and opens and closes the window 25 on the basis of the information described above. When changing the superposition sequence, the window management unit 52 requests the system control unit 53 to interrupt the edition unit 56 which has so far been making edition and to start again the edition unit 56 of the instructed window 25 by the task number 52114 described above.

It also requests the input control unit 51 to display the menu corresponding to the window 25 which comes to assume the highest order by the operation of the window 25 described above, in accordance with the menu data store position 52116 described above.

The system control unit 53 makes controls such as the interruption or re-start of the corresponding task on the basis of the request from the window management unit 52 described above. It also generates the corresponding edition unit 56, as the task on the basis of the request from each edition unit 56, invokes the task corresponding to the corresponding edition unit 56 on the basis of the invoke request from each edition unit 56 and makes end processing of the task corresponding to the edition unit 56 on the basis of end request from the edition unit 56.

Figure 8:
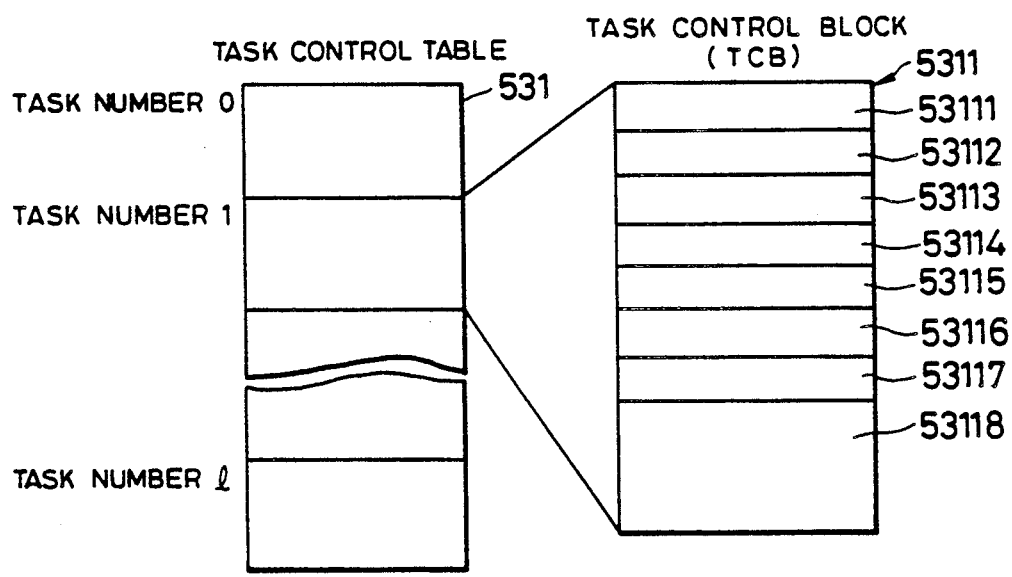
FIG. 8 is the construction view of a task control table.

In order to make information exchangeable between the tasks, the system control unit 53 transmits a message to the corresponding edition unit 56 on the basis of the request from each edition unit 56 and receives the message transmitted from the corresponding edition unit 56. Each task is controlled by a table called "task control table 531" shown in FIG. 8.

The task control table 531 is prepared by arranging task control blocks 5311 (hereinafter referred to as "TCB") in the sequence of task number, and one task control block (TCB) 5311 is allotted to one task. As illustrated below, the task control block (TCB) 5311 stores therein all the information necessary for the start and re-start of the task.

Link field 53111

It is used when the task control block (TCB) 5311 is connected to a list.

Task priority information 53112

It stores priority information at the time of execution of the task.

Program number 53113

It stores the number of program generating the task.

Task status information 53114

It stores information representing under which status the task is at present.

Interruption flag information 53115

It stores information representing that an interruption request exists for the task.

Task start/re-start address information 53116

It stores the start address of the task or the address at the time of interruption.

Stack status information 53117

It stores the stack position when the task is interrupted.

Central processing unit (CPU) status information 53118

It preserves all the contents of the registers when the task is interrupted.

Here, the following task status exist.

Non-Existent status

It represents the status where the program does not exist as the task. At this time, the task number corresponding to corresponding task control block (TCB) 5311 is under the unused state.

Dormant status

It represents the status where the program exists as the task but its execution is inhibited.

Ready status

It represents the status where the program can be executed when the central processing unit (CPU) is allotted to the task. The portion which allots the task to the central processing unit (CPU) is called a "task dispatcher".

Running status

It represents the status where the program of the task is being executed.

Waiting status

It represents the status where the execution of the task is suspended till a certain phenomenon occurs, such as message reception waiting status till reception of message, input/output end waiting status till input/output comes to end.

Figure 9:
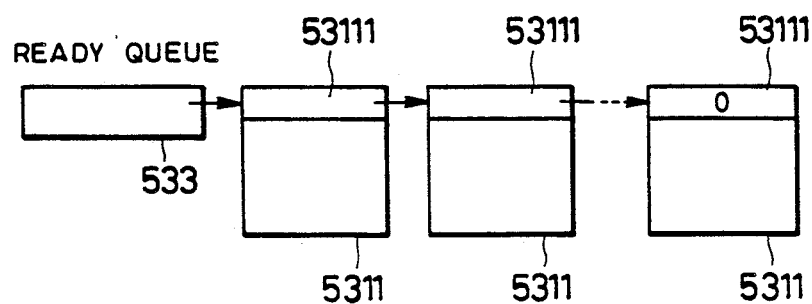
FIG. 9 is an example view of a Ready queue.

As shown in FIG. 9, the task under the Ready status is managed when the corresponding task control block (TCB) 5311, for example, is connected to one list in the sequence of priority (this list is referred to as a "Ready queue".) The header 533 of this Ready queue 533 stores the pointer for the task control block (TCB) corresponding to the Ready status task having the highest priority and the link field 53111 of this the task control block (TCB) stores the pointer for TCB corresponding to the task having the second highest priority.

Similarly, the task control block (TCB) is connected by the pointers in accordance with the sequence of priority, and information representing the final end of the list is stored in the link field of the last the task control block (TCB). The task dispatcher allots the task corresponding to the task control block (TCB) having the highest priority among those which are connected to the Ready queue 533, and lets the central processing unit (CPU) execute it.

The task under the Waiting status is connected to the Ready queue 533 and is started once again from the interruption position of the task by the task dispatcher when the corresponding task control block (TCB) is connected to, and managed by, a list prepared for each of the factors for waiting, and is removed from the list when waiting is released by the occurrence of a certain phenomenon.

Figure 10:
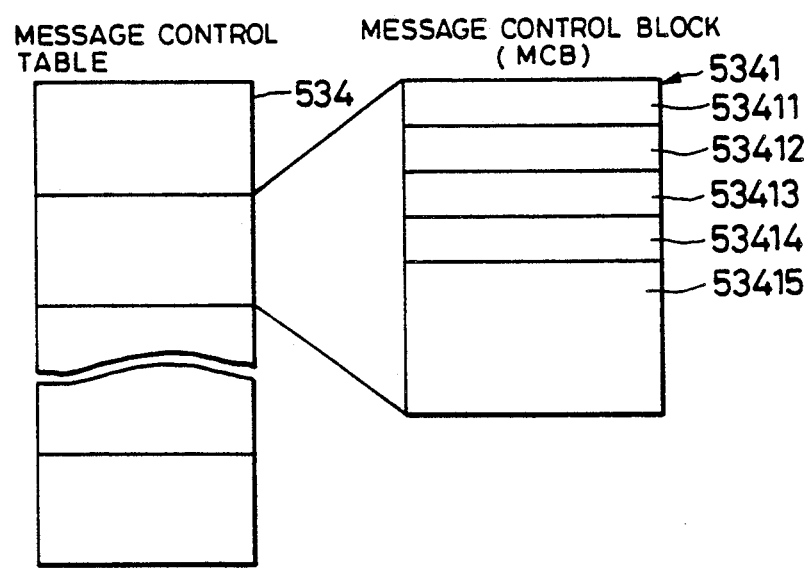
FIG. 10 is the construction view of a message control table.

The message is managed by the message control table 534 as shown in FIG. 10, and the message control table 534 is prepared by arranging message control blocks 5341 (hereinafter referred to as "MCB"). One message control block (MCB) 5341 is allotted to each message. The message control block (MCB) 5341 stores therein, for example, a status 53411 representing whether or not this message control block (MCB) 5341 is used, a transmission side task number 53412, a reception side task number 53413, a message size 53414 and a message buffer 53415 for holding temporarily the transmitted message.

Figure 11:
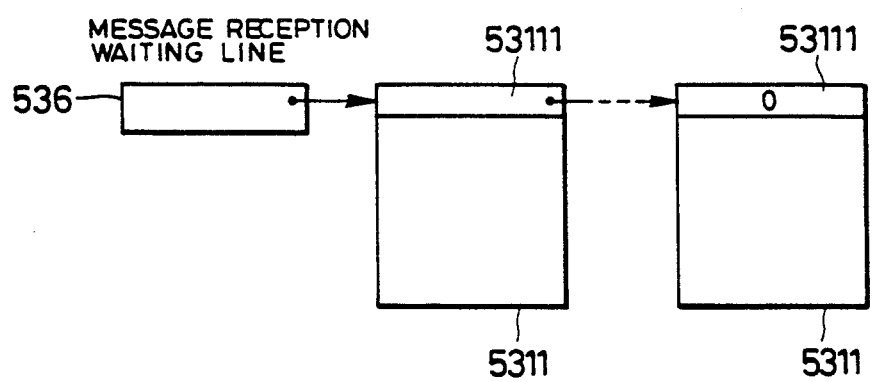
FIG. 11 is an example view of a message reception waiting matrix.

Depending on parameters at the time of message reception request, it can bring the task into the Waiting status till the message is transmitted by removing the task control block (TCB) 5311 corresponding to the task requesting the reception from the Ready queue 533 and connecting it to a message reception waiting line 536 shown in FIG. 11 when the message is not yet transmitted from the counter-part task when the message reception request is raised, and can also deliver merely the notice that the message is not transmitted, to the corresponding task without bringing the task, which requests reception, into the Waiting status.

Figure 12:
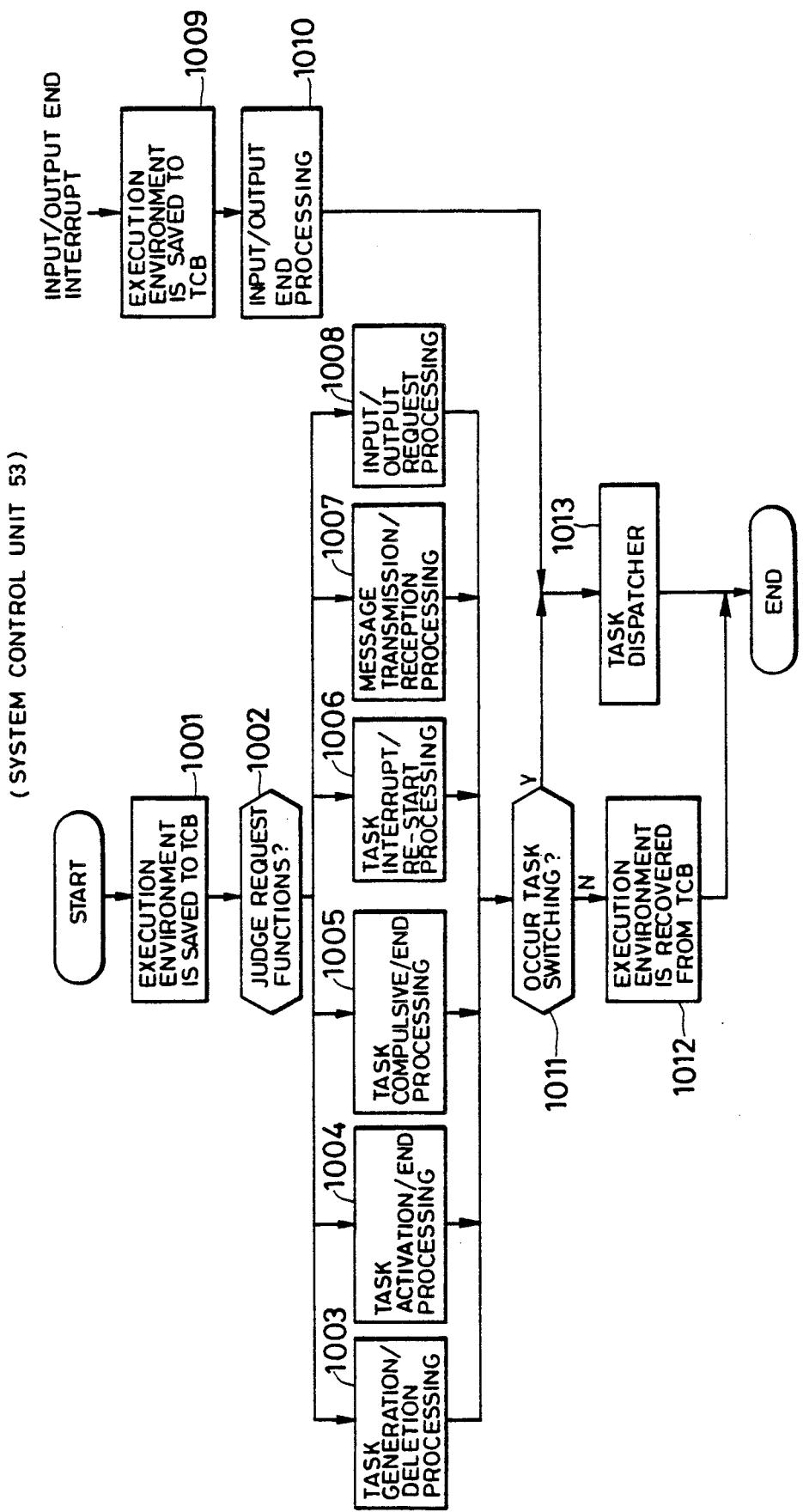
FIG. 12 is the processing chart of a system control unit.

Here, the processing flow of the entire system control unit 53 is shown in FIG. 12. When a processing request is raised from the task to the system control unit 53, the execution environment at the point when the task raises the request is saved to the task control block (TCB) 532 (step 1001). Next, the request functions (1003~1008) are identified and processing corresponding to each function is started (step 1002).

After the processing corresponding to each function is complete, whether or not the task is changed over is judged from the status of the Ready queue 533, for example, (step 1011), and if it is, the task dispatcher 1013 is invoked or activated. If it is not, the execution environment saved at the step 1001 is recovered from the task control block (TCB) 5311 (step 1012), and the task raising the request is started again.

When the input/output end interrupt occurs from the input/output devices, the execution environment at the time of occurrence of interrupt is saved to the task control block (TCB) 5311 (step 1009). After the input/output end processing such as delivering the input character code or the like to the input request task and releasing the waiting of the input task is carried out (step 1010), the task dispatcher 1013 is invoked.

Figure 12A:
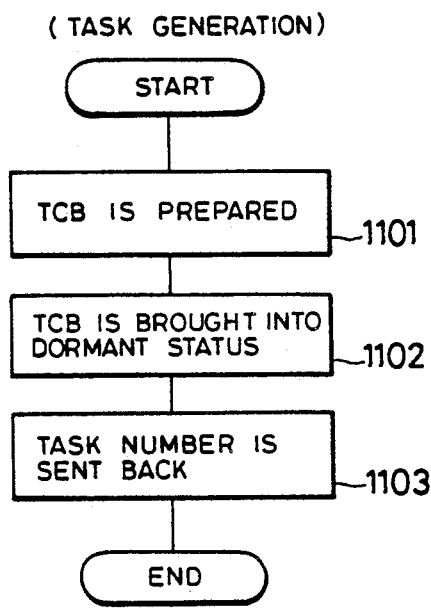
FIG. 12a is the processing chart of a task generation.
Figure 12B:
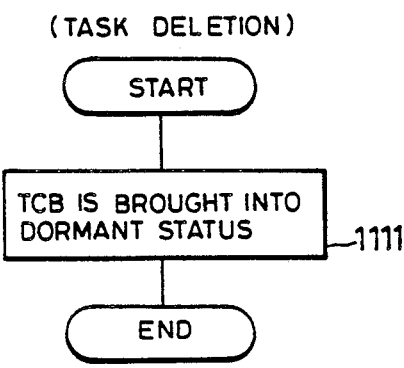
FIG. 12b is the processing chart of a task deletion.
Figure 12C:
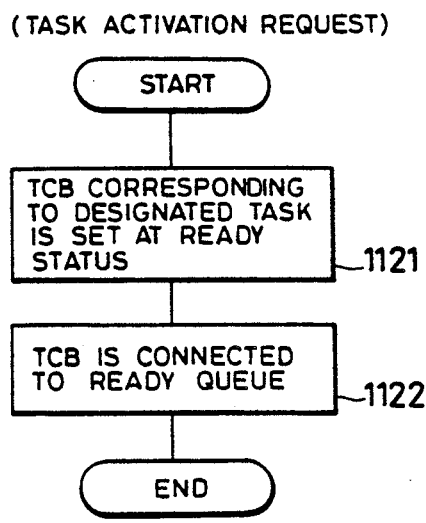
FIG. 12c is the processing chart of a task activation.
Figure 12D:
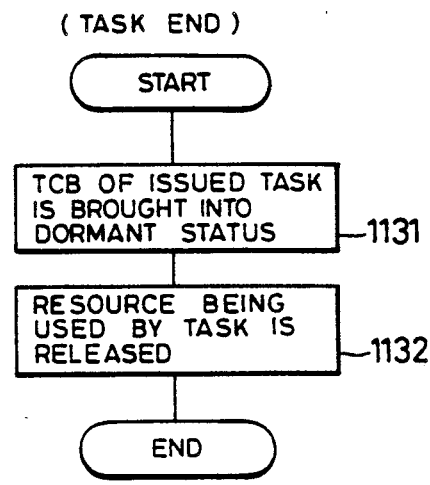
FIG. 12d is the processing chart of a task end.
Figure 12H:
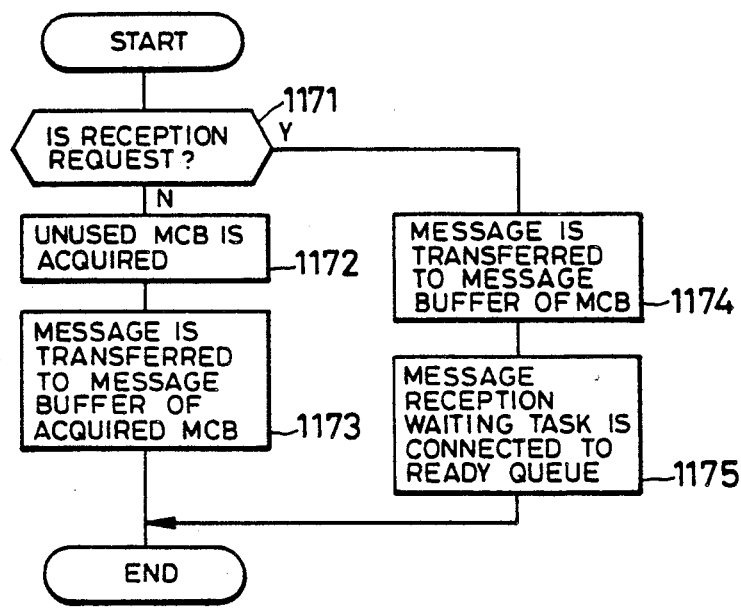
FIG. 12h is the processing chart of a message transmission.
Figure 12I:
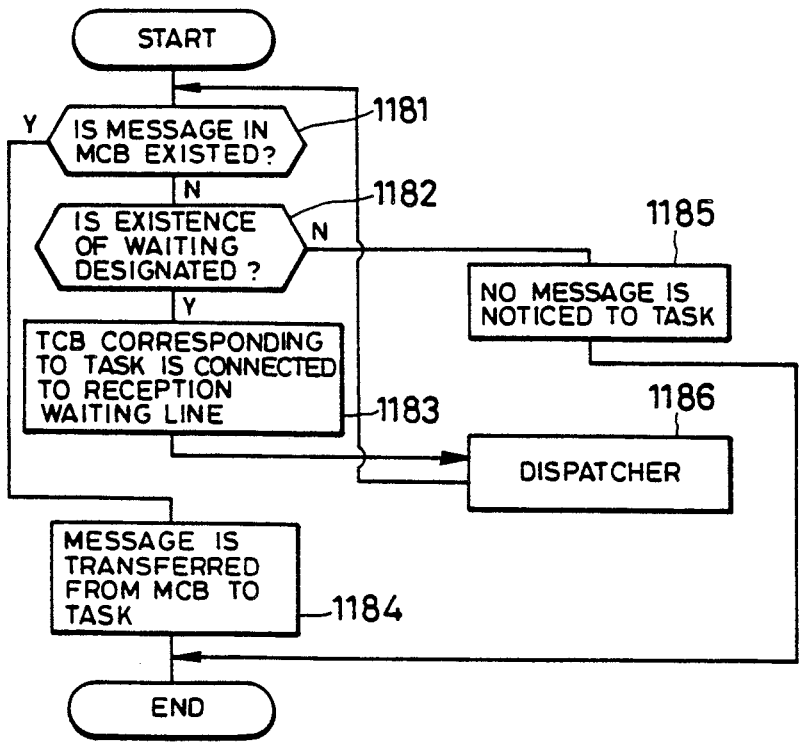
FIG. 12i is the processing chart of a message reception.
Figure 12J:
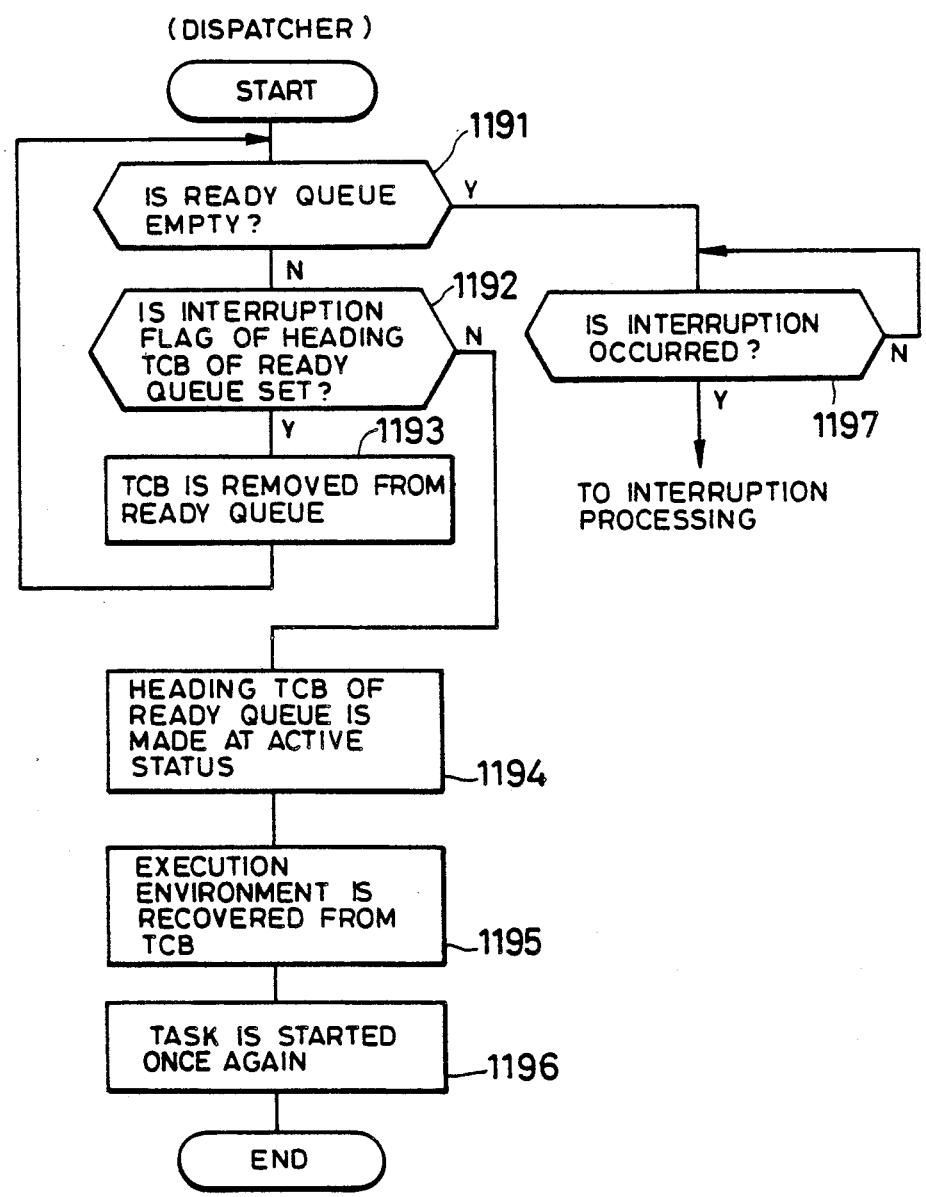
FIG. 12j is the processing chart of a dispatcher.

The task dispatcher 1013 judges whether or not the Ready queue 533 is connected to the task control block (TCB) 5311 as shown in FIG. 12j (step 1191) and makes indefinite loop until an interrupt is generated, if it is not connected (step 1197). If it is connected, the task dispatcher 1013 acquires the task control block (TCB) having the highest priority from the pointer stored in the header 533 of the Ready queue 533 and judges whether or not the interrupt request is made from the interrupt flag information 53115 of this task control block (TCB) (step 1192).

If the interrupt request exists, the pointer is updated and this task control block (TCB) is removed from the Ready queue 533 (step 1193) and processing is executed once again from the step 1191. If there is no interrupt request, this task control block (TCB) is set into the Active status (step 1194), the execution environment is recovered from this task control block (TCB) (step 1195) and the corresponding task is started again (step 1196).

The functions required for the system control unit 53 include, for example, the task generation/delete processing (1003), the task invoke/end processing (1004), the task compulsive end processing (1005), the task interrupt/re-start processing (1006), the message transmission/reception function between the tasks (1007) and the input/output request processing (1008).

The input/output request processing 1008 accepts the input/output request for the keyboard or the display device 2 from the tasks, brings the requesting task into the Waiting status till the input/output operation is completed and shifts the task under the Waiting status to the Ready status at the end of the input/output operation. Other processing flows are shown in FIGS. 12a to 12j. Incidentally, the detail of each flow will be described later.

The input control unit 51 delivers the character code inputted from the keyboard or coordinates values inputted from the mouse 31 to the task, notifies the designated icon to the system management unit 57 in accordance with the area inside the screen 21 designated by the mouse, notifies the designated menu to the task, and generates the change-over request instruction of the designated window 25 to the window management unit 52.

Figure 13:
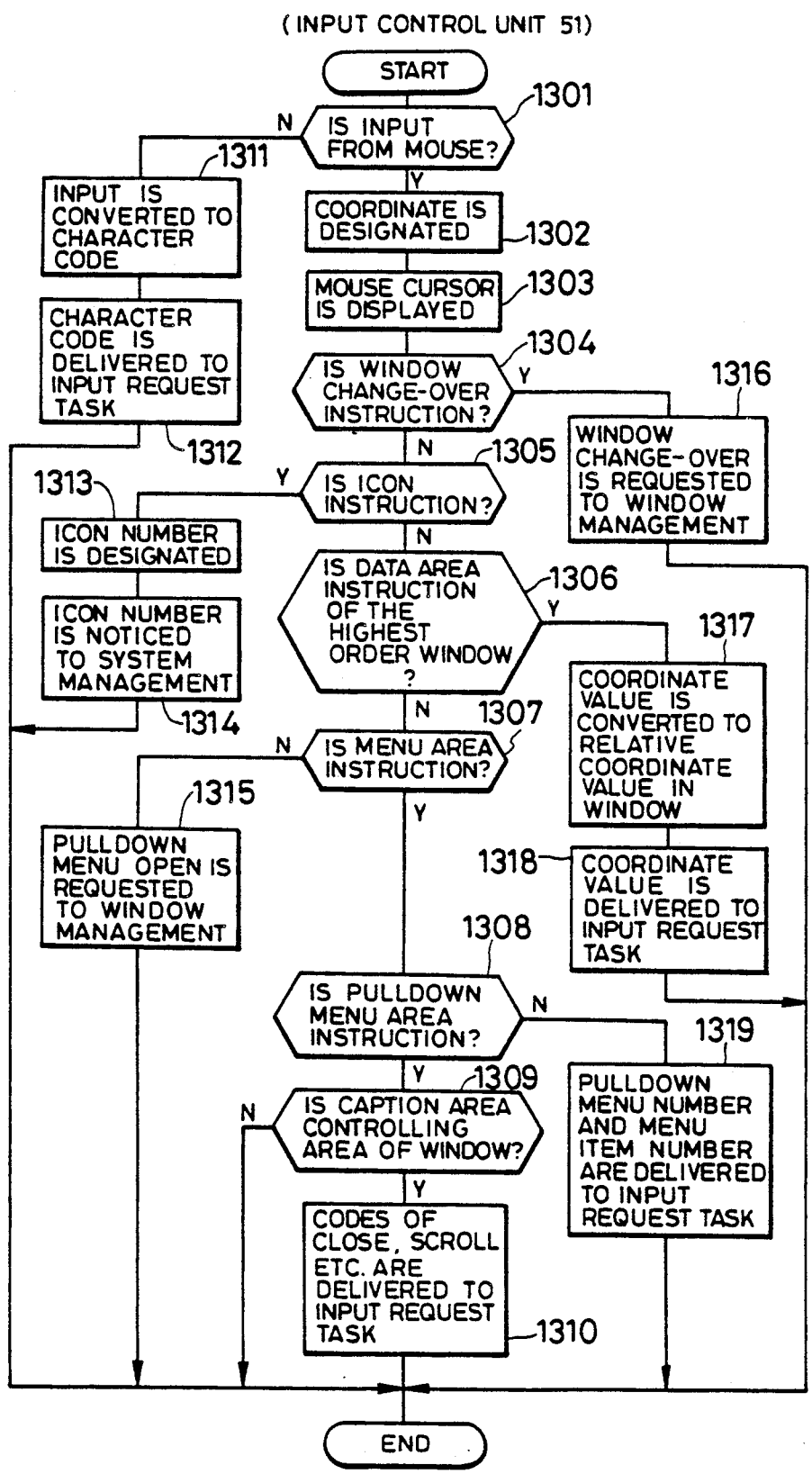
FIG. 13 is the processing chart of an input control unit.

First of all, the input control unit 51 analyzes the input data from the input unit 1 at the step 1301 as shown in FIG. 13 and judges whether or not it is the input from the mouse 31. If it is not the input from the mouse 31, the input control unit 51 acquires the character code corresponding to the depressed key (step 1311) and delivers the acquired character code to the input request task (step 1312).

For example, if the operator depresses the character key "か" on the keyboard, the input control unit 51 delivers the character code of "か" to the input request task.

If the input is judged as the input from the mouse 31 at the step 1301, the coordinates are calculated in order to examine which position on the screen 21 the operator designates (step 1302) and displays the mouse cursor 30 to the mouse movement position (step 1303).

If the designation of the operator is found to be inside the window 25 which is not the highest order as a result of step 1302, the input control unit 51 judges it as the window change-over instruction (step 1304) and requests the window management unit 52 to change over the window 25 (step 1316).

If the instruction of the operator is the icon region 24 (step 1305), the input control unit 51 judges which icon is designated and after acquiring the icon number (step 1313), it notifies the acquired icon number to the system management unit 57.

Furthermore, the system management unit 57 calculates the program corresponding to the notified icon from the icon management table 571, generates this program as the task and requests this task generation and invoke to the system control unit 53 in order to invoke this task.

If the operation object inside the window 25 having the highest order is designated (step 1306), it converts the designated coordinate values to the relative coordinate value inside the window 25 from the coordintes on the screen 21 (step 1317) and delivers this coordinate value to the task requesting its input (step 1318).

If the instruction of the operator is the menu area 22 (step 1307), it requests the window management unit 52 to open the pull-down menu (step 1315). If the instruction of the operator is the pull-down menu area 28 (step 1308), it judges which function item is designated and delivers the designated function item number and the pull-down menu number to the task requesting the input (step 1319).

If the instruction of the operator is the control area 253 inside the window 25 or the caption area 251 (step 1309), it delivers the codes of close, scroll and the like to the task requesting the input (step 1310). It does nothing if other areas are designated. When the code is delivered to the input request task in the procedures described above, the system control unit 53 shifts the input request task from the Waiting status to the Ready status.

Figure 14:
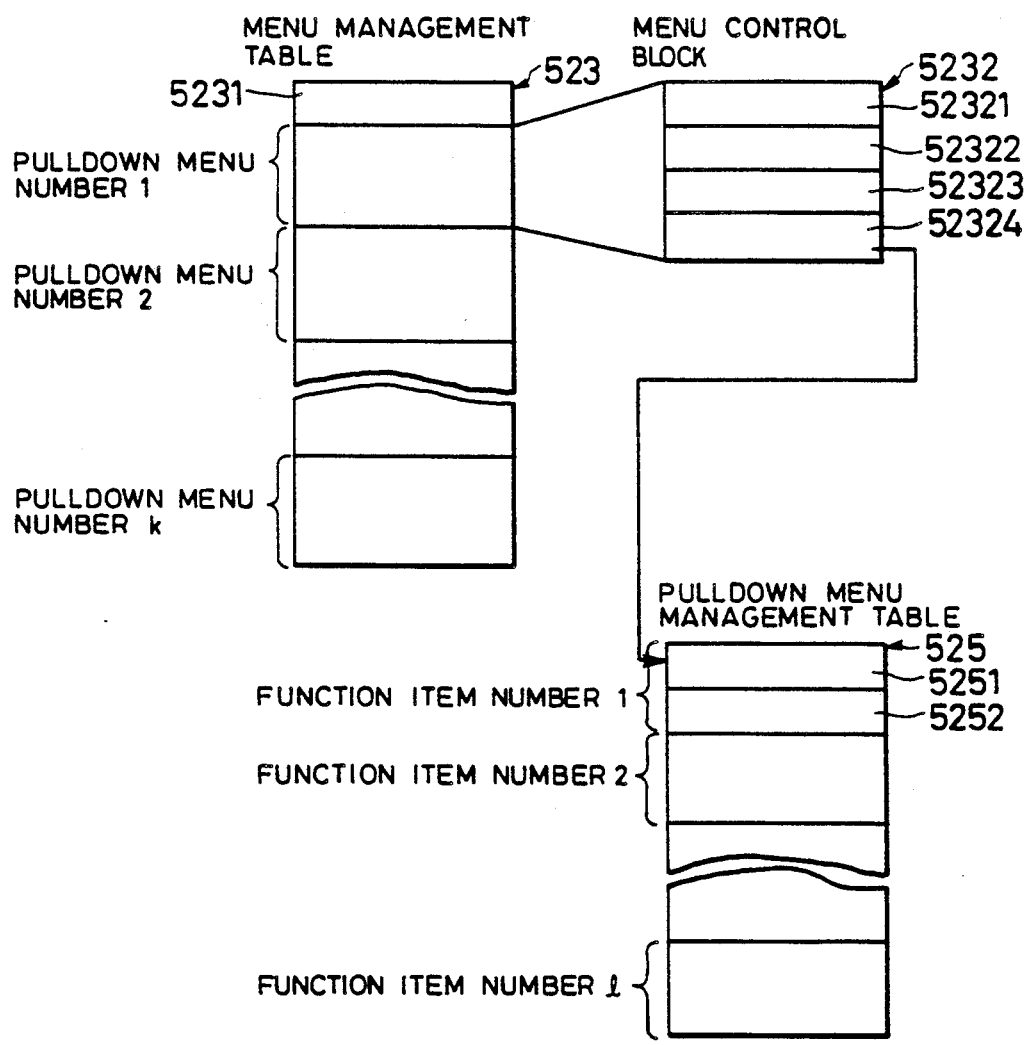
FIG. 14 is the construction view of a menu management table and a pull-down menu table and their association.

The menu is managed by the menu management table 523 and the pull-down menu management table 525 shown in FIG. 14. The menu management table 523 stores therein the pull-down menu number 5231 and in succession, the menu management blocks 5232 in the number equal to that of the pull-down menus in the sequence of the pull-down menu number 5231. The menu management block 5232 stores therein the pull-down menu name 52321, the maximum character number of function item 52322, the function item number 52323 and the pointer 52324 to the pull-down menu management table 525.

The pull-down menu management table 525 stores therein the function item name 5251 and the effective/ineffective flag 5252 representing whether or not the function item 52322 is effective in the number equal to that of function items in the sequence of the function item number 52322.

If the request from the window management exists, the input control unit 51 displays the pull-down name of the window 25 which is to take the highest order when the window 25 is open or at the time of change-over on the basis of the information described above, in the menu area 22. If the pull-down name is designated by the mouse 31, it acquires the function item name 5251 from the corresponding pull-down menu management table 525 and displays it as the ordinary display if the function item 52322 is effective and as the half-luminance display if the latter is ineffective, in the menu area 28.

The print control unit 54 is disposed in order to control the print unit 4 on the basis of the print request of documents from the edition unit 56. The display control unit 55 is disposed to write the display data of only those portions, which can be developed inside the window 25 of the highest order, into the memory for displaying on the display unit 2 in accordance with the display request from the edition unit 56 and from the window management unit 52 on the basis of the superposition sequence information of the window management blocks 5211, in the dot unit.

Preparation and edition of the documents in the Japanese word processor of this embodiment of the present invention are conducted in the following way.

First of all, the start of novel preparation of the documents or the start of edition of the documents that have already been prepared is made when the operator designates the corresponding icon by the mouse 31.

Figure 18:
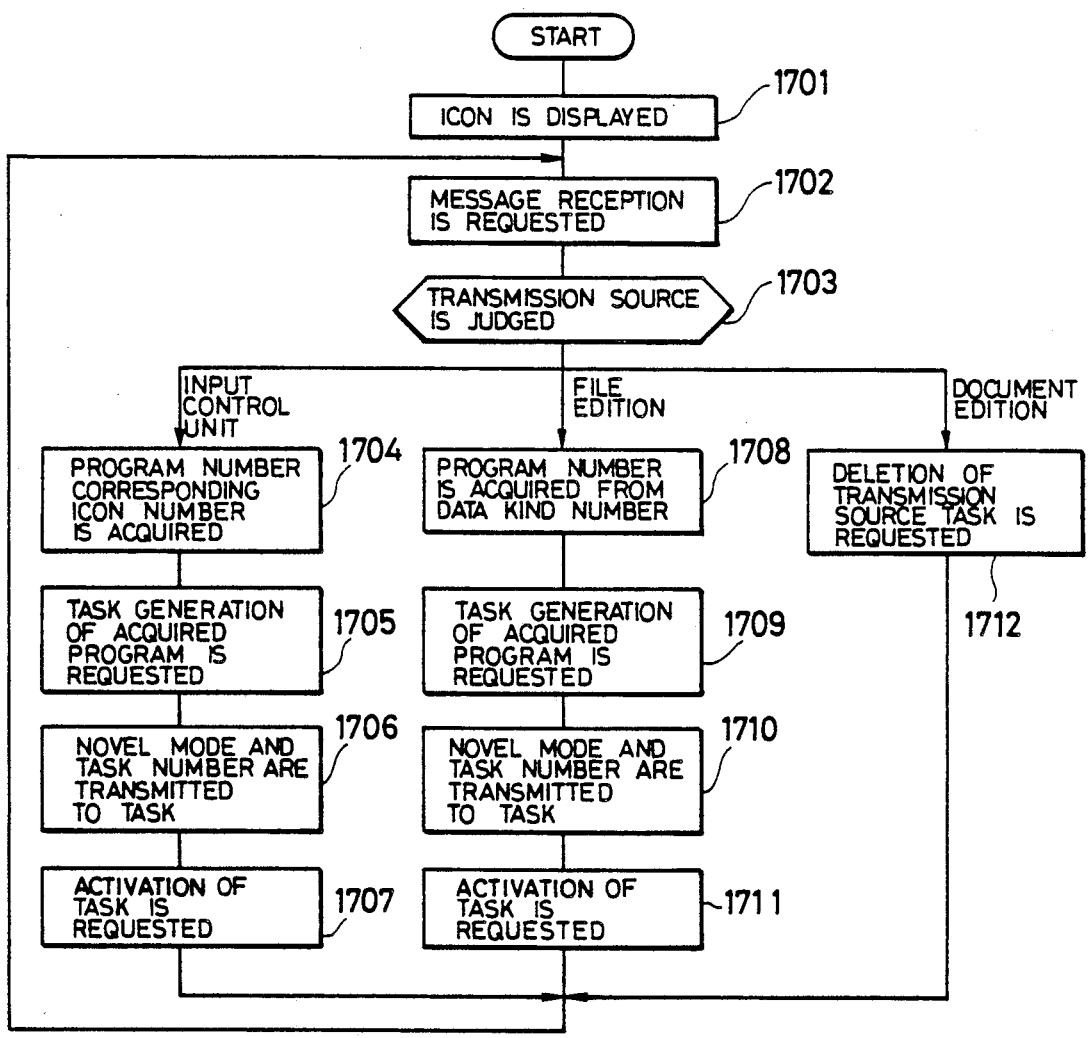
FIG. 18 is the processing chart of a system management unit.

The input control unit 51 judges which icon is designated from the screen instruction coordinates in response to the instruction from the operator and notifies the icon number to the system management unit 57. On the other hand, under the initial state, the system management unit 57 displays the icon (step 1701), requests reception of the message (step 1702), judges from which the message is transmitted (step 1703) if the message is received, acquires the program number corresponding to the designated icon (step 1704) on the basis of the icon management table 571 if the message is from the input control unit 51, and generratres and invokes the corresponding edition unit 56 as the task (step 1705) as shown in the flow-chart of FIG. 18.

As shown in the processing flow of FIGS. 12a and 12c, this task generation and invoke is made in the following way. Namely, when the system management unit 57 first raises the task generation request on the program number to the system control unit 53, the system control unit 53 acquires the unused task number from the task management table 531 on the basis of the request, prepares corresponding the control block (TCB) (step 1101), brings the task into the Dormant status (step 1102) and sends back the acquired task number to the requesting party (step 1103).

Next, when the system management unit 57 makes the task activation request in accordance with the task number described above, the system control unit 53 sets the task control block (TCB) corresponding to the designated task number to the Ready status (step 1121), and connects it to the Ready queue 533 so that this edition unit 56 is under the executable status (step 1122).

The notification described above is carried out by transmission and reception of the message through the system control unit 53.

If the message is transmitted from the input control unit 51 to the system management unit 57 as described above, for example, the input control unit 51 first raises the message transmission request directed to the system management unit 57 to the system control unit 53 (step 1706).

Upon receiving this message transmission request, the system control unit 53 judges whether or not the reception request is arrived from the system management unit 57 from the message control table 534 (step 1711) as shown in FIG. 12h, transfers the transmission message to the message buffer of corresponding message control block (MCB) if the message reception request exists (step 1174), and removes the reception waiting task, that is, the task control block (TCB) of the system management unit 57, from the message waiting line and connects it to the Ready queue 533 (step 1175).

If the reception request does not yet exist, the system control unit 53 acquires the unused message control block (MCB) (step 1174) and transfers the message to the message buffer of this message control block (MCB) (step 1173).

On the other hand, if the system management unit 57 makes the message reception request to the system control unit 53, the system control unit 53 judges whether or not the mesage for the system management unit 57 exists in the message contrl block (MCB) (step 1181) as shown in FIG. 12i, takes out the message from the message control block (MCB) if it exists and transfers the message to the system management unit 57 as the requesting unit (step 1184).

If the message does not exist in the message control block (MCB), it judges whether the task generating this macro makes the request while designating the existence of waiting (step 1182), and lets the task know that no message exists and finishes the processing in the case of the non-existence of waiting (step 1185).

In the case of the existence of waiting, on the other hand, it acquires the unused message control block (MCB), removes the task control block (TCB) of this task from the Ready queue 533, connects it to the message reception waiting line and moves the control to the dispatcher (steps 1183, 1186).

Therefore, since the task that is under the reception waiting state is connected to the Ready queue 533 when the message is transferred to the message control block (MCB) by the message transmission request, this task is started once again, the processing is again executed from the message reception processing and the content of the message control block (MCB) (message) is received by this task.

Accordingly, if the instruction from the operator is the novel preparation of the document, the system management unit 57 actuates the document edition unit 561 and if the instruction is the edition of the document that has already been prepared, the system management unit 57 actuates the file edition unit 58.

Figure 19:
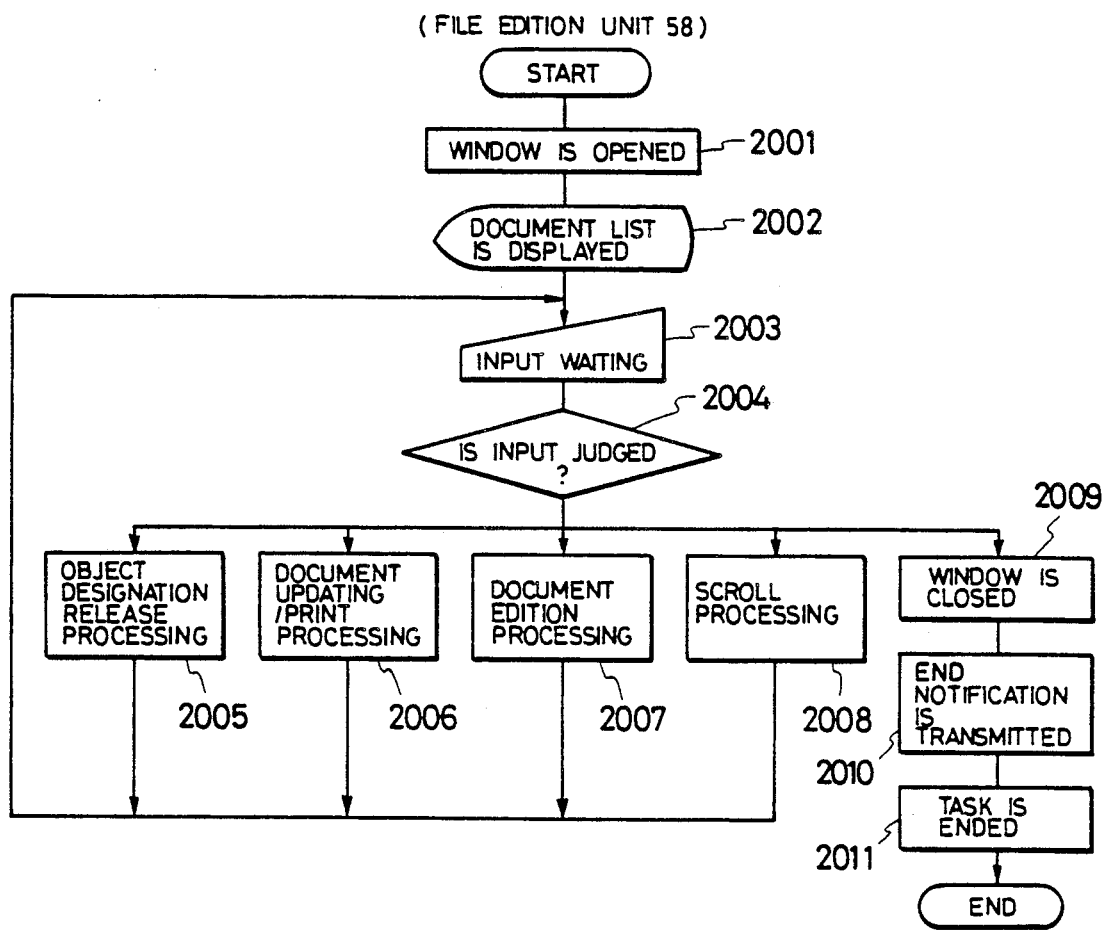
FIG. 19 is the processing chart of a file edition unit.

Next, the processing content of the file edition unit 58 will be explained with reference to the flowchart of FIG. 19. The file edition unit 58 first opens the window 25 (step 2001) and displays the directory of the documents stored in the memory unit 3 on the window (step 2002). After this display operation, the file edition unit 58 requests the input to the input control unit 51 (step 2003) and judges the content of the input if it exists (step 2004).

Figure 20:
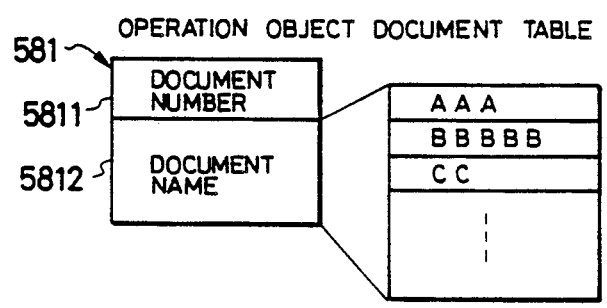
FIG. 20 is the construction view of an operation object document table.

When the input from the operator is the designation of the documents to be operated, the file edition unit 58 judges which document is designated and registers the document name in the operation object document table 581 shown in FIG. 20 (step 2005). Incidentally, the operation object document table 581 consists of the designated document number 5811 and the designated document name 5812.

If the designation is that of updating and print, the file edition unit 58 notifies to the system control unit 57 that the designation of updating and print is made, together with the document name designated as the object at present and the data kind number corresponding to the document (step 2006) and if the designation is the edition designation such as copy, delete, etc., of the document, it executes the processing of copy, delete, etc., of the document designated as the object (step 2007).

If the designation is the scroll designation, the file edition unit 58 makes scroll display of the directory of the document names (step 2008) and if it is the end designation, the file edition unit 58 notifies the system management unit 57 that the file edition processing is complete (step 2010), and requests the end of the task (step 2011).

Receiving this end request, the system control unit 53 brings the task control block (TCB) of the requesting task to the Dormant status (step 1131) and releases the resources that are used by the task. Here, the term "resource" represents a memory, a central processing unit (CPU), and the like.

Figure 15:
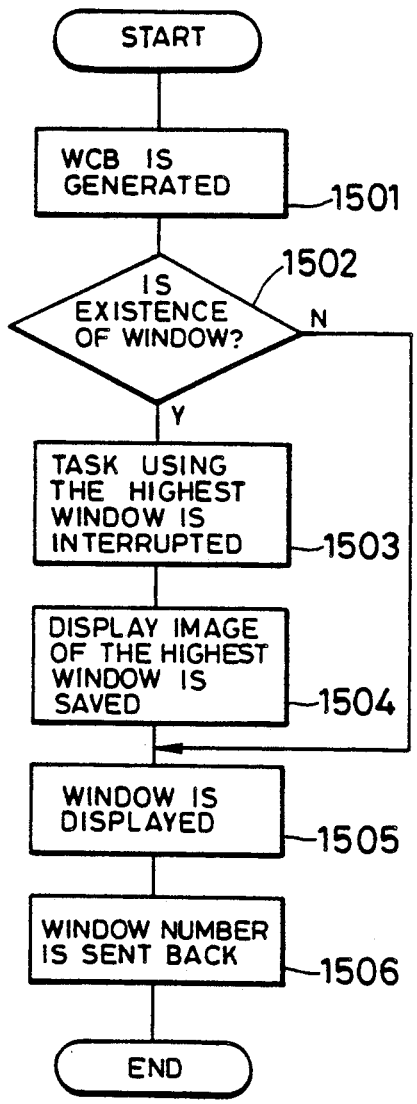
FIG. 15 is the processing chart of a window open.
Figure 16:
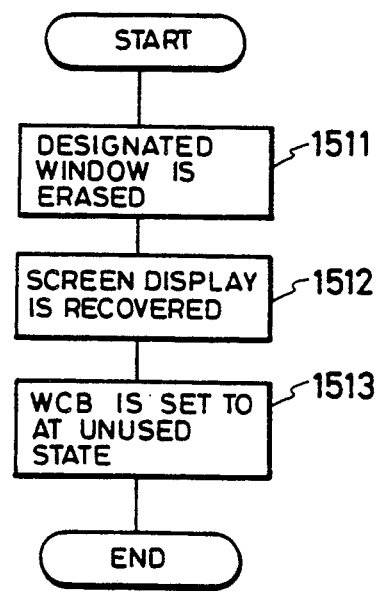
FIG. 16 is the processing chart of a window close.

The window open/close processing described above is executed in the afore-mentioned window management unit 52, and its processing content will be explained with reference to the flow-charts of FIGS. 15 and 16.

In the case of window open, first of all, the window management unit 52 generates the window control block (WCB) 5211 on the basis of the information designated from the task (step 1501). In this case, it judges whether or not the window 25 has already existed (step 1502), and if it does, the window management unit 52 interrupts once the task using the window 25 which is of the highest order at present (step 1503), and saves the display image of the highest order window to the display buffer (step 1504). It then displays the window 25 at the position and in size designated by the task (step 1505) and sends back the number of the generated window management block to the requesting task (step 1506).

On the other hand, in the case of the window close, the window management unit 52 erases the image of the designated window 25 (step 1511), calculates the window 25 that is hidden by the window 25 as the object of close from the window management table 521, takes out the display image from the display buffer described above, recovers the display image of the window 25 which has a lower order to the erased window (step 1512) and sets the window control block (WCB) 5211 of the erased window to the unused state (step 1513).

Incidentally, the task interruption processing described above will be described elsewhere.

As described above, if the request from the operator is the novel preparation, the system management unit 57 generates the document edition unit 561 as the task on the basis of notification from the input control unit 51

(step 1705) and then invoke its operation in the novel preparation mode (step 1707).

If the request is updating of the document that has already been prepared, it acquires the corresponding program number from the data kind number by notification from the file edition unit 58 and from the program control table 572 (FIG. 5; step 1708), generates the document edition unit 561 as the task (step 1709), transmits the actuation parameters for the edition unit 56 (step 1710) and invokes the document edition unit 561 in the updating mode (step 1711).

Receiving the end notification from the edition unit 56 that is generated and invoked by itself, the system management unit 57 deletes the task (step 1712). Task deletion is processed by the system control unit 53 in the same way as in the case of the generation request described above, and the system control unit 53 sets the task control block (TCB) corresponding to the designated task to the Non-Existent status (step 1111) as shown in FIG. 12b. In other words, it brings this task control block (TCB) into the unused status.

When the document edition unit 561 is invoked, the system management unit 57 transmits the above-mentioned mode and the generated task number as the invoke parameters to the document edition unit 561 by the message. In the case of the updating mode, the system management unit 57 transmits also the updating object document name notified from the file edition unit 58.

The processing of the document edition unit 561 thus invoked will be explained with reference to the flow-charts of FIGS. 21 and 22a to 22l.

First of all, in the initial processing (step 3001), the document edition unit 561 receives the invoke parameters by the message as shown in detail in FIG. 22a (step 3101) and judges whether the invoke mode is novel preparation or document updating on the basis of the parameters (step 3102).

In the case of the novel preparation, it initializes the document data (step 3103) and in the case of the document updating, it calls out the data as the object of updating from the memory unit 3 in accordance with the document name designated by the parameters (step 3104).

Incidentally, the structure of the document data will be described elsewhere. Then, it prepares a support region edition unit management table (hereinafter referred to as "SFMT") showing the directory of the region edition units 562 for which novel preparation and updating of regions can be made in the document, from the program control table (FIG. 5).

As shown in FIG. 27, the support region (frame) edition unit management table (SFMT) holds, as a pair, the program number 5682 of the region edition unit 562 which can be supported and the kind number 5683 of the data which can be prepared by this region edition unit 562, and also holds the region edition unit number 5681 described above.

It sets simultaneously the name of the data for the region edition unit 562 into the pull-down menu data in order to let the operator know that the region for which data can now be prepared (step 3105).

When editing the region to be described next, the document edition unit 561 clears to zero the designated region number of the operation object region table (FIG. 28) representing which region is the operation object (step 3106) and subsequently initializes the effective/ineffective state of the pull-down menu data (step 3107).

Incidentally, the operation object region table holds the designated region number 5684 which is designated as the object of the present operation, the kind 5685 of the designated region and the number of the designated region 5686 as shown in FIG. 28. (The kind of regions will be describd later.) Change-over of this pull-down menu data effective/ineffective operation will be described later.

Figure 31A:
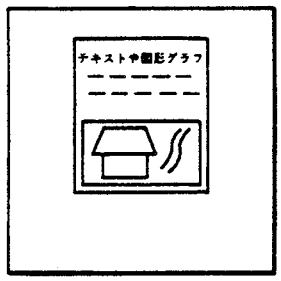
FIG. 31a, FIG. 31b, FIG. 31c, FIG. 31d and FIG. 31e is respectively an example of the screen change in the document edition operation when the present invention is used.

Subsequently, the document edition unit 561 opens the window 25 (step 3108) and displays the layout of the first page of the edition document in that window 25 as shown in FIG. 31a (step 3108). Incidentally, when the window 25 is opened, the window size corresponds to the size of the paper for display and the task number of the document edition unit 561 is added to part of the title of the window 25.

Processings of the support region edition unit management table (SFMT) and menu data preparation (step 3105 in FIG. 22a) will be described in further detail.

As shown in FIG. 27, the support region edition unit management table (SFMT) is, for the document edition unit 561, a table showing the directory of the program number 5682 of the region edition units 561 that can be invoked and the data kind number 5683 and is used in order to know whether or not the corresponding program exists in the later-appearing novel preparation, updating and layout display of the region and also as the parameter when it is generated as the task.

Its preparation method is as follows. First of all, as shown in FIG. 22b, the program number P and the registration number E are cleared to zero (steps 3111, 3112) and whether or not the mother program number coincides with the program number of the document edition unit 561 itself is judged sequentially from the leading block of the program control table 572 (FIG. 5; step 3114).

If they coincide, the mother program number is regarded as the program control block (PCB) 5721 for the region edition unit 562 that the document edition unit 561 can invoke, and the program number P and the kind number $D_p$ set into this program control block (PCB) 5721 are registered to SFMT (step 3115).

Figure 23:
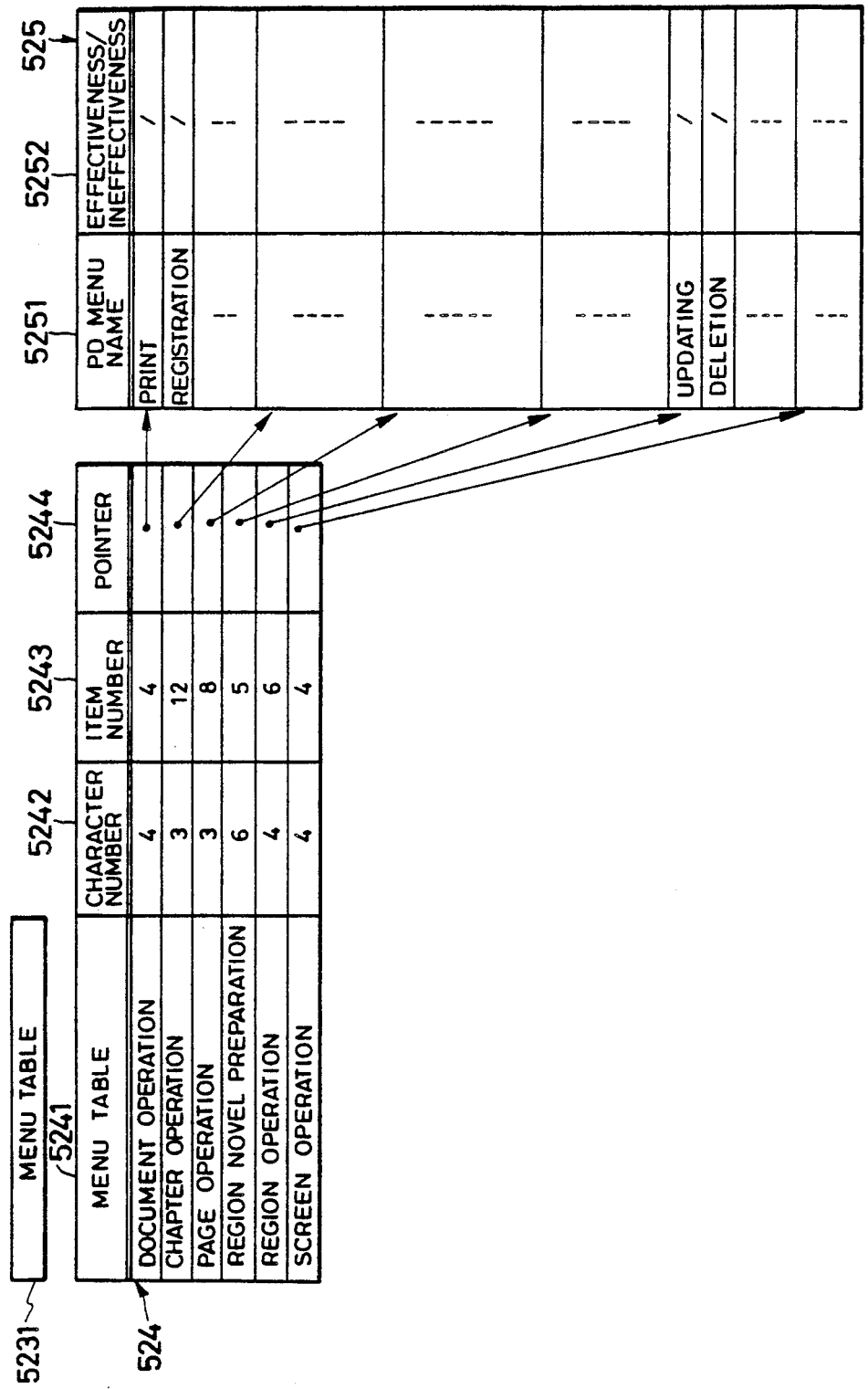
FIG. 23 is the construction view of the menu table of the document edition unit.

The data name corresponding to this data kind number (e.g. "figure", "graph", etc.) is acquired from the data name definition table (DNDT) (FIG. 6) and its name is registered as the nam of the pull-down menu data for novel region preparation inside the menu data (FIG. 23) of the document edition unit 561 of its own (step 3116) and the registration number E is incremented (step 3117). The procedures described above are repeated in the number corresponding to the number of program control blocks 5721 (steps 3118, 3113) and finally, the registration number E is set to the region edition unit number 5681 (step 3119).

In this manner, it is possible to display, as the pull-down menu, only the name relating to the region edition unit 562 incorporated actually in the system at present.

Here, the structure of the document data will be explained with reference to FIG. 24a.

Figure 24A:
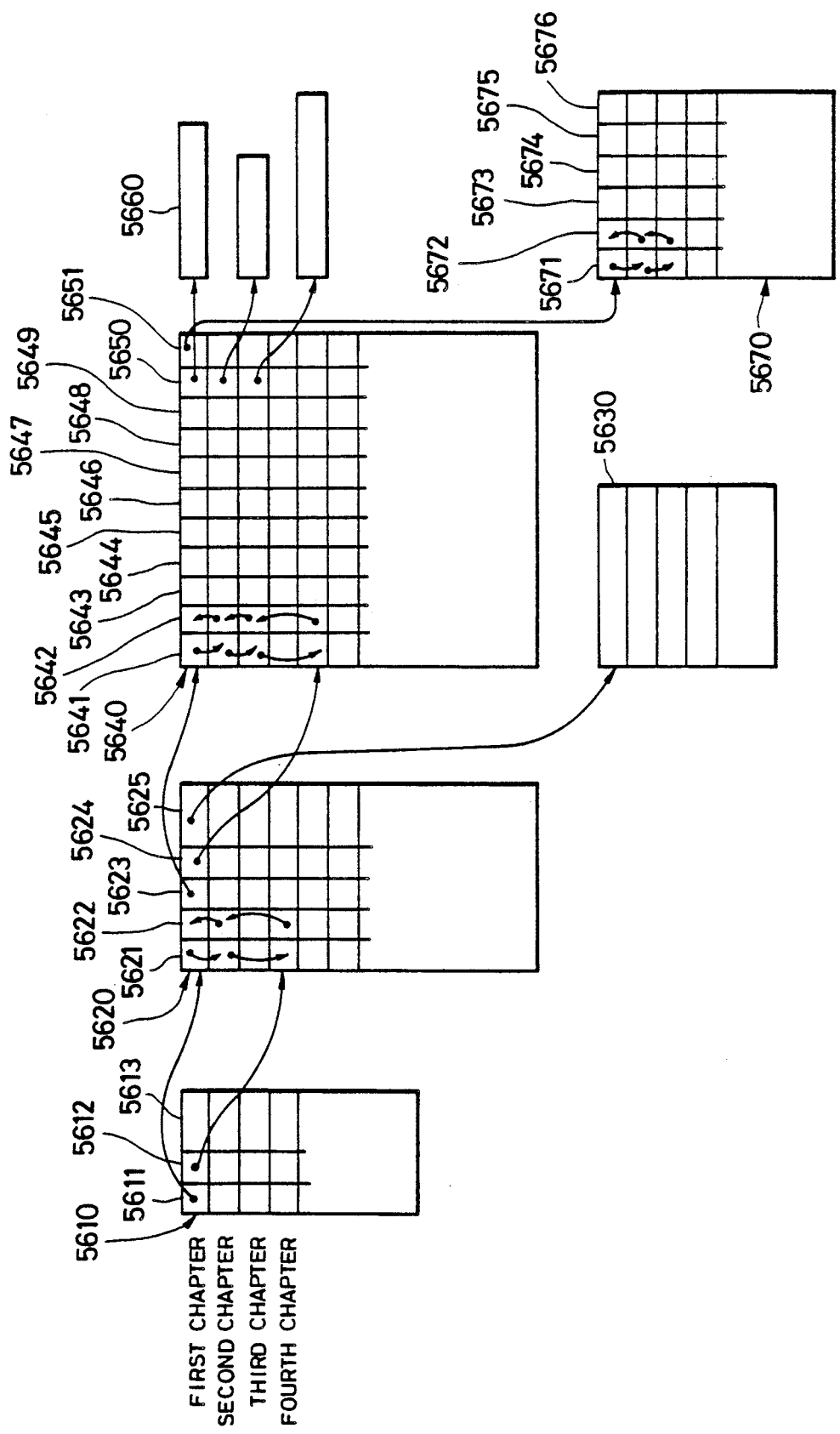
FIG. 24a is the construction view of document data.

As shown in FIG. 24a, the document data consists of a chapter management table 5610, a page management table 5620, a page format table 5630, a region management table 5640, an exclusive region management table 5670 and an inside-region data 5660 and each of these blocks consists of a plurality of blocks. Hereinafter, each table will be described.

Chapter management table 561

It manages how many chapters constitute the document as a whole and has page pointers 5611, 5612 representing the heading/ending pages for each chapter. The chapter management table 5610 holds print information for displaying and printing header, footer, etc., for each chapter.

Page management table 5620

It has region pointers 5623, 5624 representing the heading/ending regions inside the region set inside a page and a page format pointer 5625 representing which format data is used on each page. Each block is linked in the sequence of page number by rear and front pointers 5621, 5622 and among them, the heading/ending pages are pointed by the chapter management table 5610 described already.

Incidentally, the page in this document data has a structure such as shown in FIG. 25 (with reference numeral 5691 representing the page). Among them, the size and blanks of the page 5691 are controlled by the later-appearing page format table 5630 and the basic region 5692 and the internal region 5693 are managed by the later-appearing region management table 5640.

Page format table 5630

As the format of the document that is being prepared, the page format table 5630 manages the size of paper (A3, A4, etc.), the direction of paper (longitudinal or transverse), the direction of characters (lateral writing or vertical writing), the number of column settings, the column space and vertical and horizontal margins.

Region management table 5640

The region management table 5640 manages at which position inside the page and in which size the data to be stored in the document (page) such as the text data, the figure data or the graphic data is stored.

Therefore, the region management table 5640 has the region left upward x coordinates 5643, the region left upward y coordinates 5644, the region right downward coordinates 5645 and the region left downward coordinates 5646 with the left upward portion other than the blank portion of the page as the region set position inside the page, and further has the data kind 5647 representing the kind of data inside the region the region attribute 5648 representing the attribute of the region itself, the data pointer 5650 for pointing the region internal data 5660 and the exclusive region pointer 5651 for representing the position of the exclusive region inside the page.

The attributes 5648 of the region itself includes the attribute representing whether the region is transparent or opaque (if the region is opaque, the lower region covered with the opaque region is not visible), the line kinds of the region frame and exclusiveness (which will be described later).

The exclusive region pointer 5651 is effective only when the corresponding region is the later-appearing basic region 5692 and when the exclusive region exists inside the basic region 5692, it points the corresponding exclusive region management block. In order to make management in which sequence the regions inside the same page continue, mutual link is established by the rear pointer 5641 and the forward pointer 5642.

This link is regions is made in the sequence of from the region having lower priority to the region having higher priority, that is, from the lowermost region inside the page to the uppermost region. Among them, the leading/trailing regions are pointed by the aforementioned page management table 5670 has the status information 5649 representing whether the corresponding region is now being edited or not and whether or not the region edition unit 562 corresponding to the region data kind exists at present inside the system.

The regions existing inside the page can be classified broadly into the following two groups.

(i) Internal region 5693

This internal region 5693 exists on the basic region 5692 and its position and size are determined by the operation of the operator. This internal region 5693 stores one of various kinds such as the text, the figure, the graph, the image, and the like. Edition of this internal region 5693 makes it possible to conduct all the region editions such as the region novel preparation, updating, movement, copy, deletion, size change, attribute change, and so forth. One of the attributes that the internal region 5693 can have is exclusiveness.

This is the attribute for preventing the text data stored inside the basic region 5692 which is described next inside the same page from overlapping with the internal region 5693 from the aspect of layout of page. Exclusiveness includes Yes/No and if Yes is designated, it is possible to select only one of the full page, full text-lines, heading part of text-line, ending part of text-line and region as the exclusive mode.

The text data inputted into the basic region 5692 inside the same page are arranged as shown in FIG. 33c(a)~(e) when lateral writing is designated as the direction of characters inside the page and as shown in FIG. 33c(f)~(j) when vertical writing is designated in accordance with the mode described above. (The method of arrangement of the text data inside the basic region 5692 will be described later).

Incidentally, the hatched portion inside the drawing represents the exclusive area for excluding the text data inside the basic region 5692. Though the attribute that the internal region 5693 can have can be designated when the internal region 5693 is set, it is also possible to designate the internal region 5693 after it is set and to change its attribute by the attribute change function.

(ii) Basic region 5692

This basic region 5692 represents the portion of the page other than the upper and lower and right and left blank portions When the page is generated by the operation of the operator, one basic region 5692 is generated. This is always the leading (lower-most) region inside the page. This basic region 5692 stores only such text data which become the body text inside the document. Edition of this basic region 5692 enables the region novel preparation and updating among the editions of the regions described above.

Therefore, the edition operations of this basic region 5692 such as movement, copy, deletion, etc. is carried out by the edition operation of the page such as page movement, copy, deletion, etc. The text data that are described in the basic region 5692 are stored sequentially from the leading page in each chapter and when the characters overflow due to the input and edition of the text, they are stored successively into the basic region 5692 of the next page.

Furthermore, when the chapters are different, the text data described above are managed as separate region data, respectively. Therefore, if the characters overflow from a page as described above and if the succeeding page is another chapter, one page is added between the page into which the text is being inputted at present and the next page, that is, to the end of the chapter that is being prepared at present, so that the overflowing data can be stored in the newly added page.

Incidentally, whether or not the text data exists inside the basic region 5692 is judged by, for example, setting the afore-mentioned data kind 5647 to an indefinite number.

The character strings of the text data are arranged in such a manner as to avoid the exclusive region (so as not to cause overlap from the aspect of parge layout) that is defined by the mode of the exclusiveness and the position of the internal region 5693 if the internal region 5693 having exclusiveness exists in the corresponding page.

Exclusive region management table 5670

The exclusive region management table 5670 manages the position of the exclusive region inside each page of the document. In other words, if the internal region 5693 set inside the page has exclusiveness, it manages the exclusive area of the text that is defined by the mode of exclusiveness, the size of the basic region 5692 and the position of the internal region 5693 inside the basic region 5692.

Therefore, the exclusive region management table 5670 has the region left upper x coordinate 5673, the region left upper y coordinates 5674, the region right lower x coordinates 5675 and the region right lower y coordinates 5676 with the left upper portion of the basic region 5692 being the origin.

Since the exclusive attribute that the internal region 5693 can have has the mode in accordance with disposition of the text (leading side of text-line, ending side of text-line, full text-lines), if the direction of characters of the text data to be described in the basic region 5692 is designated as vertical writing by the afore-mentioned page format table 5630, the right upper point of the basic region 5692 is used as the origin, and it further has the exclusive coordinates 5673 5676 in accordance with the coordinate system having the longitudinal direction of the paper as the x coordinates and its transverse direction as the y coordinates.

FIGS. 33b and 33c show the direction of each character when the internal region 5693 is set to the position shown in FIG. 33a and the position of the exclusive region and the arrangement of texts in each exclusive mode. Since a plurality of internal regions can be set in the same page, a plurality of exclusive regions 5693 can be set, too.

Therefore, each exclusive region inside the same page is linked by the rear pointer 5671 and the front pointer 5672. The leading region among these internal regions 5693 is pointed from the corresponding basic region 5692 of the afore-mentioned region management table 5630.

In order to improve the processing speed when the arrangement of texts is determined in the later-appearing text data edition unit, this link of regions is made from the region having smaller exclusive region left upper y and x coordinates. Furthermore, there is the case where the internal regions 5693 described above are set in superposition. Therefore, the exclusive regions may overlap (FIG. 34a).

In such a case, each exclusive region is managed while being divided rectangularly in the character direction as shown in FIG. 34b (divided into three parts in the case of FIG. 34) in order to improve the processing speed in the text arrangement processing in the same way as described above.

Region internal data 5660

This region internal data 5660 is the data which is stored in the region and stores therein the text, the figure, the graph, the image data, and the like. As described already, however, the text data to be described in the afore-mentioned basic region 5692 is managed as a region data which is independent for each chapter. Preparation and edition of the region internal data 5660 are made by the region edition unit 562 which is invoked by the document edition unit 561.

Referring to FIG. 21, after the initial processing (step 3001), the document edition unit 561 requests the input for the input control unit 51 (step 3002). It judges the input result from the operator (step 3003) and if the designation is one of the region for which the operation is desired, it judges which region is designated from the document data in accordance with the page number, the inside-page designation position and the set position of the region and registers the region number to the operation object region table (step 3004). The method of judgment at this time will be explained in further detail by use of the flow-chart of FIG. 22c.

First of all, whether or not the instructed position exists inside the basic region 5692 is judged (step 3201) and if it is outside the basic region 5692, the designation is judged as the designation error because no region at all corresponding to the designated position exists.

If it is inside the basic region 5692, whether or not the designated position exists inside the internal region 5693 is judged sequentially from the uppermost region (the end region inside the page) of the internal region 5693 inside the page (steps 3202 to 3205) and if it is found inside the internal region 5693 as a result of judgment, the instruction of the operator is regarded as the operation instruction for the internal region 5693 and the internal region instruction flag is set to 1 (step 3206).

If the instructed position does not exist inside the internal region 5693 on the page which is now being displayed (if the internal region instruction flag is 0), processing is executed while the instruction of the operator designates the basic region 5692.

If the instructed position exists inside the internal region 5693, whether or not this internal region 5693 has already been designated as the object, that is, whether or not the number of this internal region 5693 has already been registered to the operation object region table, is judged (step 3207) and if it is designated as the object, the next region (the region pointed by the front pointer 5642 of the region management block of the region which is now the object of judgment on the document data) is checked If it is not yet designated, the region is regarded as being designated and the number of this region is registered to the operation object region table.

In this instance, if the basic region 5692 has already been designated as the object (step 3208), the designation region number 5684 of the operation object region table is once cleared to zero (or after object desgination for the basic region 5692 is released; step 3209), the internal region number and the region kind are registered to the operation object region table and the designation region number 5681 is incremented by 1 (step 3210).

Incidentally, in the procedures described above, if the basic region 5692 is registered as the operation object, this designation is released compulsively because, as will be described later, no corresponding region edition at all will exist if the basic region 5692 and the internal region 5693 are made simultaneously designatable.

In the procedures described above, if the internal region 5693 is not registered, whether or not the internal region designation flag is 0 is judged (step 3212) and if it is 0, it is judged that no internal region 5693 at all exists on the instructed position and the operator instructs the basic region 5692 as the object.

Then, the number of the basic region 5692 is registered to the table and in this case, whether or not the corresponding basic region 5692 has already been designated as the object is judged (step 3213) and if it has not yet been designated, whether or not the internal region 5693 has been designated as the object is judged this time (step 3214).

If it has been designated, the operation object region table is once cleared (step 3215), and then the basic region number and the region kind are registered to the operation object region table and the designation region number is set to 1 (step 3216).

If the instruction from the operator is the designation release instruction of the region which is being designated as the object, which region is designated is judged from the document data from its page number, the inside-page designation position and the set position of the region and the region number is deleted from the operation object region table (step 3005 in FIG. 21). The judgment method at this time will be explained in further detail with reference to the flow-chart of FIG. 22d.

First of all, whether or not the instructed position has existed inside the basic region 5692 is judged (step 3251) and if it is outside the basic region 5692, the operation object region table 5686 is cleared unconditionally. In other words, designation of all the regions registered to the operation object region table 5686 is released (step 3258).

On the other hand, if it is inside the basic region 5692, whether or not the instructed position exists inside the region is judged sequentially from the region having the highest order inside the page (the ending region inside the page; steps 3252, 3253) and if it is found existing inside the region as a result of judgment, whether or not this region is registered to the operation object region table 5686 is judged (step 3254).

If it is registered, this region number is deleted from the operation object region table 5686 (step 3257) If the instructed position is not found existing inside the region at step 3253, or if this region is not registered to the operation object region table 5686 at step 3254, similar judgment is made for the subsequent regions through steps 3255 and 3256.

Figure 22C:
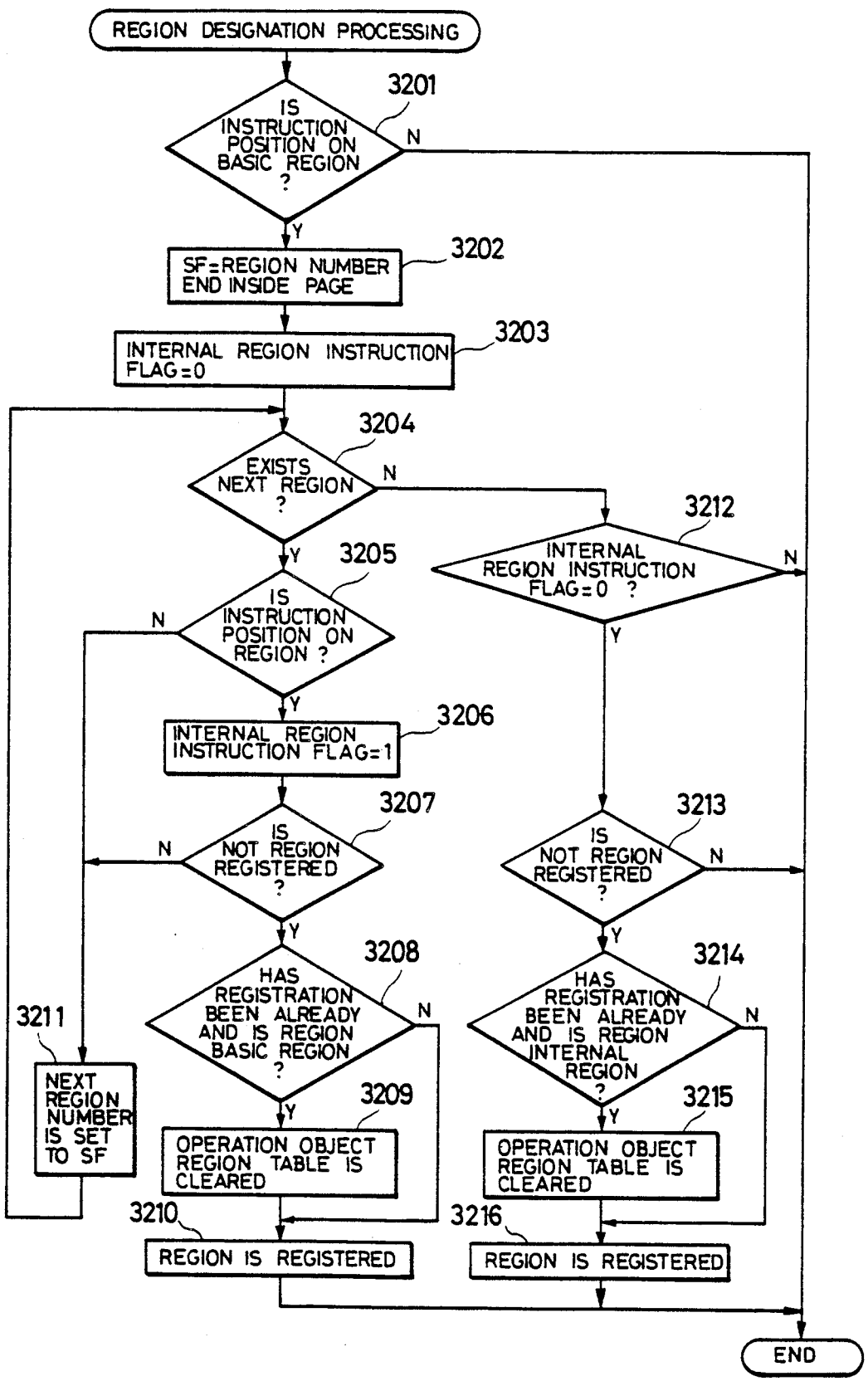
FIG. 22c is the region designation processing chart of the document edition unit.
Figure 22D:
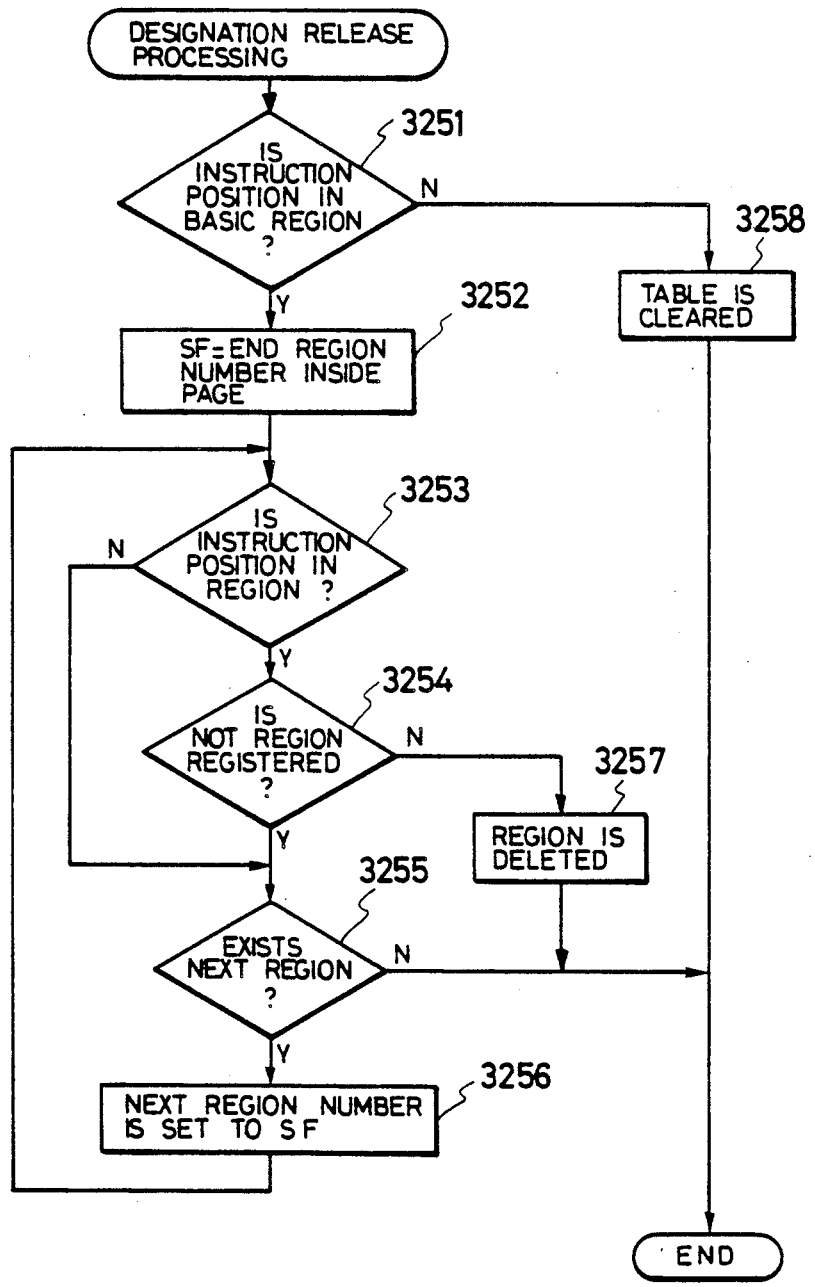
FIG. 22d is the designation release processing chart of the document, edition unit.
Figure 22E:
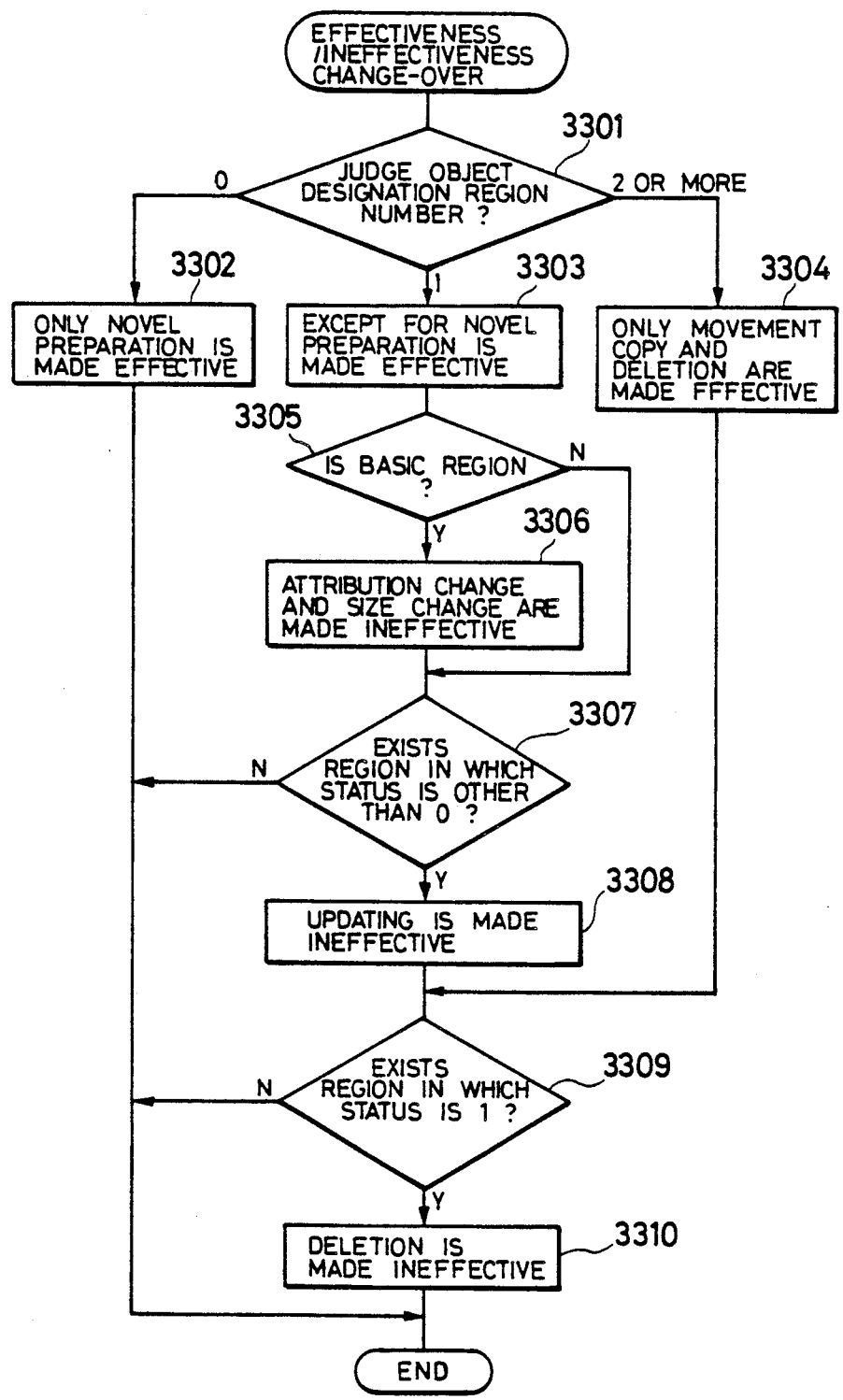
FIG. 22e is the effective/ineffective status change-over processing chart of the pull-down menu of the document edition unit.

The edition operation of the regions that can be executed with the designation/release operations of the region described above changes sequentially, and the change-over processing (step 3014 of FIG. 21) of the pull-down menu effective/ineffective status relating to the region operation in this case will be explained with reference to FIG. 22e.

The edition operations for the region can be classified into three operations in accordance with the number of regions designated as the operation object as shown in FIG. 26. First of all, the region number in object designation is judged (step 3301) and if the region number is 0, only the pull-down menu of region novel preparation is made all ineffective (step 3302).

If the region number in the object designation is 1, only the pull-down menu of region novel preparation is made ineffective for the time being with the other region editions being made all effective (step 3303).

If the region number in object designation is 2 or more, only movement, copy and deletion are made effective with the other region editions being made all ineffective (step 3304).

If the object designation number is 1, whether or not the designated region is the basic region 5692 is judged (step 3305). If it is the basic region 5692, the attribute change and the size change are made ineffective (step 3306) and then whether or not the status of the designated region is other than 0 is judged (step 3307).

If it is other than 0 (if the region has already been under edition or if the region edition unit 562 which can update this region does not exist inside the system), updating is made ineffective, too (step 3308).

If the object designation number is more than 1, whether or not the region having status 1 (the region which is now being edited) exists in the designated region is judged (step 3309), and if does, deletion is made ineffective, too (step 3310).

Figure 22F:
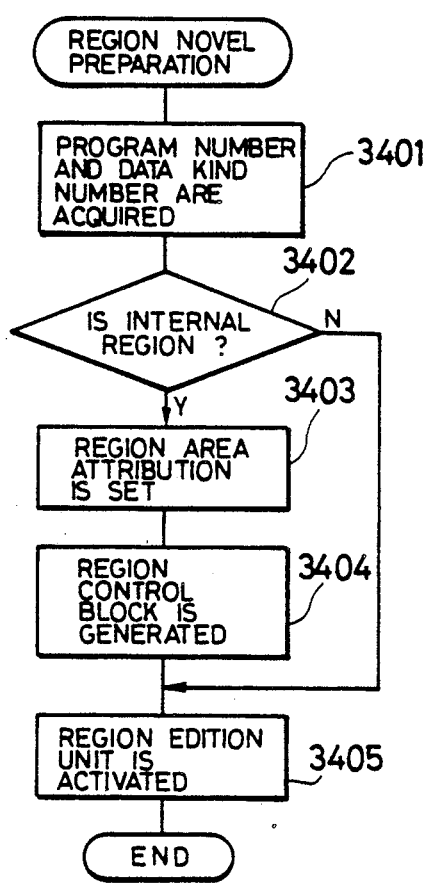
FIG. 22f is the region novel preparation processing chart of the document edition unit.

Next, the case where the instruction from the operator is the instruction of region novel preparation (step 3306 in FIG. 21) will be explained with reference to the flow-chart of FIG. 22f.

In this case, the instruction of novel preparation by the operator is made by designating the data name displayed by the pull-down menu, and the document edition unit 561 acquires the program number and data kind number of the corresponding data on the basis of the afore-mentioned support region edition unit management table (SEMT) (FIG. 27) in accordance with the number of the pull-down menu delivered from the input control unit 51 (step 3401) and judges novel preparation for which data is instructed (step 3402).

In this case, if the designated data is the data to be prepared as the internal region 5693, setting of the area of the region and the attribute of the region are next executed (step 3404). The area of the region is set, for example, by designating two diagonal points of the region to be set on the layout screen of FIG. 31a by use of the mouse cursor 30.

After the area setting of the region is thus completed, the region attribute set screen is next displayed as shown in FIG. 35 and the region attributes are designated. The attributes of the region include exclusiveness, transmissivity, line kinds of region frames, etc., as described already, and the item desired by the operator is selected from each of these items. The region attribute designation is completed by pushing down the execution key. The region management block is generated on the basis of the information described above (step 3404) and the corresponding region edition unit 562 is invoked (step 3405). The detail of the invoking processing will be described later. Incidentally, if the attribute of the internal region 5693 to be set a new has exclusiveness, the area for excluding the text data changes.

Figure 22G:
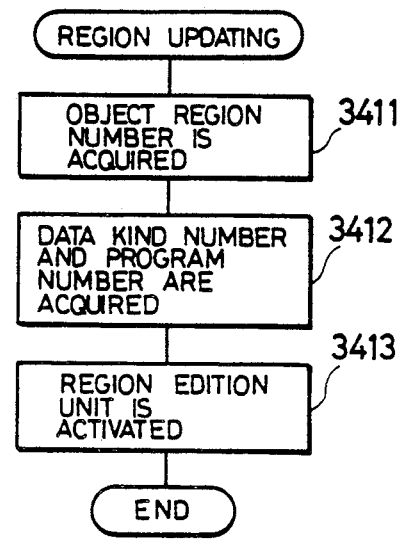
FIG. 22g is the region updating processing chart of the document edition unit.
Figure 22H:
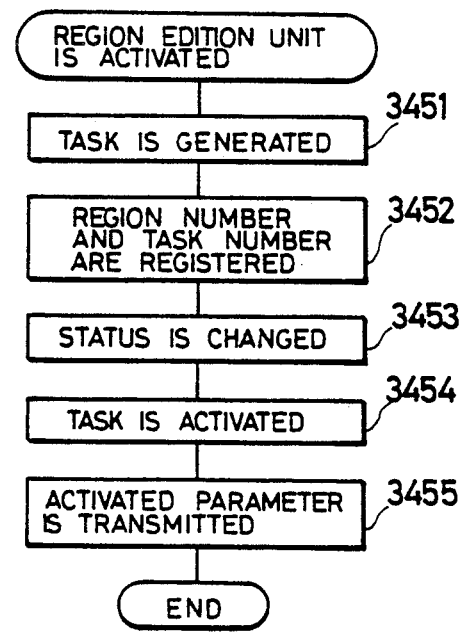
FIG. 22h is the region edition unit activation processing chart in the region novel preparation/region updating processing in the document edition unit.
Figures 1, 22I:
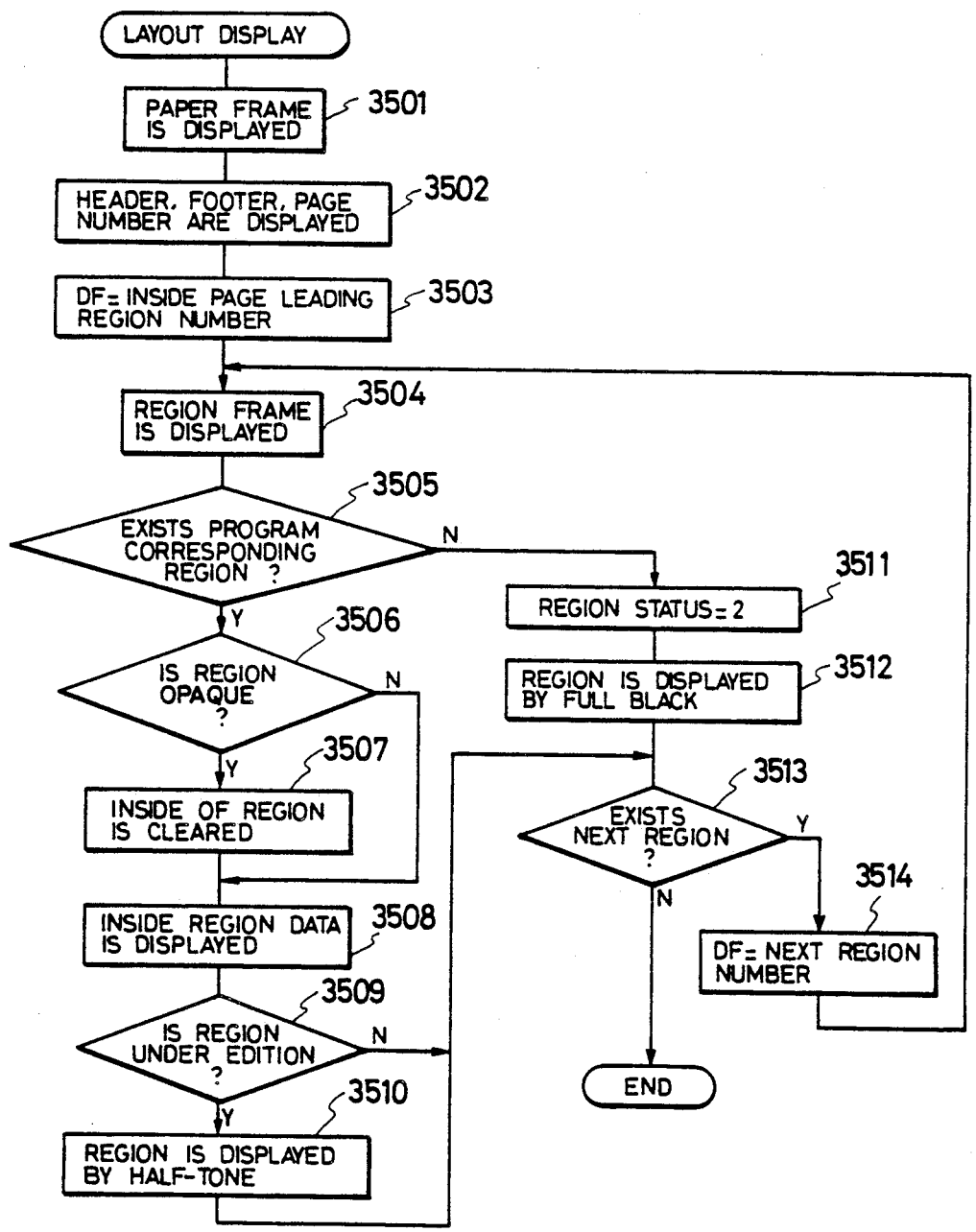
Figure 22J:
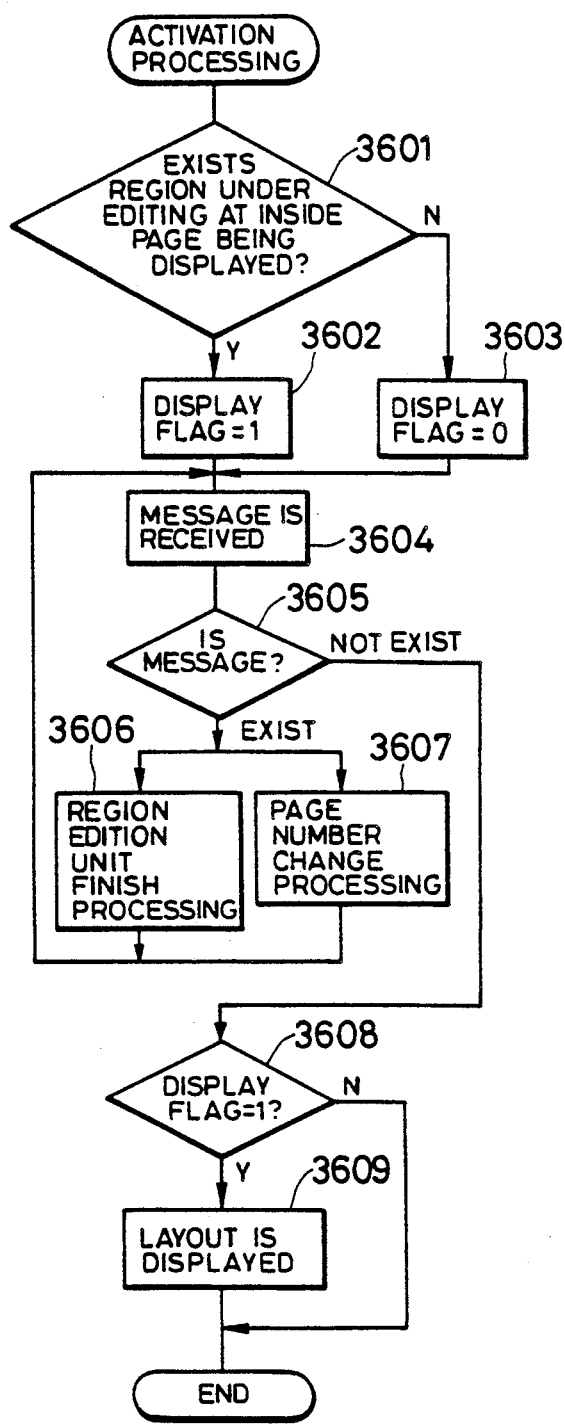
FIG. 22j is the activate processing chart of the document edition unit.
Figures 1, 22K:
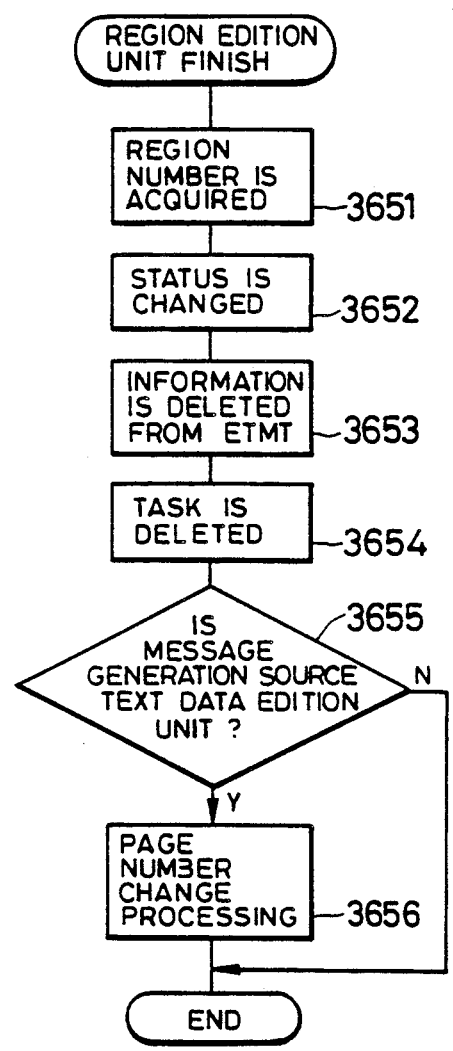
Figures 2, 22K:
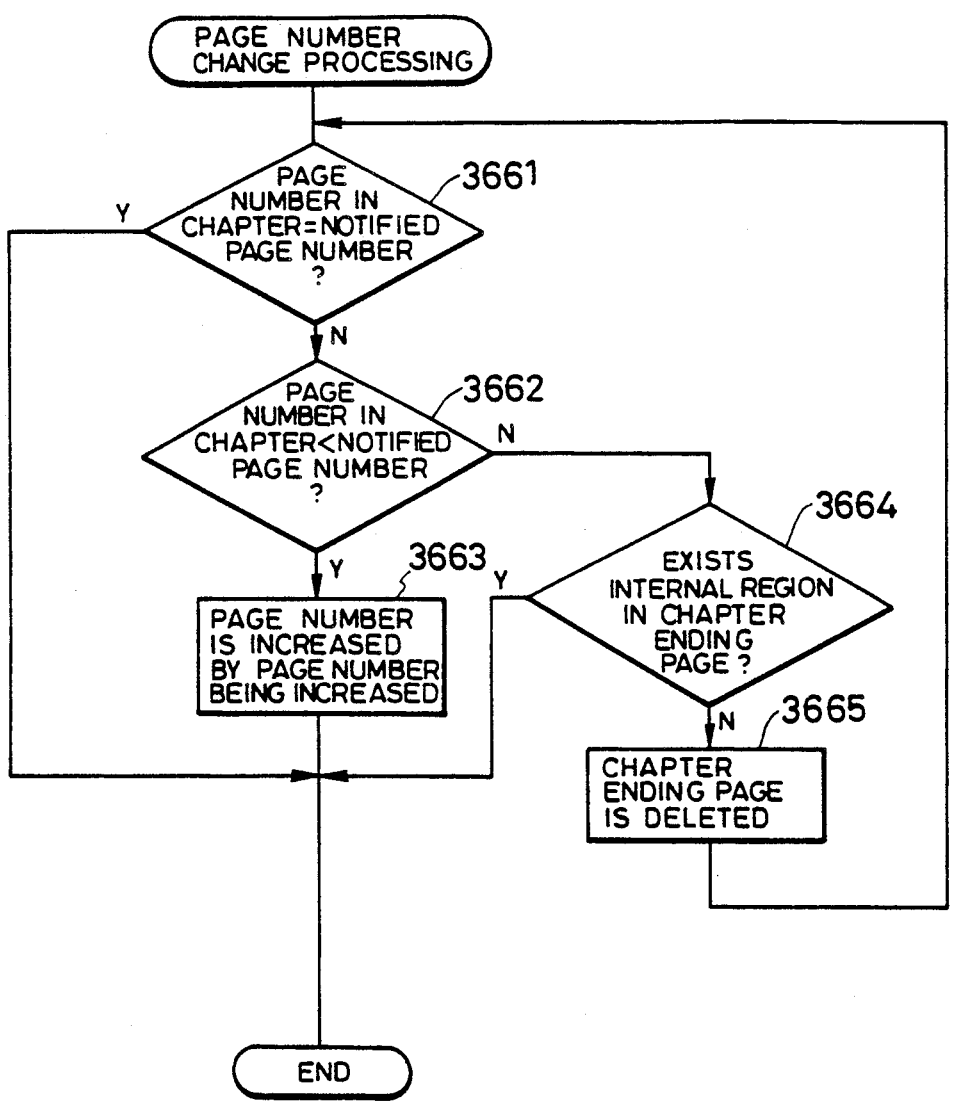
Figure 22I:
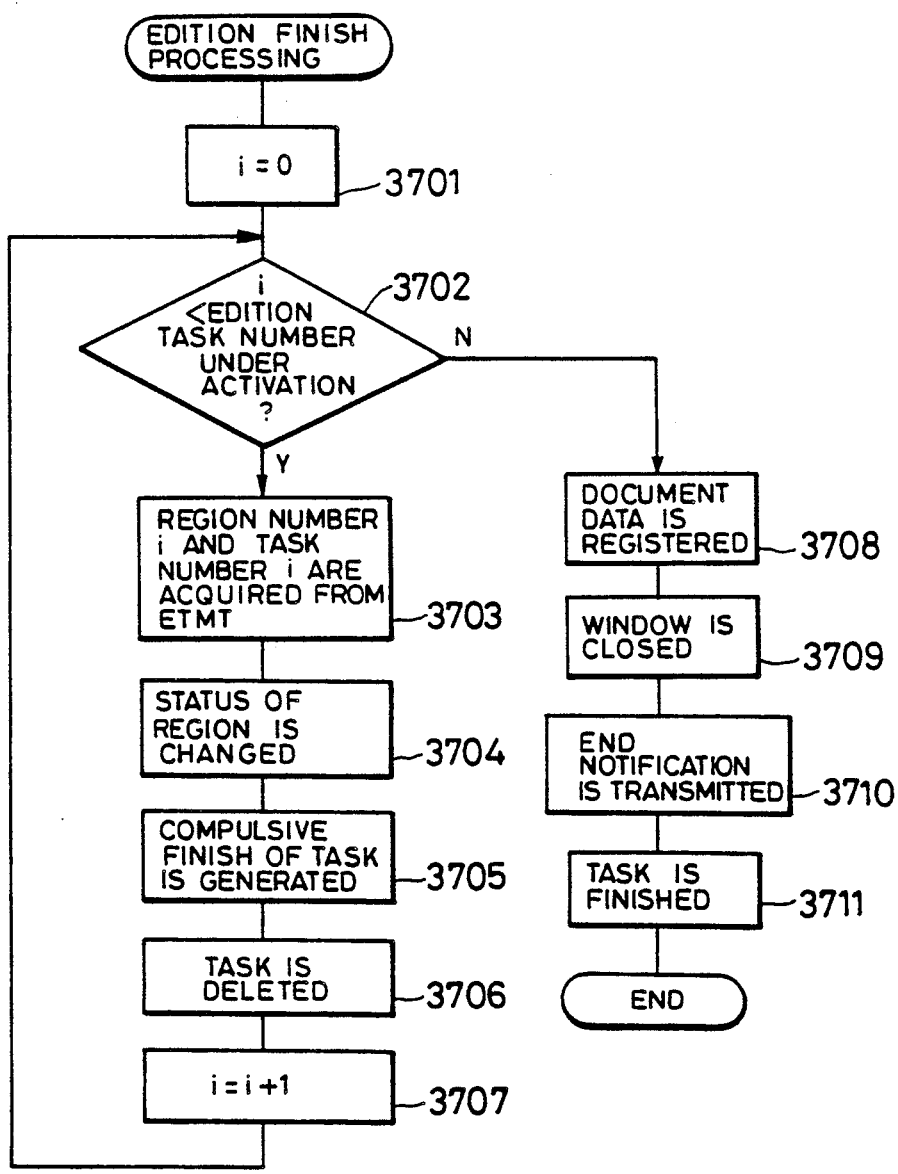

Furthermore, if the text data has already existed inside the basic region 5692 of the page, the arrangement of texts must be determined once again in accordance with a new exclusive area, and this determination processing of text will be described later Now, if the instruction from the operator designates updating of the region that has already been prepared (step 3007 in FIG. 21), the number of the region registered to the operation object region table 5686 as shown in FIG. 22g (step 3411), the program number is acquired from that number and from the support region edition unit management table (SFMT) on the basis of the data kind of the region management block (step 3412) and the corresponding region edition unit 562 is invoked as the task (step 4313).

When the region edition unit 562 is invoked as described above, the document edition unit 561 requests the system control unit 53 to generate the task on the basis of the acquired program number (step 3451) and the task number of the number of corresponding region sent back from the system control unit 53 are registered to an under-invoking edition task management table (hereinafter referred to as "ETMT"; step 3452).

As shown in FIG. 29, the under-invoking edition task management table (ETMT) holds the task number 5688 and the region number 5689 as the pair and has the invoke task number 5687 representing how many region edition units 562 are invoked at present. Then, the status of the region management block is changed from 0 to 1 in order to represent that the corresponding region is under edition (step 3453).

After processing described above, the document edition unit 561 generates the task invoke request to the system control unit 53 (step 3454) and sends the message to the region edition unit 562 which invokes the invoke parameters (step 3455).

In this case, it sends, as the invoke parameters, the invoke mode representing novel preparation or region updating, the task number of the document edition unit 561 and the task number of the region edition unit 562 to be invoked, and additionally, the size of the region in the case of novel preparation.

When the other edition operations such as the operations in the region unit, e.g. the size change, attribute change, copy, movement and deletion of the region or the operations in the page unit, e.g. the format change, insertion, addition and deletion of the page are instructed, the corresponding operations are executed (steps 3008~3011 in FIG. 21) and then the next instruction of the operator is awaited (step 3002).

Incidentally, the region operation is carried out by designating the region as the operation object by the afore-mentioned region designation/release and then selecting the corresponding function from the menu.

In this instance, if the attribute change of the region is designated, the region attribute set screen is displayed in the same as region novel preparation described already and the region attribute to be changed is designated in accordance with the display.

In the above-mentioned operations in the region unit and in the page unit, if the area for excluding the text data inside the basic region 5692 changes and furthermore, if the text data exists inside the basic region 5692, the arrangement of the texts must be determined once again in accordance with the new exclusive area, and the determination processing of the texts will be described later.

Incidentally, in the operations in the region unit, the cases in which the area for excluding the text data include the case in which the region having exclusiveness is subjected to the size change, copy, movement and deletion, the case in which exclusiveness of the region is changed by the attribute change and the case in which the paper, the blank portions and the direction of characters are changed in accordance with the format change of the page.

Other processings such as change-over processing of display page (step 3012 in FIG. 21), activate input processing by the change-over operation of the window 25 which will be described later (step 3013 in FIG. 21) and the processing when end is instructed (step 3015 in FIG. 21) will be described later.

When the document edition unit 561 requests invoke of the region edition unit 562 such as the graphic data edition unit by novel preparation or updating of the region described above, the system control unit 53 invokes afresh the graphic data edition unit as the task in accordance with this request.

Next, the processing content of this graphic data edition unit will be explained with reference to the processing flow-chart of FIG. 30a.

First of all, the graphic data edition unit receives the invoke parameters as the message (step 4001) and judges whether the invoke mode is novel preparation or region updating or layout display processing (step 4002). If it is novel preparation, it initializes the data (step 4003), and if it is updating, the graphic data edition unit calls out the data as the object of updating from the memory unit 3 (step 4004). The layout display processing will be described later. Then, it opens the window 25 (step 4005) and displays the graphic data inside the window 25 (step 4006).

In this case, the size of the window 25 corresponds to the size of the region and the task number of the invoking document edition unit 561 is added to part of the title of the window 25 in the same way as the invoking document edition unit 561.

Figure 32:
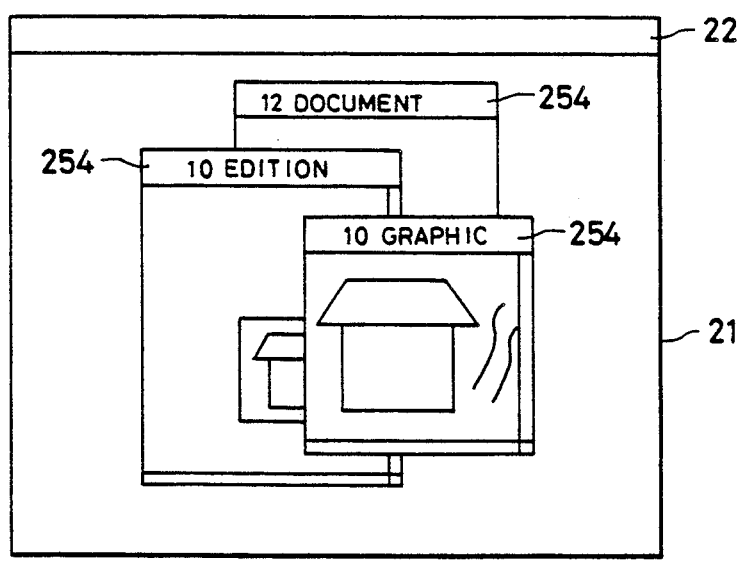
FIG. 32 is the title view of the window of each edition unit.

Therefore, when a plurality of documents are edited simultaneously and some regions of each document are edited, it is possible to easily identify which region belongs to which document from the task number 254 displayed as part of the title of this window 25 as shown in FIG. 32.

Figure 31B:
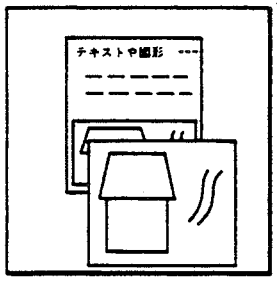

At this time, the display state of the picture surface is such as shown in FIG. 31b. Thereafter, preparation and edition of the graphic data are executed by the graphic data edition unit in accordance with the instruction from the operator inside the set window (steps 4007~4009).

Incidentally, when edition end inside the region is instructed from the operator, the graphic data edition unit stores the prepared graphic data in the memory unit 3 (step 4010), closes the window 25 (step 4011), sends the region edition end message to the invoking document edition unit 561 (step 4012) and completes the task (step 4013).

Incidentally, the end code representing the edition end inside the region and the task number of the graphic edition unit itself are set to this end message in order to make it possible to identify the edition of which region the invoking document edition unit 561 has completed.

Next, the processing content of the document edition unit 561, when it invokes the text data edition unit for preparing the data inside the basic region 5692 by novel preparation or updating of the region in the same way as in the case of the figure described above will be explained with reference to FIG. 30b.

In the same way as the graphic data edition unit, the text data edition unit first receives the invoke parameters by the message (step 4101) and judge whether the invoke mode is novel preparation or region updating and furthermore, whether it is determination processing or layout display processing (step 4102).

In the case of novel preparation, it initializes the data (step 4103) and in the case of updating, it calls out the data as the object of updating from the memory unit 3

(step 4104). The determination processing and the layout display processing will be explained later.

Then, the text data edition unit opens the window 25 (step 4105) and displays the text data inside the window (step 4106). It adds the task number of the invoking document edition unit 561 to part of the window title in the same way as the invoking document edition unit 561. Thereafter, the text data edition unit executes preparation and edition of the text data in accordance with the instruction from the operator inside the set window (steps 4107~4109).

In this instance, as to which format is designated for the page on which the text is to be described or which exclusive region is set in the page, the text data is arranged in the page by referring to the document data prepared by the document invoking edition unit 561 described above. The method of arranging the text data will be described later.

When preparation and edition of the text data are executed, whether or not the page number in which the text data to be described in the chapter exist changes is judged (step 4110) and if it does, or such as when the trailing end of the text data overflows from this page into the next page due to the input of the text data, the page number in which the text data exists in this chapter is notified to the invoking document edition unit 561 by use of the message (step 4111).

Incidentally, the code representing the page number change notification and the task number of the text data edition unit itself in order to make it possible for the invoking document edition unit 561 to judge from which text data edition unit the notification is sent are set to this message.

When edition end inside the region is instructed from the operator, the text data edition unit stores the prepared text data in the memory unit 3 (step 4112), closes the window 25 (step 4113), sends the region edition end message to the invoking document edition unit 561 (step 4114) and finishes the task (step 4115).

Incidentally, the end code representing the edition end inside the region, the task number of the text data edition unit itself and the page number in which the text data exists in the chapter are set to this end message in order to make it possible for the invoking document edition unit 561 to judge the edition of which region is complete.

Preparation and edition of the text data inside the chapter can be executed in the manner described above, and the structure of the text data which is one of the region internal data 5660 will be explained with reference to FIG. 24b.

As shown in FIG. 24b, the text data consists of a page/paragraph management table 6010, a text-line management table 6020 and a text data table 6030, and each of these tables consists of a plurality of blocks. Hereinafter, each table will be explained.

Page/paragraph management table 6010

This page/paragraph management table 6010 is the table which manages which pages and which paragraphs the text data to be described in the chapter are composed of. The page/paragraph management table 6010 has a page/paragraph number 6011 representing to which paragraph of which page the block corresponds inside the chapter, the left upper x coordinates 6012 in the basic region of this page/paragraph, the left upper y coordinates 6013, the right lower x coordinates 6014 and the right lower y coordinates.

Furthermore, the page/paragraph management table 6010 has a text-line pointer 6016 representing the leading text-line among the text-lines set inside this page/paragraph. By which format each page in this chapter is constituted is determined from the document data described already.

Text-line management table 6020

The text-line management table 6020 consists of format information 6021 representing by which format each of the text-line set in this page/paragraph is constituted, and a text pointer 6022 representing the leading text of each text-line. Here, the term "format information" means the character size, the character spacing and the text-line spacing.

Text table 6030

The text table 6030 represents the character data described in the chapter and stores sequentially the characters from the leading character in the chapter.

The text data described in each chapter is managed by the structure described above, and the method of arranging the texts with preparation and edition of the text data will be explained next with reference to FIG. 30c.

It will be assumed hereby that the region is set to the position shown in FIG. 33a, exclusiveness of only the region is designated as the exclusive attribute, the character direction is lateral writing and column setting is two-column setting Then, the areas shown in FIG. 33b and (e) portion of FIG. 33c are exclusive areas for the text. At this time, cast-off of the input text data onto the basic region is carried out in the following way.

The character width Cw and the text-line width Ch in the text-line are calculated from the character size and the character spacing and from the character size and the text-line spacing, respectively, in accordance with the format information 6021 designated for the text-line as the object of the input of text, edition and display (step 4201).

Next, at which position on the basic region this text-line exists is calculated or in other words, the left upper and right lower x and y coordinates of this text-line on the basic region are calculated (step 4202).

Figure 36:
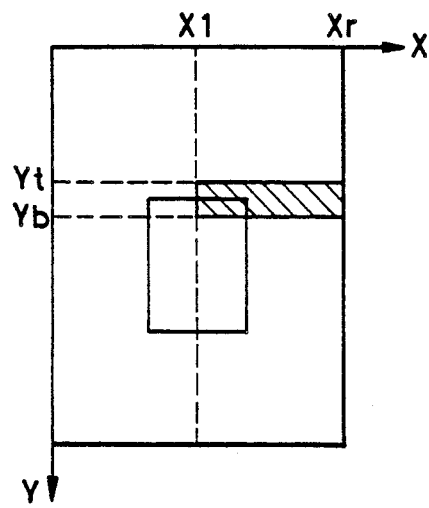
FIG. 36 is the relation view between the exclusive region and the, text-line.

For example, when this text-line exists at the position such as shown in FIG. 36, the left upper x coordinates Xl and the right lower x coordinates Xr can be determined from the left upper x coordinates 6012 and the right lower x coordinates 6014 of the page/paragraph management table 6010.

Furthermore, the left upper y coordinates Yt can be determined by acumulating each text-line width Ch from the leading text-line of the page to the text-line immediately before the coresponding text-line, and the right lower y coordinates can be determined by adding the text-line width Ch of the corresponding text-line to the left upper y coordinates Yt.

Whether or not the exclusive region exists in the text-line, that is, whether or not the exclusive regions overlap, is judged from the left upper and right lower x, y coordinates Xl, Xr, Yt and Yb and the afore-mentioned exclusive region management table 5670 (step 4203).

In this case, the exclusive regions are checked sequentially from the leading exclusive region in the page represented by the exclusive region pointer 5651, that is, from the exclusive region having smaller left upper y, x coordinates and when the left upper y coordinates 5674 of the exclusive region as the object of judgment are greater than the right lower y coordinates Yb of the text-line, judgment is terminated at this time and the flow proceeds to step 4205 by regarding that no exclusive region which overlaps with this text-line exists. (This is because each data of the afore-mentioned exclusive region management table 5670 is linked so that the left upper y coorinates sequentially rise.)

On the other hand, if overlap is found out, from and to which characters of this text-line overlap with the exclusive region are determined from the character width Cw and the left upper x coordinates and right lower x coordinates of the exclusive region (step 4204) and finally, the text data is casted off to the character position which does not overlap with the exclusive region. The procedures described above can prevent the internal region having exclusiveness from overlapping with the text data from the aspect of page layout.

Figure 37:
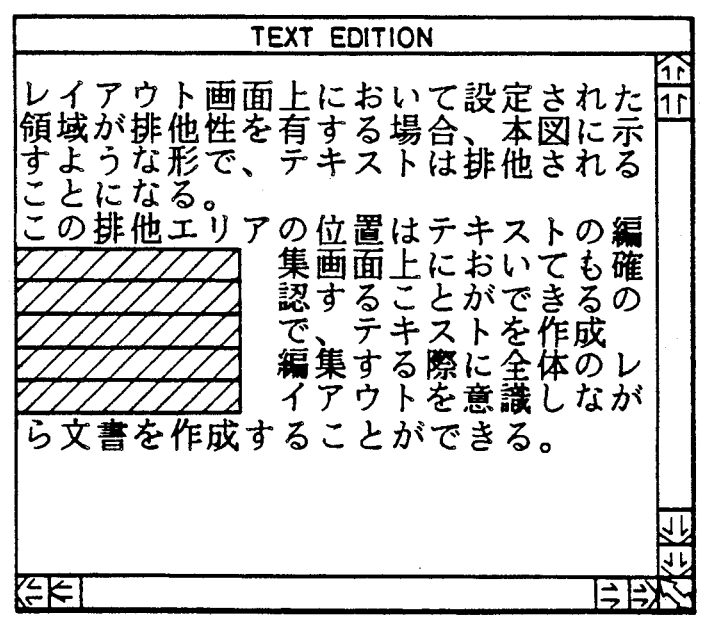
FIG. 37 is the preparation/edition screen view of the text.

Furthermore, it is possible to confirm the portion(s) from which the text is excluded on the screen during text edition, too, as shown in FIG. 37 by displaying the information of one determined text-line by use of the character codes and the portion(s) representing the exclusive regions by use of specific codes.

Even when no exclusive region at all exists in the page, the text data can be casted off by carrying out the procedures in the same way as the flow described above.

If the format information such as the character spacing, the text-line spacings, etc. are changed by the format change operation by the operator, the text arrangement processing described above is repeated from the updated text-line and the text data can be rearranged.

In the manner described above, preparation and edition of the document as a whole and inside each region can be executed, and the text data determination processing will now be explained.

As described already, the exclusive area of the text inside the page changes when the internal region 5693 having exclusiveness is prepared afresh or when the operations such as the size change or movement are executed for the region having exclusiveness.

Figure 22M:
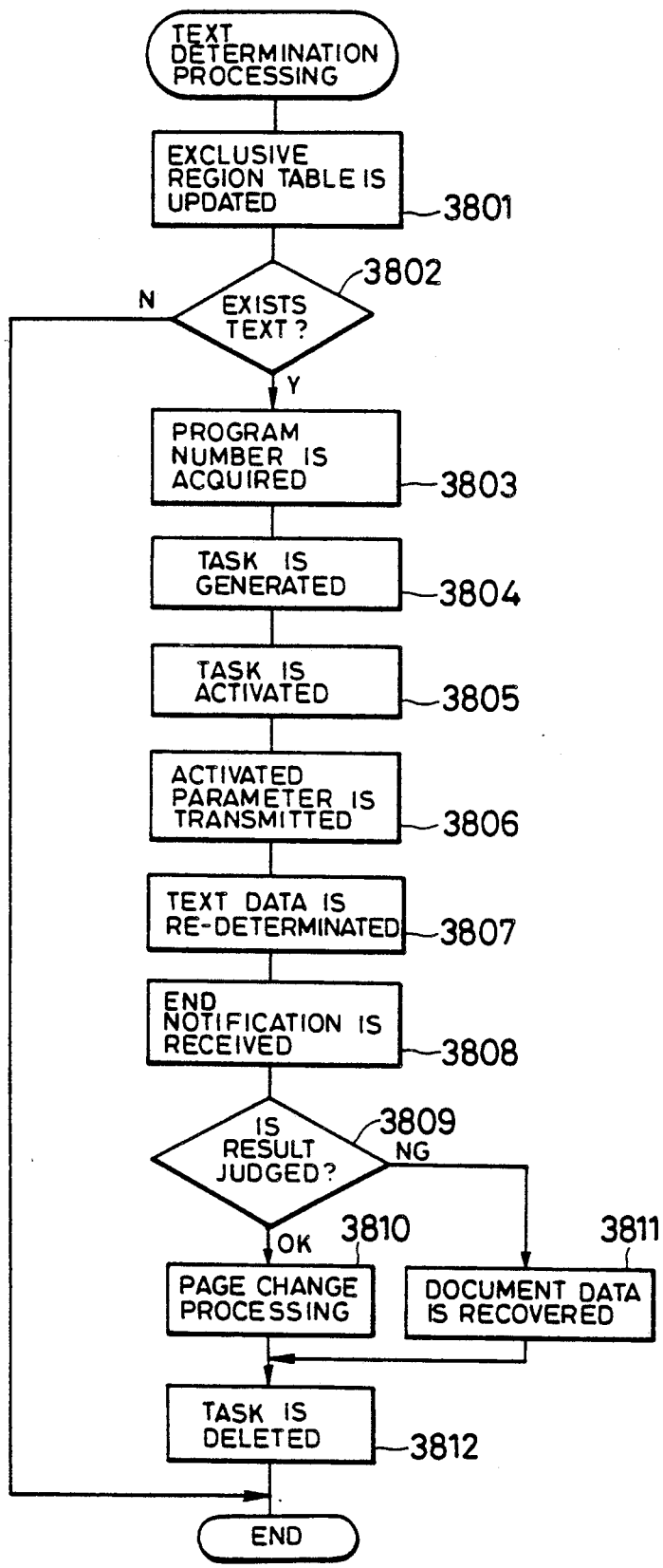
FIG. 22m is the text data determination control processing chart of the document edition unit when an exclusive region is changed.

If, in this case, the text data has already existed in the basic region 5692 of this page, the arrangement of the text must be determined once again in accordance with a new exclusive area. Hereinafter, the content of determination processing of the text data in the document edition unit 561 and in the text data edition unit will be explained with reference to FIGS. 22m, 30b and 30c.

First of all, the document edition unit 561 updates the exclusive region inside the page in accordance with the document data updated by the edition operation for the region described above, or the like (step 3801).

Next, whether or not the text data exists in the page is judged (step 3802) and if not, the processing is terminated because there is no need to determine once again the text data. If the text data exists, on the other hand, the text data inside the page must be determined once again.

Therefore, the text data edition unit is invoked in the determination processing mode to execute the redetermination processing of the text data.

In other words, the data kind 5647 of the text data is acquired from the region management block of the basic region 5692 of the page and the program number is acquired from this data kind and the support region edition unit management table (SFMT) (step 3803). The task is then generated on the basis of this program number (step 3804) and invoked (step 3805) Thereafter the invoke parameters are sent to the text data edition unit (step 3806).

In this case, as the invoke parameters, the invoke mode representing the determination processing, the task number of the document edition unit 561, the task number of the text data edition unit to be invoked and the page number in the chapter as the object of re-determination are sent.

Figure 30A:
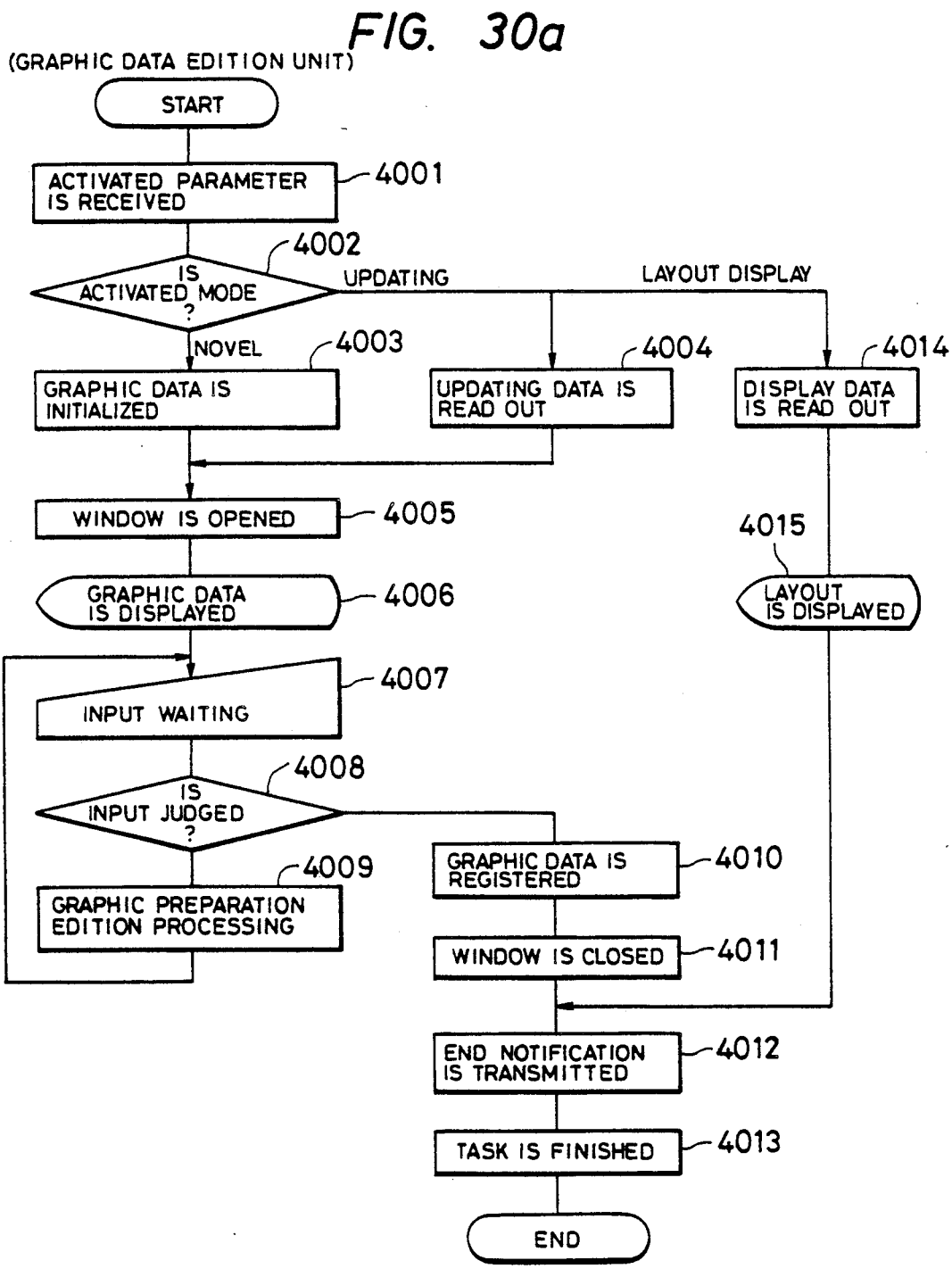
FIG. 30a is the processing chart of a graphic data edition unit.
Figure 30B:
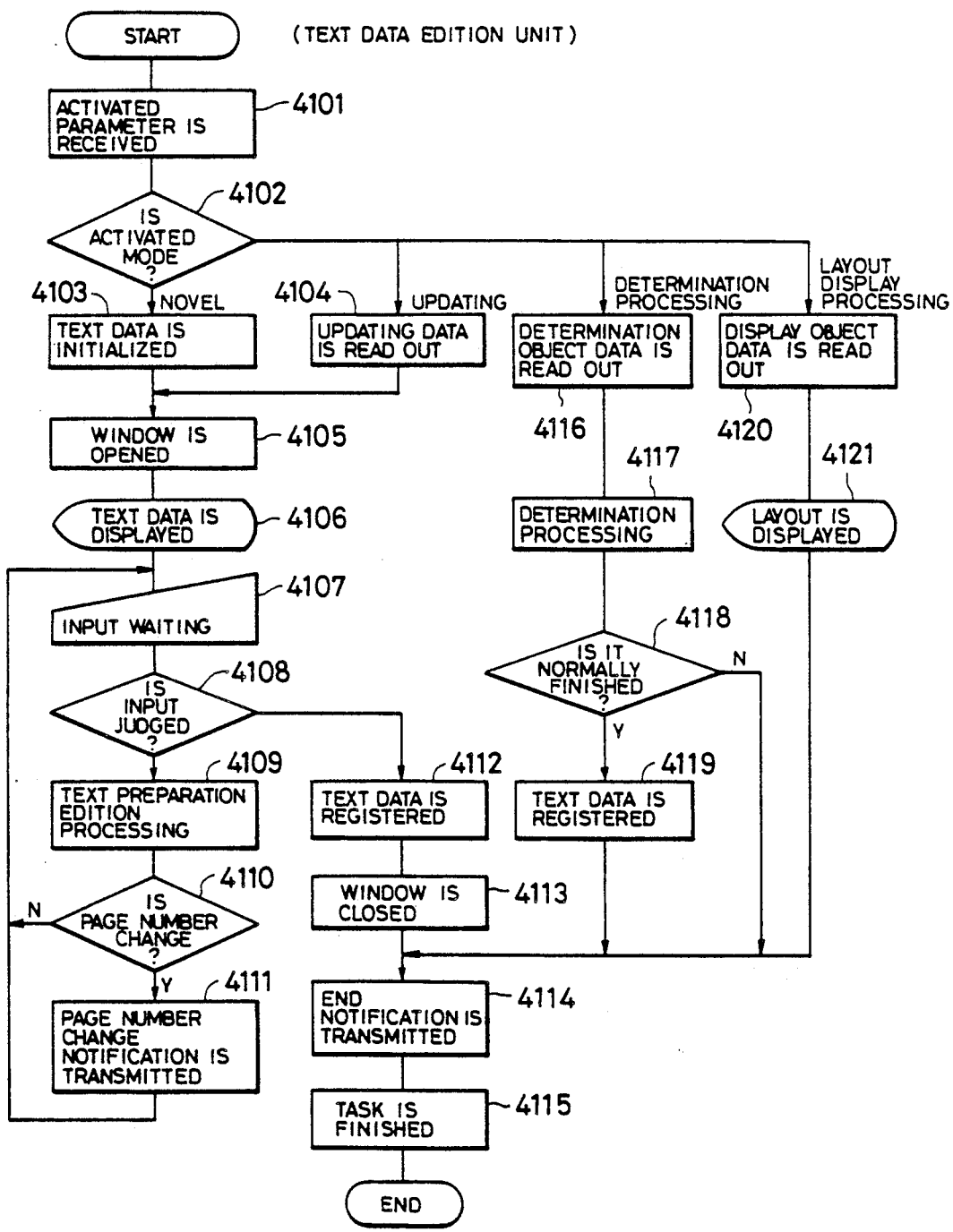
FIG. 30b is the processing chart of a text data edition unit.

Next, the text data edition unit generated and invoked as the task executes the determination processing of the text in accordance with FIG. 30b described already (step 3807).

In other words, the invoke parameters are first received by the message (step 4101) and whether or not the invoke mode is determination processing is judged (step 4102).

If it is determination processing, the text data edition unit reads out the text data as the object of determination from the memory unit 3 (step 4116) and executes determination processing of the text data in accordance with the flowchart shown in FIG. 30c from the page represented by the invoke parameters till the end of the text data (step 4117).

Whether or not the determination processing is completed normally is judged (step 4118) and if it is terminated normally, the text data is stored in the memory unit 3 (step 4119) and if not, the data is not stored but the end message is sent to the invoking document edition unit 561 (step 4114) and the task is finished (step 4115).

The end code representing whether or not the determination processing of the text data is completed normally, the task number of the text data edition unit itself, the result of determination processing if it is finished normally and the page number in which the text data exists in this chapter are set to this end message.

The document edition unit 561 receives the result of determination processing by the text data edition unit by the message (step 3808), judges whether or not determination is made normally on the basis of the content of the message (step 3809), executes the page number change processing in accordance with the page number reported by the message if the determination is made normally (step 3810) and deletes the generated task (step 3812).

On the other hand, if the text data edition unit fails to determine, the document data is recovered to the state before the execution of the edition operation (step 3811) and the task is deleted. Incidentally, the page number change processing at step 3810 will be described elsewhere.

If the exclusive area is changed by executing the edition operations for the regions and the pages as described above, the text data that has already been inputted can be re-determined in accordance with a new exclusive area.

Figure 38D:
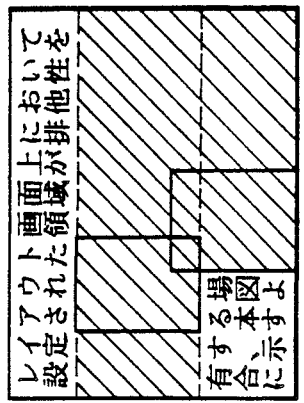
FIG. 38a, FIG. 38b, FIG. 38c and FIG. 38d is respectively the relation view between the exclusive region and the text data.
Figure 38C:
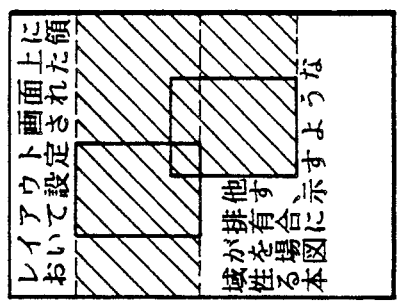
Figure 38B:
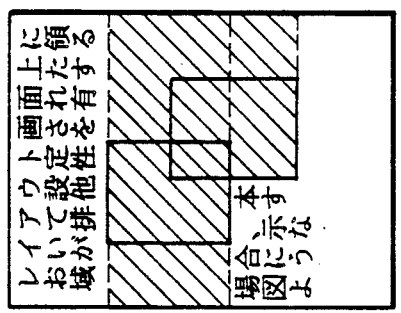
Figure 38A:
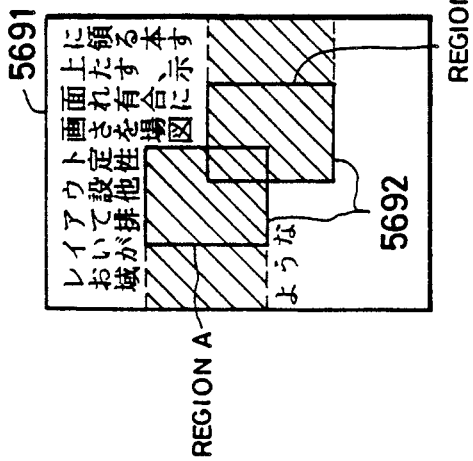

FIGS. 38a–38d show change examples of the exclusive region and the arrangement of the text data when the region operation and the page operation are executed. In FIG. 38a, the internal region A has exclusiveness on the text-line heading side and the internal region B has exclusiveness on the text-line ending side. The state shown in FIG. 38b represents the case were the exclusiveness of the internal region A is changed to the full text-lines by the region attribute change under this state. The state shown in FIG. 38c represents the case where the internal region A is moved upward in FIG. 38b by the region movement.

Furthermore, the state shown in FIG. 38d represents the case where the direction of paper is changed from the longitudinal direction to the transverse direction in FIG. 38c by the format change of the page. Since the attributes of the region are kept so as to correspond to the regions during the shift of the state from FIG. 38b to FIG. 38c and from FIG. 38c to FIG. 38d, the attribute of each region is maintained as such after the region movement and after the page format change.

The processing of the document edition unit 561 will be explained further with reference to the flow-chart of FIG. 21.

If the instruction of the operator is the display page change-over instruction such as the preceding page or the next page (step 3012 in FIG. 21), the layout of the corresponding page is displayed once again in the window 25. This layout display processing will be explained with reference to FIG. 22i-1.

When this layout of the corresponding page is displayed, the paper frame, the header, the footer, and the like are first displayed on the basis of the afore-mentioned document data (steps 3501, 3502) and then the regions are displayed sequentially from the region having the lowest priority among those which are set into the page (inside-page leading region; steps 3505~3513, 3514).

In this region display, the region frame is first displayed (step 3504) and then whether or not the edition program for the data of this region exists is judged from the data kind number inside the corresponding region management block and from the support region edition unit management table (SFMT) (step 3505) and if it does not exist, the status of the region management block is changed to 2 (step 3511) and at the same time, the region is displayed by full black in order to let the operator know that the edition program for this region does not exist inside the system (step 3512).

If the edition program exists, whether or not the attribute for this region is transparent is judged (step 3506) and if it is opaque, the inside of the region is once cleared (step 3507) and the inisde-region data is displayed (step 3508). The display of the inside-region data is effected when the document edition unit 561 invokes the corresponding region edition unit 562 in the layout display mode and each invoked region edition unit 562 displays the data inside the region. The detail will be described later.

After the region display, whether or not this region is under edition (whether or not 1) is judged on the basis of the status information on this region (step 3509) and if it is, the whole region is displayed by half-tone in order to let the operator know that this region is now under edition (step 3510). Thereafter, the similar processing is executed for all the regions existing inside the page to be displayed (steps 3513, 3514).

The layout of the whole page can be made in the manner described above. Here, display of the inside-region data at the step 3508 described above will be explained in further detail with reference to FIGS. 22i-2 and 30a, 30b.

First of all, the document edition unit 561 acquires the data kind 5647 of the region management block of the region as the object of display, then acquires the program number from this data kind and the support region edition unit management table (SFMT) (step 3551), generates the task on the basis of the program number (step 3552) and invokes it (step 3553). Then, the invoke parameters are sent to the region edition unit 562 (step 3554).

In this case, the invoke mode representing the layout display processing, the task number of the document edition unit 561 and the task number of the region edition unit 562 to be invoked are sent as the invoke parameters. If the document edition unit 561 to be invoked is the text data edition unit, the page number inside the chapter as the object of display is sent, too.

Next, if the region edition unit 562 which is generated and invoked as the task is the graphic data edition unit, for example, the layout display processing is executed in accordance with FIG. 30a described already. In order words, the invoke parameters are received by the message (step 4001) and whether or not the invoke mode is the layout display processing is judged (step 4002).

If it is the layout display processing, the data as the object of display is read out from the memory unit 3 (step 4014), the end message is sent to the invoking document edition unit 561 (step 4114) and the task is completed (step 4115). Incidentally, the end code representing that the layout display processing of the graphic data is completed normally and the task number of the graphic data edition unit itself are set to this end message.

On the other hand, if the invoked region edition unit 562 is the text data edition unit, the layout display processing of the text is executed in accordance with FIG. 30b described already. In other words, the invoke parameters are received by the message (step 4101) and whether or not the invoke mode is the layout display processing is judged (step 4102).

If it is the layout display processing, the data as the object of display is read out from the memory unit 3 (step 4120) and the text data of the page designated by the invoke parameters is displayed (step 4121). In the layout display of this text data, from and to which characters of the text data to be displayed on one text-line overlap with the exclusive region set in the display page is judged in the same way as the determination processing of the text data described already.

After the text data in one text-line are casted off in such a manner as not to overlap with the exclusive region from the aspect of the page layout, the data are displayed. After the processing is repeated for all the text-lines existing in the display page, the end message is sent to the invoking document edition unit 561 (step 4114) and the task is completed (step 4115).

The end code representing that the layout display processing of the text data is completed and the task number of the text data edition unit itself are set to this end message. The document edition unit 561 receives the result of the layout display processing by the region edition units 562 described above by the message (step 3556) and the generated task is deleted (step 3557).

Figure 39:
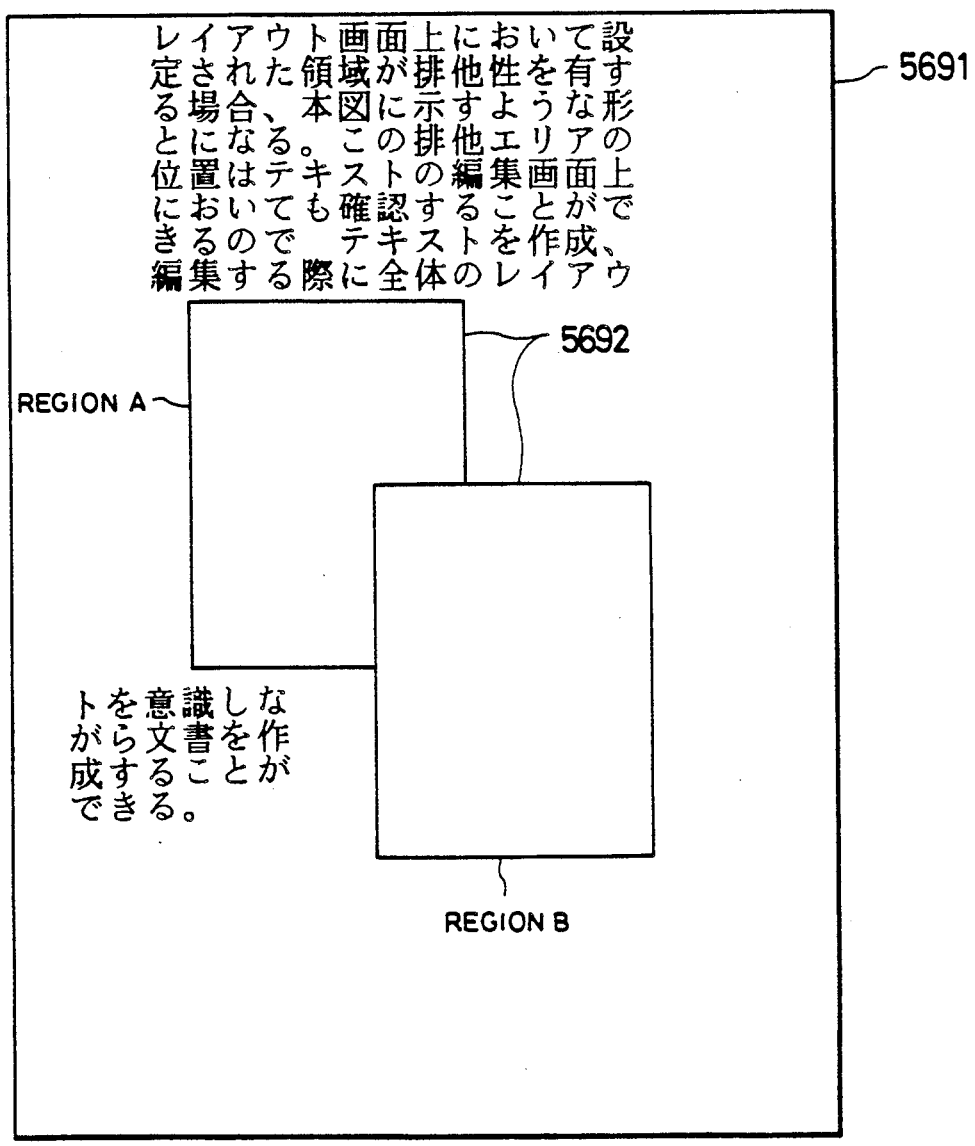
FIG. 39 is an example view of the layout display screen of the document edition unit.

The data in each region can be displayed in the manner described above If the exclusive region exists on the page, it can be displayed in such a manner as not to overlap with the text data described on the basis region inside the page. FIG. 39 shows an example of the display screen of the page layout in the document edition unit 561.

In this example, the internal region B is positioned on the internal region A and since transmissivity of the internal region B is opaque, the portion of the internal region A which is covered with the internal region B is not displayed. Since both the internal regions A and B have exclusiveness on the full text-line side and on the text-line and side, the text data described on the basic region 5691 is displayed while being excluded as shown in the drawing.

Figure 17:
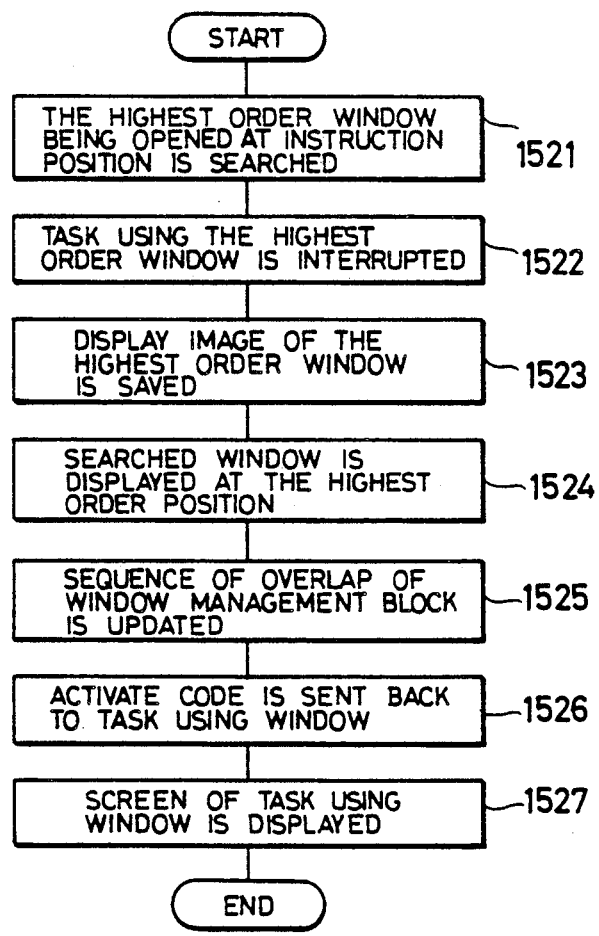
FIG. 17 is the processing chart of a window changeover.

Next, the change-over operation method of the edition units 56 by the window operation and its processing content will be described with reference to FIGS. 31 and 17.

Figure 31C:
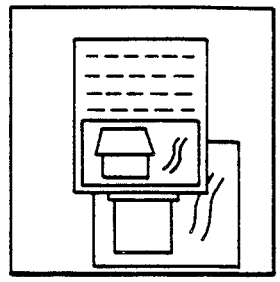

First of all, when edition is changed to the edition of the document layout during the edition inside the graphic region as shown in FIGS. 31*b* and 31*c*, the mouse cursor 30 is moved onto the window 25 of the document edition unit 561 in the same way as the designation of the operation object described already, and the execution button of the mouse 31 is depressed.

Due to this input instruction, the input control unit 51 first judges that the designated position is outside the window 25 of the graphic edition unit that has so far been conducting the edition and delivers this input, not to the graphic edition unit, but to the window management unit 52.

The window management unit 52 judges from the designated position by the mouse 31 and the window management table 521 that the window 25 of the document edition unit 561 is designated (step 1521), suspends once the task that is using the window 25 that has so far been the highest order, that is, the graphic edition unit (step 1522) and saves the display image of the highest order window to the display buffer (step 1523).

Then, the window 25 of the document edition unit 561 that is designated afresh is displayed at the highest order position (step 1524) and the sequence of overlap of the window management blocks 5211 is updated (step 1525).

Furthermore, the activate code is sent back to the task using this window 25 in order to let the document edition unit 561 which resumes a new processing that the window 25 is changed over (step 1526) and the task using this window 25, that is, the document edition unit 561, is started once again (step 1527).

Incidentally, the interruption and re-start of the edition unit 56 described above are processed by the system control unit 53. Hereinafter, the interruption/re-start processing will be described with reference to the flow-charts of FIGS. 12*e* and 12*f*.

When the task interrupt request is generated, the system control unit 53 sets the interrupt flag of the task control block (TCB) corresponding to the designated task (step 1141), judges whether or not the task is the Ready status (step 1142), removes the corresponding task control block (TCB) from the Ready queue 533 if it is the Ready status and prevents the central processing unit (CPU) from being allotted by the dispatcher (step 1143).

On receiving the task re-start request, the system control unit 53 resets the inerrupt flag of the corresponding task control block (TCB) (step 1151), then judges whether or not this task is under the Ready status (step 1152) and connects once again the Ready queue 533 if it is under the Ready state (step 1153). If the interrupt flag of the task control block (TCB) is set, the system control unit 53 does not invoke the task in the task dispatcher but removes it from the Ready queue 533.

Figure 31D:
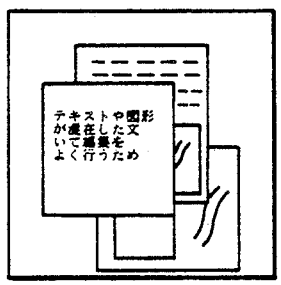
Figure 31E:
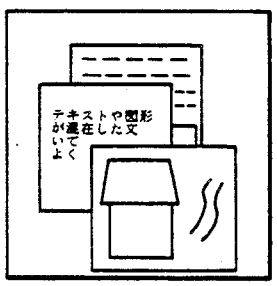

If updating of the basic region is made from the state shown in FIG. 31*c*, it changes as shown in FIG. 31*d*. Under this state, each edition unit 561 and 562 can be changed over arbitrarily between the text, the figure and the layout in the operation method similar to the method described above. For example, if change-over is made between the region edition units 562, that is, from the text to the figure, the display state of the screen 21 becomes such as shown in FIG. 31*e*.

When the change-over operation of the window 25 described already is made, the activate code is returned as input from the window management unit 52 to the task which is re-started. In the example described above, for instance, if the change-over is made from the figure edition unit to the document edition unit 561, the document edition unit 561 receives the activate input described above after re-start and executes the following processings in accordance with the input (FIGS. 22*j*, 22*k*-1, 22*k*-2).

First, of all, it judes whether or not the region under edition exists inside the page which is being displayed from the document data (step 3601) and if it does, the document edition unit 561 sets the display flag to 0 because the content of that region might be updated by edition (step 3602). If such a region does not exist, the document edition unit 561 sets the display flag to 0 (step 3603) and after the following message processing, makes the re-display processing of the layout.

Next, it generates the reception request of message to the system control unit 53 (step 3604) and if there is the message, it judges whether the message is the end notification from the region edition unit 562 or the page number change notification from the text data edition unit on the basis of the content of the message (step 3605).

If the message is the end notification, the document edition unit 561 executes the following processing (step 3606). Namely, it acquires the region number from the task number of the region edition unit 562 stored in the message and the activation edition task management table (ETMT) (FIG. 29; step 3651), resets the status of the corresponding region management block to 0 (step 3652), deletes the information relating to this task from the activation edition task management table (ETMT) (FIG. 29; step 3653) and finally, deletes the task itself (step 3654).

Finally, it judges whether or not the document edition unit 561 generating the end notification is the text data edition unit and if it is, the document edition unit 561 executes the later-appearing page number processing in accordance with the use page number stored in the message. Incidentally, it is possible to judge whether or not the document edition unit 561 generating the end notification is the text data edition unit by judging whether or not the region management block described already is the basic region.

The following page number change processing is executed when the message received as described above is the page number change notification and the end notification is from the text data edition unit. First of all, whether or not the page number in the chapter is the same as the notified page number is judged (step 3661) and if it is, the procedure is completed without doing anything.

Next, whether or not the notified page number is greater than the page number in the chapter is judged (step 3662) and if it is, that is, if the page is increased by the edition of the text data, the page number is increased by the page number which is increased (step 3663).

On the other hand, if the notified page number is smaller in the judgment described above (that is, if the pages in which the text data exist become smaller in number due to the edition of the text data), whether or not the internal region exists in the trailing end page in the chapter is judged (step 3664) and if it is not, the page is deleted (step 3665) and the procedures from the step 3661 are again repeated.

In other words, if the pages in which the text exists decrease in number due to the edition of the text data, the continuous pages under the blank state from the trailing end in the chapter (the pages in which no internal region at all exists and no text data exists, either, in the basic region) are deleted.

The same page number change processing is executed if the end notification from the text data edition unit is normally finished after the re-determination of the text data at the time of updating of the exclusive region described above (step 3810 in FIG. 22m). If the message does not exist any more in the procedures described above, whether or not the display flag is set to 1 is judged (step 3607) and if it is set, the layout re-display of this page is executed (step 3608).

Finally, the end processing in the document edition unit 561 will be described with reference to FIGS. 22l and 12g.

When the end is instructed from the operator, the document edition unit 561 judges whether or not any edition task under invoking exists on the basis of aforementioned activation edition task management table (ETMT) (FIG. 29; step 3702) and if it does, the document edition unit acquires the task number and the region number from activation edition task management table (ETMT) (FIG. 29; step 3703), resets the status of this region to 0 (step 3704) and then generates the compulsive end request for the system control unit 53 (step 3705).

In accordance with this request, the system control unit 53 releases the resources used by the designated task as shown in FIG. 12g (step 1161), and generates the compulsive end processing request for the window management unit 52 (step 1162). The window management unit 52 executes the processing similar to the close processing shown in FIG. 16.

Then, it removes corresponding task control block (TCB) from the Ready queue 533 if the former is connected to the latter to bring the status of the task control block (TCB) into the Dormant state (step 1163). After the compulsive end processing described above, the document edition unit 561 deletes this task (step 3706).

The processing described above is repeated for the edition tasks under invoking (step 3707) and after compulsive end processing of the tasks under invoking is all finished, the document edition unit 561 registers the document data (step 3708), closes the window 25 which the document edition unit 561 itself opens (step 3709), lets the system management unit 53 know that the processing is complete by the message (step 3710) and finishes the task (step 3711).

In the manner described above, if the end request is generated for the document edition unit 561, the region edition units 562 under the editing operation can be terminated altogether.

As described above, it is possible in accordance with this embodiment of the present invention to select the mode, which is in agreement with the layout of the document as desired by the operator such as only the full page side, the full text-line side, the leading text-line side, the ending text-line side, the region, and the like, as the exclusiveness of the region to be set.

Therefore, when the page of the set position of the region is registered to the left end or the right end or when the region itself is set, there is no need to consider the position, the size, and the like.

Since this information is stored in such a manner as to correspond to the region, the original information can be kept as such when the movement of region or the size change is made or the size of the paper is changed. In other words, it is possible to eliminate the trouble of setting the attributes once again.

Furthermore, since this information excludes the text while recognizing the direction of characters such as on the leading text-line side or on the ending text-line side, the direction of exclusion can be changed automatically from the transverse direction to the longitudinal direction when the character direction inside the page is changed such as when lateral writing is changed to vertical writing.

Since the attributes that have once been set can be changed later, they can be changed easily when it is desired to change the layout during the preparation of the document in connection with other information.

The set attribute information is stored as part of the document data in such a manner as to correspond to the region. Therefore, even when the preparation of the document is once terminated, the edition of the layout of the document can be executed in accordance with the previous information when updating of the document is made once again.

Furthermore, the area from which the text is excluded is displayed in the unit of text-line digit for inputting the text during the input of the text, preparation and edition of the text can be carried out while taking the overall layout into consideration. Since the document edition unit 561 that has been interrupted can be re-started easily by the window operation, the layout of the document can be confirmed instantaneously.

In accordance with this embodiment of the present invention, the area for excluding the text is managed separately as the exclusive region management table and if the exclusive areas overlap mutually, they are managed while being divided in the direction of characters. Accordingly, the processing speed can be improved when the text is arranged.

What is claimed is:

1. A document preparation apparatus including an input unit for inputting a document having a plurality of regions in which a plurality of kinds of description element data exists in a mixture for inputting said description element data to be described in said document for each region, a memory unit for storing said inputted description element data from said input unit, a display unit for displaying various kinds of said description element data stored in said memory unit, a document edition unit for causing a page layout of a document to be displayed by said display unit and for editing said each region according to editing operations to be performed on said document being displayed, as instructed by an operator through said input unit, a text data edition unit activated by said document edition unit, for preparing a text as a main body text of said document, a region edition unit activated by said document edition unit, for preparing and editing description element data in each region of said document, the improvement in said document edition unit comprising:

region set means for setting a size of said each region to a size corresponding to a size at which said each region is to be printed by said apparatus;

region attributes set means for setting attribute information, which represents whether said text to be described on a page when said each region is set is to be excluded from being included within said each region;

region information hold means for holding said attribute set by region attribute set means in such a manner as to correspond to said each region being set by said region set means; and text re-determination means for re-determining an arrangement of said text inputted into a page in response to a change in said each region for inputting said text, wherein said change is a result of an operation of said apparatus such as setting of a region having exclusiveness, movement, size change and page format change; and said text data edition unit includes text input control means for controlling arrangement of said text in order to prevent an input text from overlapping into said region in response to a setting of a region having exclusiveness and inputting and editing of said text, wherein said attribute information for excluding said text is any one of full page exclusive information excluding all of said text inside a page in which said region is set, full text-line exclusive information for excluding said text in all text-lines extending to a region set position, text-line leading side exclusive information for excluding said text on a leading side of said text-line containing said region set position and extending to said region set position, text-line ending side information for excluding said text on an ending side of said text-line containing said region set position and extending to said region set position, and set region exclusive information of only said region for excluding said text extending to said region set position.

2. A document preparation apparatus including an input unit for inputting a document having a plurality of regions in which a plurality of kinds of description element data exists in a mixture and for inputting said description element data to be described in said document for each region, a memory unit for storing said inputted description element data from said input unit, a display unit for displaying various kinds of said description element data stored in said memory unit, a document edition unit for causing a page layout of a document to be displayed by said display unit and for editing said each region according to editing operations to be performed on said document being displayed as instructed by an operator through said input unit, a text data edition unit activated by said document edition unit, for preparing a text as a main body text of said document, a region edition unit activated by said document edition unit, for preparing and editing description element data in said each region, the improvement in said document edition unit comprising:

region set means for setting size of said each region to a size corresponding to a size at which said each region is to be printed by said apparatus;

region attributes set means for setting attribute information, which represents whether said text to be described on a page when said each region is set is to be executed from being included within said each region;

region information hold means for holding said attribute set by said region attribute set means in such a manner as to correspond to said each region being set by said region set means;

region attribute information change means for changing said attribute information held by said region information hold means;

text re-determination means for re-determining an arrangement of said text inputted into a page in response to a change in said each region for inputting said text, wherein said change is a result of an operation of said apparatus such as setting of a region having exclusiveness, movement, size change and page format change; and said text data edition unit includes text input control means for controlling arrangement of said text in order to prevent an input text from overlapping into said region in response to a setting of a region having exclusiveness and inputting and editing of said text, wherein said attribute information for excluding said text is any one of full page exclusive information for excluding all of said text inside a page in which said region is set, full text-line exclusive information for excluding said text in all text-lines extending to a region set position, text-line leading side exclusive information for excluding said text on a leading side of said text-line containing said region set position and extending to said region set position, text-line ending side information for excluding said text on an ending side of said text-line containing said region set position and extending to said region set position, and set region exclusive information of only said region for excluding said text extending to said region set position.

3. A document preparation apparatus including an input unit for inputting a document having a plurality of regions in which a plurality of kinds of description element data exist in mixture and for inputting said description element data to be described in said document for each region, a memory unit for storing said inputted description element data from said input unit, a display unit for displaying various kinds of said description element data stored in said memory unit, a document edition unit for causing a page layout of a document to be displayed by said display unit and for editing said each region according to editing operations to be performed on said document being displayed as instructed by an operation through said input unit, a text data edition unit activated by said document edition unit, for preparing text as a main body text of said document and a region edition unit activated by said document edition, for preparing and editing description element data in said each region, the improvement in said document edition unit comprising:

region set means for setting a size of said each region to a size corresponding to a size at which said each region is to be printed by said apparatus;

region attribute set means for setting attribute information which represents whether said text to be described on a page when said each region is set is to be excluded from being included within said each region;

region information hold means for holding said attribute set by said region attribute set means in such a manner as to correspond to said each region being set by said region set means;

text re-determination means for re-determining an arrangement of said text inputted into a page in response to a change in said each region for inputting said text, wherein said change is a result of an operation of said apparatus such as setting of a region having exclusiveness, movement, size change and page format change; and said text data edition unit includes exclusive region display means for displaying said region for excluding text in a form different from text permitted in said region and text input control means for controlling arrangement of said text in order to prevent an input text from overlapping edges of said region in response to a setting of a region having exclusiveness and inputting and editing of text to said document being displayed, wherein said attribute information for excluding said text is any one of full page exclusive information for excluding all said text inside a page in which said region is set, full text-line exclusive information for excluding said text in all text-lines extending to a region set position, text-line leading side exclusive information for excluding said text on a leading side of said text-line containing said region set position and extending said to said region set position, text-line ending side information for excluding said text on an ending side of said text-line containing said region set position and extending to said region set position, and set region exclusive information of only said region for excluding said text extending to said region set position.

* * * * *